US012593127B2

(12) United States Patent (10) Patent No.: US 12,593,127 B2
Nakajima (45) Date of Patent: Mar. 31, 2026

(54) IMAGING DEVICE, IMAGING SYSTEM, IMAGING METHOD, AND NON-TRANSITORY STORAGE MEDIUM

(71) Applicant: JVCKENWOOD Corporation, Yokohama (JP)

(72) Inventor: Nobuki Nakajima, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 1 day.

(21) Appl. No.: 18/596,685

(22) Filed: Mar. 6, 2024

(65) Prior Publication Data

US 2024/0210793 A1 Jun. 27, 2024

Related U.S. Application Data

(63) Continuation of application No. PCT/JP2022/029384, filed on Jul. 29, 2022.

(30) Foreign Application Priority Data

Sep. 27, 2021 (JP) ................................. 2021-156799
Sep. 27, 2021 (JP) ................................. 2021-156800

(Continued)

(51) Int. Cl.
*H04N 23/67* (2023.01)
*G03B 13/36* (2021.01)
*H04N 23/61* (2023.01)

(52) U.S. Cl.
CPC ........... *H04N 23/675* (2023.01); *G03B 13/36* (2013.01); *H04N 23/61* (2023.01); *H04N 23/67* (2023.01); *H04N 23/671* (2023.01)

(58) Field of Classification Search
CPC ... G02B 7/28; G02B 7/36; G02B 7/40; G03B 13/36; H04N 23/60; H04N 23/61;

(Continued)

(56) References Cited

U.S. PATENT DOCUMENTS 5,227,828 A 7/1993 Kirigaya
9,599,806 B2 * 3/2017 Zhong .................. G01B 9/0203

(Continued)

FOREIGN PATENT DOCUMENTS

JP 02-118610 5/1990
JP 05-030402 2/1993

(Continued)

OTHER PUBLICATIONS

International Search Report and Written Opinion for International Application Serial No. PCT/JP2022/029384 mailed on Sep. 20, 2022, 9 pages.

*Primary Examiner* — Antoinette T Spinks
(74) *Attorney, Agent, or Firm* — Amin, Turocy & Watson, LLP

(57) ABSTRACT

An imaging device capable of imaging an object includes: an imaging element; an object information acquisition unit configured to acquire position information of an object existing in an imaging region of the imaging element; a target region acquisition unit configured to set a target region based on the position information of a reference object acquired by the object information acquisition unit; and a focal position controller configured to control a focal position of the imaging device so as to adjust, when an object other than the reference object exists in the target region, the focal position on the object, wherein the target region acquisition unit is further configured to set the target region based on the position information of the reference object located between a first position and a second position, and the position information is a relative position with respect to the imaging device.

17 Claims, 36 Drawing Sheets

(30) Foreign Application Priority Data

| | | | |
|---|---|---|---|
| Sep. 27, 2021 | (JP) | ................................. | 2021-156863 |
| Sep. 27, 2021 | (JP) | ................................. | 2021-157146 |
| Sep. 27, 2021 | (JP) | ................................. | 2021-157147 |
| Sep. 27, 2021 | (JP) | ................................. | 2021-157148 |
| Sep. 27, 2021 | (JP) | ................................. | 2021-157244 |
| Sep. 27, 2021 | (JP) | ................................. | 2021-157250 |

(58) Field of Classification Search
CPC .... H04N 23/67; H04N 23/671; H04N 23/675;
H04N 23/69
See application file for complete search history.

(56) References Cited

U.S. PATENT DOCUMENTS

| | | | |
|---|---|---|---|
| 2005/0117033 A1 | 6/2005 | Matsui |
| 2005/0162540 A1 | 7/2005 | Yata |
| 2009/0116830 A1 | 5/2009 | Kumagai |
| 2010/0254689 A1 | 10/2010 | Yata |
| 2010/0315521 A1* | 12/2010 | Kunishige | .............. H04N 1/215 |
| | | | 348/E5.037 |
| 2016/0336041 A1 | 11/2016 | Mukai et al. |
| 2018/0137607 A1 | 5/2018 | Mishma et al. |
| 2018/0205875 A1 | 7/2018 | Nakamaru |
| 2018/0352167 A1 | 12/2018 | Okada |
| 2020/0228719 A1 | 7/2020 | Kimoto |
| 2020/0344421 A1 | 10/2020 | Okada |
| 2024/0205543 A1* | 6/2024 | Nakajima | .............. G03B 13/36 |

FOREIGN PATENT DOCUMENTS

| | | |
|---|---|---|
| JP | 2005-167517 | 6/2005 |
| JP | 2010-243730 | 10/2010 |
| JP | 2013-251780 | 12/2013 |
| JP | 2016-027704 | 2/2016 |
| JP | 2018-084802 | 5/2018 |
| JP | 2019-045768 | 3/2019 |
| JP | 2019-102846 | 6/2019 |
| JP | 2002-027466 | 1/2022 |
| WO | 2017/056757 | 4/2017 |
| WO | 2017/141746 | 8/2017 |
| WO | 2019/187648 | 10/2019 |

* cited by examiner

IMAGING DEVICE, IMAGING SYSTEM, IMAGING METHOD, AND NON-TRANSITORY STORAGE MEDIUM

CROSS-REFERENCE TO RELATED APPLICATIONS

This application is a Continuation of PCT International Application No. PCT/JP2022/029384 filed on Jul. 29, 2022 which claims the benefit of priority from Japanese Patent Applications No. 2021-156799, 2021-156800, 2021-156863, 2021-157146, 2021-157147, 2021-157148, 2021-157244, and 2021-157250, all filed on Sep. 27, 2021, the entire contents of all of which are incorporated herein by reference.

BACKGROUND OF THE INVENTION

The present invention relates to an imaging device, an imaging system, an imaging method, and a non-transitory storage medium.

BACKGROUND

An autofocus imaging device that automatically adjusts a focal position is known. For example, WO 2017/141746 A describes that focus is adjusted on a predetermined position designated by a user.

In an autofocus imaging device, it is required to adjust the focus appropriately.

An imaging device, an imaging system, an imaging method, and a non-transitory storage medium are disclosed.

SUMMARY OF THE INVENTION

According to one aspect of the present embodiment, there is provided an imaging device capable of imaging an object, the imaging device comprising: an imaging element; an object information acquisition unit configured to acquire position information of an object existing in an imaging region of the imaging element; a target region acquisition unit configured to set a target region based on the position information of a reference object acquired by the object information acquisition unit; and a focal position controller configured to control a focal position of the imaging device so as to adjust, when an object other than the reference object exists in the target region, the focal position on the object, wherein the target region acquisition unit is further configured to set the target region based on the position information of the reference object located between a first position where a distance from the imaging device is a first distance and a second position where a distance from the imaging device is a second distance shorter than the first distance, and the position information is a relative position with respect to the imaging device.

According to one aspect of the present embodiment, there is provided an imaging method for imaging an object, the imaging method comprising: acquiring position information of an object existing in an imaging region; setting a target region based on the position information of a reference object acquired at the acquiring; and controlling a focal position of an imaging device so as to adjust, when an object other than the reference object exists in the target region, the focal position on the object, wherein the setting further comprising setting the target region based on the position information of the reference object located between a first position where a distance from the imaging device is a first distance and a second position where a distance from the imaging device is a second distance shorter than the first distance, and the position information is a relative position with respect to the imaging device.

According to one aspect of the present embodiment, there is provided a non-transitory storage medium that stores a program for causing a computer to execute an imaging method for imaging an object, the program comprising: acquiring position information of an object existing in an imaging region; setting a target region based on the position information of a reference object acquired at the acquiring; and controlling a focal position of an imaging device so as to adjust, when an object other than the reference object exists in the target region, the focal position on the object, wherein the setting further comprising setting the target region based on the position information of the reference object located between a first position where a distance from the imaging device is a first distance and a second position where a distance from the imaging device is a second distance shorter than the first distance, and the position information is a relative position with respect to the imaging device.

The above and other objects, features, advantages and technical and industrial significance of this application will be better understood by reading the following detailed description of presently preferred embodiments of the application, when considered in connection with the accompanying drawings.

According to the present embodiment, the focus can be adjusted appropriately.

DETAILED DESCRIPTION OF THE INVENTION

Hereinafter, the present embodiments will be described in detail with reference to the drawings. Note that the present embodiment is not limited to the embodiments described below.

First Embodiment (Configuration of Imaging Device)

Figure 1:
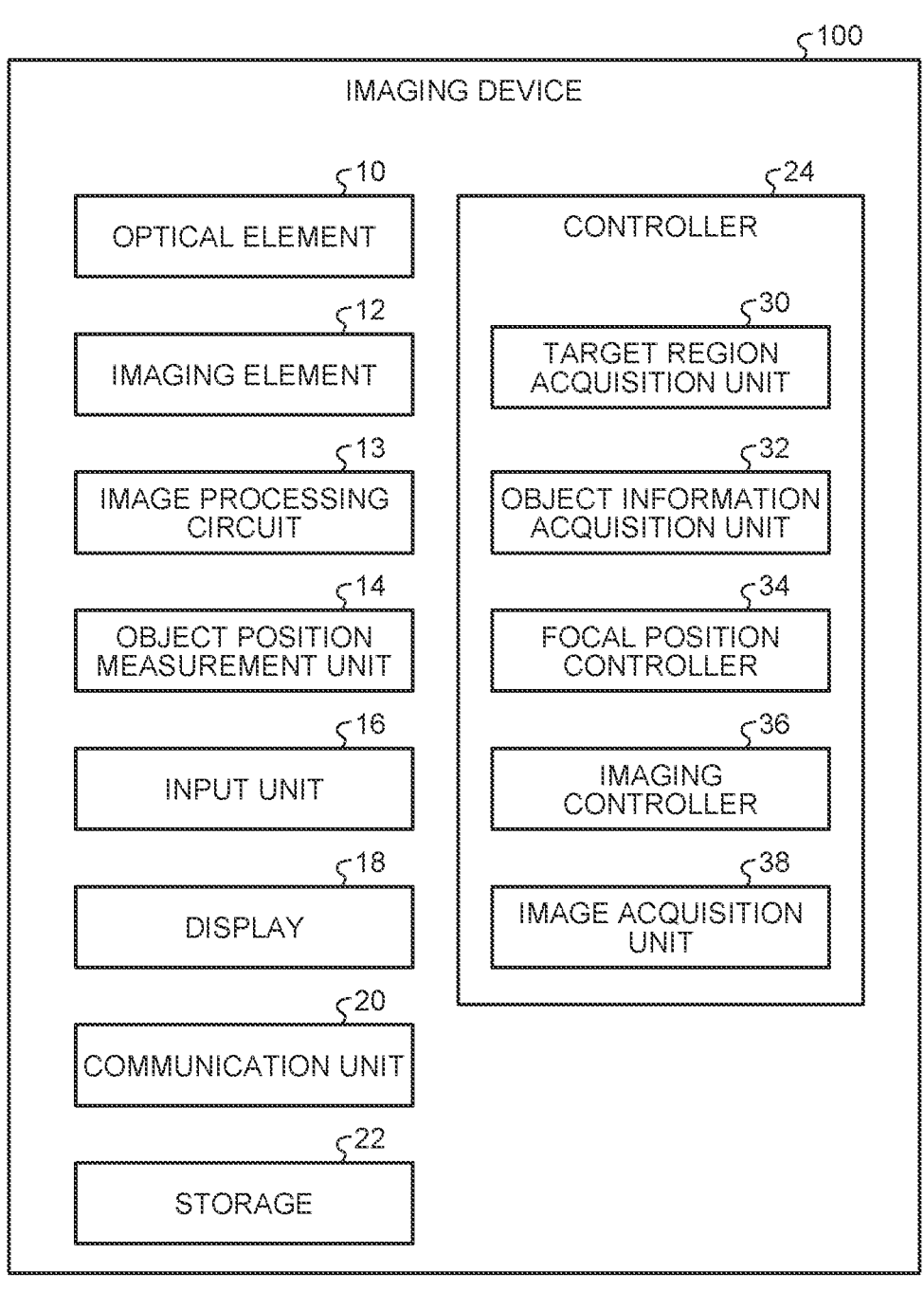
FIG. 1 is a schematic block diagram of an imaging device according to a first embodiment.

FIG. 1 is a schematic block diagram of an imaging device according to a first embodiment. An imaging device 100 according to the first embodiment is an imaging device that images an object within an imaging range. The imaging device 100 is an autofocus camera capable of adjusting a focal position automatically. The imaging device 100 may be a video camera that captures a moving image by capturing an image for each predetermined frame, or may be a camera that captures a still image. The imaging device 100 may be used for any purpose, and for example, may be used as a monitoring camera provided at a predetermined position in facilities or outdoors.

As illustrated in FIG. 1, the imaging device 100 includes an optical element 10, an imaging element 12, an image processing circuit 13, an object position measurement unit 14, an input unit 16, a display 18, a communication unit 20, a storage 22, and a controller 24.

The optical element 10 is, for example, an element of an optical system such as a lens. The number of optical elements 10 may be one or plural.

The imaging element 12 is an element that converts light incident through the optical element 10 into an image signal that is an electric signal. The imaging element 12 is, for example, a charge coupled device (CCD) sensor, a complementary metal oxide semiconductor (CMOS) sensor, or the like.

The image processing circuit 13 generates image data for each frame from the image signal generated by the imaging element 12. The image data is, for example, data including information of luminance and color of each pixel in one frame, and may be data to which gradation for each pixel is assigned.

The object position measurement unit 14 is a sensor that measures a position of an object to be measured with respect to the imaging device 100 (a relative position of the object). The object here may be any object, and may be a living thing or an inanimate object, and it similarly applies to following descriptions. In addition, the object here may refer to a movable object, but is not limited thereto, and may refer to an object that does not move.

In the present embodiment, the object position measurement unit 14 measures the distance from the imaging device 100 to the object as the relative position of the object. The object position measurement unit 14 may be any sensor capable of measuring the relative position of the object, and may be, for example, a time of flight (TOF) sensor. In a case in which the object position measurement unit 14 is a TOF sensor, for example, a light emitting element (for example, a light emitting diode (LED) that emits light and a light receiving unit that receives light are provided, and the distance to the object is measured by a flight time of the light emitted from the light emitting element to the object and returned to the light receiving unit. Note that, in addition to measuring the distance from the imaging device 100 to the object as the relative position of the object, the object position measurement unit 14 may also measure, for example, a direction in which the object exists with respect to the imaging device 100. In other words, the object position measurement unit 14 may measure, as the relative position of the object, the position (coordinates) of the object in the coordinate system in which the imaging device 100 is set as an origin.

The input unit 16 is a mechanism that receives an input (operation) from a user, and may be, for example, a button, a keyboard, a touch panel, or the like.

The display 18 is a display panel that displays an image. In addition to the image captured by the imaging device 100, the display 18 may be capable of displaying an image for the user to set a target region AR described later.

The communication unit 20 is a communication module that communicates with an external device, and may be, for example, an antenna, a Wi-Fi (registered trademark) module, or the like. Although the imaging device 100 communicates with an external device by wireless communication, wired communication may be used, and a communication method may be arbitrary.

The storage 22 is a memory that stores captured image data and various types of information such as calculation contents and programs of the controller 24, and includes at least one of, for example, a random access memory (RAM), a main storage device such as a read only memory (ROM), or an external storage device such as a hard disk drive (HDD). The program for the controller 24 stored in the storage 22 may be stored in a recording medium readable by the imaging device 100.

The controller 24 is an arithmetic device, and includes, for example, an arithmetic circuit such as a central processing unit (CPU). The controller 24 includes a target region acquisition unit 30, an object information acquisition unit 32, a focal position controller 34, an imaging controller 36, and an image acquisition unit 38. The controller 24 reads and executes a program (software) from the storage 22 to implement the target region acquisition unit 30, the object information acquisition unit 32, the focal position controller 34, the imaging controller 36, and the image acquisition unit 38, and executes these processes. Note that the controller 24 may execute these processes by one CPU, or may include multiple CPUs and execute the processes by the multiple CPUs. In addition, at least a part of the processing of the target region acquisition unit 30, the object information acquisition unit 32, the focal position controller 34, the imaging controller 36, and the image acquisition unit 38 may be implemented by a hardware circuit.

(Object Information Acquisition Unit)

The object information acquisition unit 32 acquires position information of an object existing in an imaging region AR0. The object information acquisition unit 32 controls the object position measurement unit 14 to cause the object position measurement unit 14 to measure the relative position of the object with respect to the imaging device 100. The object information acquisition unit 32 acquires a measurement result of the relative position of the object with respect to the imaging device 100 by the object position measurement unit 14 as position information of the object. The object information acquisition unit 32 sequentially acquires the position information of the object by acquiring the position information of the object every predetermined time. Furthermore, the object information acquisition unit 32 can also acquire information indicating a shape of the object (for example, a 3D shape of the object) based on the position information of the object. For example, the object information acquisition unit 32 can acquire the 3D shape of the object by accumulating multiple pieces of position information such as TOF image information.

(Target Region Acquisition Unit)

The target region acquisition unit 30 acquires information of a target region AR set in an imaging region of the imaging device 100. The target region AR is a region set to adjust the focal position automatically. The information of the target region AR is information indicating the position of the target region AR, that is, position information of the target region AR. Hereinafter, the target region AR will be described.

Figure 2:
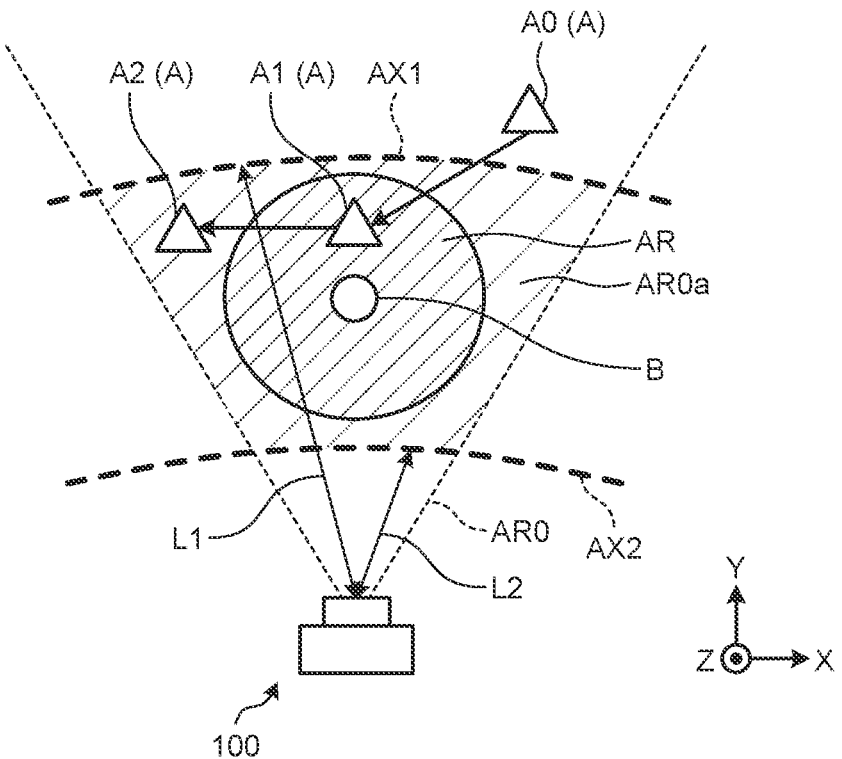
FIG. 2 is a schematic diagram for explaining an example of a target region.
Figure 3:
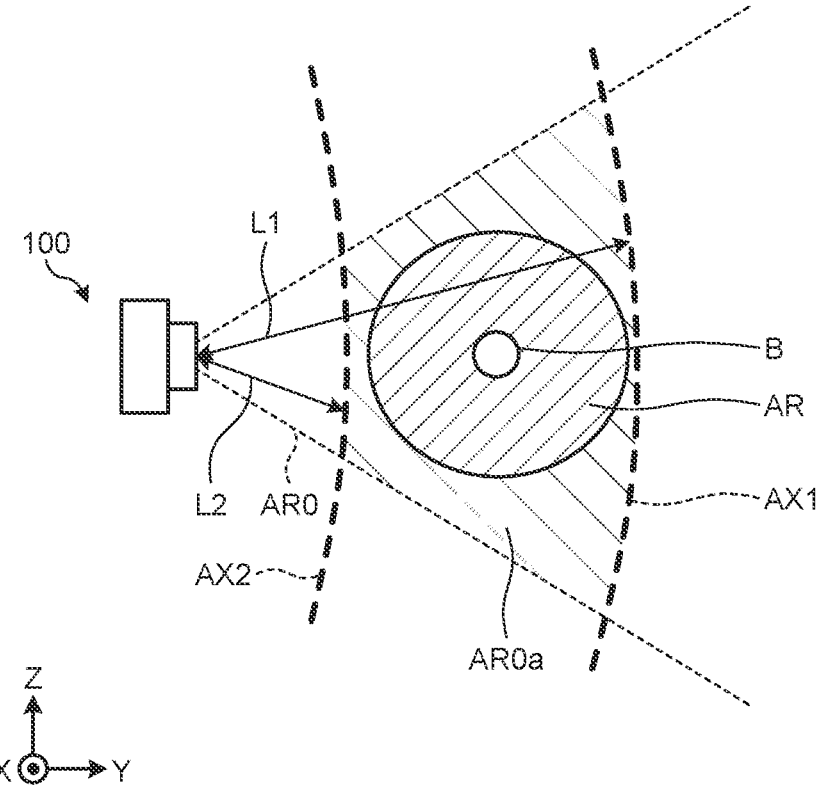
FIG. 3 is a schematic diagram for explaining an example of the target region.

FIGS. 2 and 3 are schematic diagrams for explaining an example of a target region. FIG. 2 is a diagram of the imaging device 100 and the target region AR as viewed from above in a vertical direction, and FIG. 3 is a diagram of the imaging device 100 and the target region AR as viewed from a horizontal direction. Hereinafter, the direction Z is a vertical direction, the direction X is one direction of a horizontal direction orthogonal to the direction Z, and the direction Y is a direction (horizontal direction) orthogonal to the direction Z and the direction X. As illustrated in FIGS. 2 and 3, a range in which an image can be captured by the imaging device 100 is defined as an imaging region AR0. The imaging region AR0 refers to a region (space) within an angle of view of the imaging element 12, in other words, a range that can be captured as an image in the real space. The target region AR is a region (space) set within the range of the imaging region AR0.

More specifically, the target region acquisition unit 30 sets the target region AR based on the position information of a reference object B. The reference object B is an object which is located in the imaging region AR0, and which is a reference for position setting of the target region AR. The target region acquisition unit 30 sets the target region AR based on the position information of the reference object B acquired by the object information acquisition unit 32.

The reference object B may be an object located between a first position AX1 and a second position AX2 in the imaging region AR0. The first position AX1 is a position where the distance from the imaging device 100 is a first distance L1, and the second position AX2 is a position where the distance from the imaging device 100 is a second distance L2 shorter than the first distance L1. As illustrated in FIGS. 2 and 3, in the present embodiment, the first position AX1 can be said to be a virtual plane including each position (coordinate) where the distance from the imaging device 100 is the first distance L1 in the imaging region AR0. Similarly, the second position AX2 can be said to be a virtual plane including each position (coordinate) at which the distance from the imaging device 100 is the second distance L2 in the imaging region AR0. That is, it can be said that the reference object B is located in a region (space) AR0a surrounded by a virtual plane whose distance from the imaging device 100 is the second distance L2 and a virtual plane whose distance from the imaging device 100 is the first distance L1 in the imaging region AR0. Note that the first position AX1 is not limited to a virtual plane in which all positions (coordinates) included in the first position AX1 become the first distance L1 from the imaging device 100, and may be a virtual plane in which at least some positions (coordinates) included in the first position AX1 become the first distance L1 from the imaging device 100. Similarly, the second position AX2 may be a virtual plane in which at least a part of the position (coordinates) included in the second position AX2 is a second distance L2 from the imaging device 100.

However, the reference object B is not limited to being located between the first position AX1 and the second position AX2, and may be located at any position in the imaging region AR0. For example, when a range that can be measured by the object position measurement unit 14 is a distance measurement region (distance measurement space), the reference object B may be an object located in the distance measurement region. In this case, the imaging region AR0 in FIGS. 2 to 4 may be treated as a distance measurement region.

Note that, in the present embodiment, the reference object B may be an object stopped in the imaging region AR0, that is, an object that does not move. That is, for example, the reference object B may be an object such as a facility whose position is fixed in the imaging region AR0.

The reference object B may be set by any method, and for example, the target region acquisition unit 30 may automatically set the reference object B. In this case, for example, the target region acquisition unit 30 may select the reference object B from the objects located in the imaging region AR0 by an arbitrary method. Further, for example, the reference object B may be set by the user. In this case, for example, the user may input information for selecting the reference object B to the input unit 16, and the target region acquisition unit 30 may set the reference object B based on the information for designating the reference object B designated by the user. In this case, for example, the image in the imaging region AR0 may be displayed on the display 18 in real time, and the user may input information for selecting the reference object B by selecting the image of the reference object B from among the objects shown in the image in the imaging region AR0.

The target region acquisition unit 30 sets the target region AR based on the position information of the reference object B acquired by the object information acquisition unit 32. In the present embodiment, the target region acquisition unit 30 sets a region (space) having a predetermined size around the reference object B, that is, a region having a predetermined size including the position of the reference object B in a range, as the target region AR. In the examples of FIGS. 2 and 3, the target region acquisition unit 30 sets a circle (a sphere in this case) having a predetermined radius centered on the position of the reference object B as the target region AR. Furthermore, in the present embodiment, since the reference object B is located in the region AR0$a$ between the first position AX1 and the second position AX2 as described above, the target region AR is also located in the region AR0$a$ between the first position AX1 and the second position AX2. However, the target region AR is not limited to being set in a spherical shape centered on the position of the reference object B, and may be a region arbitrarily set based on the position information of the reference object B, and may not be located in the region AR0$a$ between the first position AX1 and the second position AX2.

Figure 4:
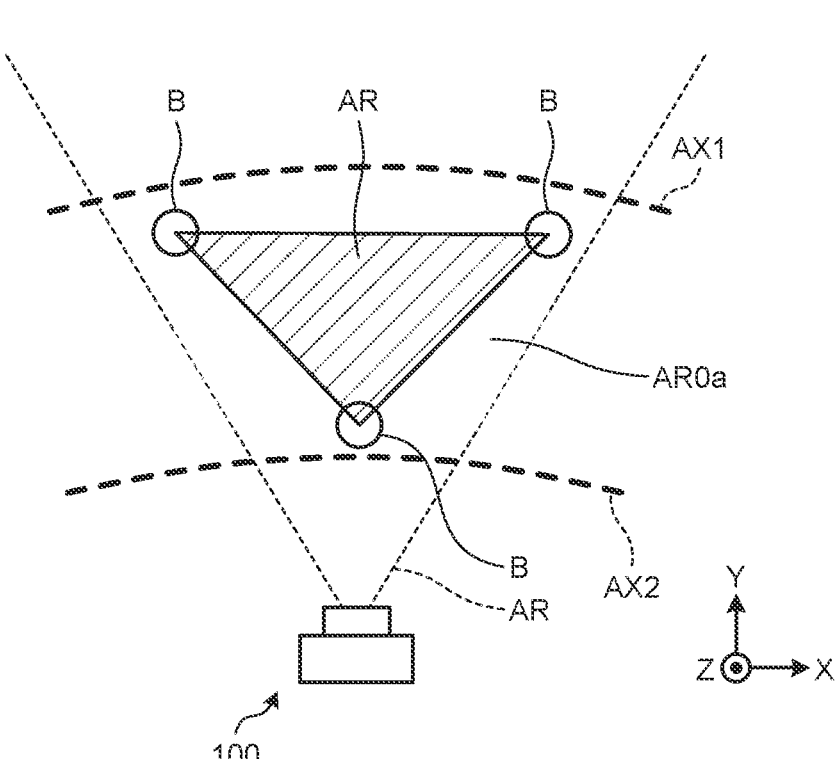
FIG. 4 is a schematic diagram illustrating an example of a case in which multiple reference objects are set.

FIG. 4 is a schematic diagram illustrating an example of a case in which multiple reference objects are set. Multiple objects B may be set. In this case, the target region acquisition unit 30 sets the target region AR based on the position information of the multiple reference objects B. For example, as illustrated in FIG. 4, the target region acquisition unit 30 may set a region (space) surrounded by the multiple reference objects B as the target region AR.

(Focal Position Controller)

The focal position controller 34 sets a focal position of the imaging device 100. The focal position controller 34 controls the focal position by controlling a position of the optical element 10, that is, by moving the position of the optical element 10.

The focal position controller 34 sets the focal position on an object existing in the target region AR. The object here is an object other than the reference object B, and in the example of the present embodiment, it is preferable to refer to a moving object. The focal position controller 34 sets the focal position at the position of the object determined to exist in the target region AR. In the present embodiment, the focal position controller 34 determines whether the object exists in the target region AR based on the position information of the object acquired by the object information acquisition unit 32. In a case in which the position of the object acquired by the object information acquisition unit 32 overlaps with the position of the target region AR, the focal position controller 34 determines that the object exists in the target region AR and sets the focal position at the position of the object acquired by the object information acquisition unit 32. On the other hand, the focal position controller 34 does not set the focal position of an object that does not exist in the target region AR.

The focal position controller 34 keeps the focal position on the object during a period in which the object at the focal position exists in the target region AR. That is, the focal position controller 34 determines whether or not the object continues to exist in the target region AR based on the position information of the object at every predetermined time acquired by the object information acquisition unit 32, and keeps the focal position on the object during a period in which the object continues to exist in the target region AR. On the other hand, in a case in which the object on the focal position moves out of the target region AR, that is, in a case in which the object no longer exists in the target region AR, the focal position controller 34 takes the focal position out of the object and focuses on a position other than the object.

Note that the focal position controller 34 may not set the focal position of the object existing in the target region AR from the start of operation of the imaging device 100 (a timing at which the imaging becomes possible). That is, the focal position controller 34 may set the focal position of the object entering the target region AR after starting the operation. In other words, the focal position controller 34 may set the focal position of an object from a timing at which the object starts to exist in the target region AR for the object that exists in the target region AR at a certain timing but does not exist in the target region AR at a timing before the certain timing. In other words, in a case in which the object moves from the outside of the target region AR into the target region AR, the object may be recognized as a target on which the focal position controller 34 focuses. That is, the focal position controller 34 may set the focal position of the object moved from the outside of the target region AR into the target region AR.

Furthermore, in a case in which there is no object in the target region AR, the focal position controller 34 may set the focal position to a preset setting position. The preset setting position may be arbitrarily set, but is preferably set in the target region AR such as a center position of the target region AR.

An example of the above-described focal position setting processing will be described with reference to FIG. 2. FIG. 2 illustrates an example in a case in which the object A moves in an order of a position A0 outside the target region AR, a position A1 inside the target region AR, and a position A2 outside the target region AR. In this case, the focal position controller 34 does not set the focal position on the object A at a timing when the object A exists at the position A0, and sets the focal position on the preset setting position, for example. Then, the focal position controller 34 sets the focal position on the object A at a timing when the object A is located at the position A1, that is, at a timing when the object A enters the target region AR. The focal position controller 34 keeps the focal position on the object A during a period in which the object A is located in the target region AR. Thereafter, at a timing when the object A moves to the position A2, that is, at a timing when the object A goes out of the target region AR, the focal position controller 34 removes the focal position from the object A and returns the focal position to the preset setting position. That is, the focal position controller 34 sets the focal position to the object A from the timing at which the object A enters the target region AR, moves the focal position to the moving object A while the object A moves in the target region AR, and removes the focal position from the object A at the timing at which the object A moves out of the target region AR.

Note that the focal position may be set by the user. In this case, for example, an auto mode in which the focal position is automatically adjusted and a manual mode in which the focal position is adjusted by the user may be switchable. Then, in a case of the auto mode, the focal position is adjusted by the focal position controller 34 as described above. On the other hand, in a case of the manual mode, the user inputs an operation of adjusting the focal position to the input unit 16, and the focal position controller 34 adjusts the focal position according to the user's operation.

(Imaging Controller)

The imaging controller 36 controls imaging by the imaging device 100 to capture an image. The imaging controller 36 controls, for example, the imaging element 12 to cause the imaging element 12 to acquire an image signal. For example, the imaging controller 36 may cause the imaging element 12 to acquire the image signal automatically, or may cause the imaging element 12 to acquire the image signal according to a user's operation.

(Image Acquisition Unit)

The image acquisition unit 38 acquires image data acquired by the imaging element 12. For example, the image acquisition unit 38 controls the image processing circuit 13 to cause the image processing circuit 13 to generate image data from the image signal generated by the imaging element 12, and acquires the image data. The image acquisition unit 38 stores the image data in the storage 22.

(Setting Flow of Focal Position)

Figure 5:
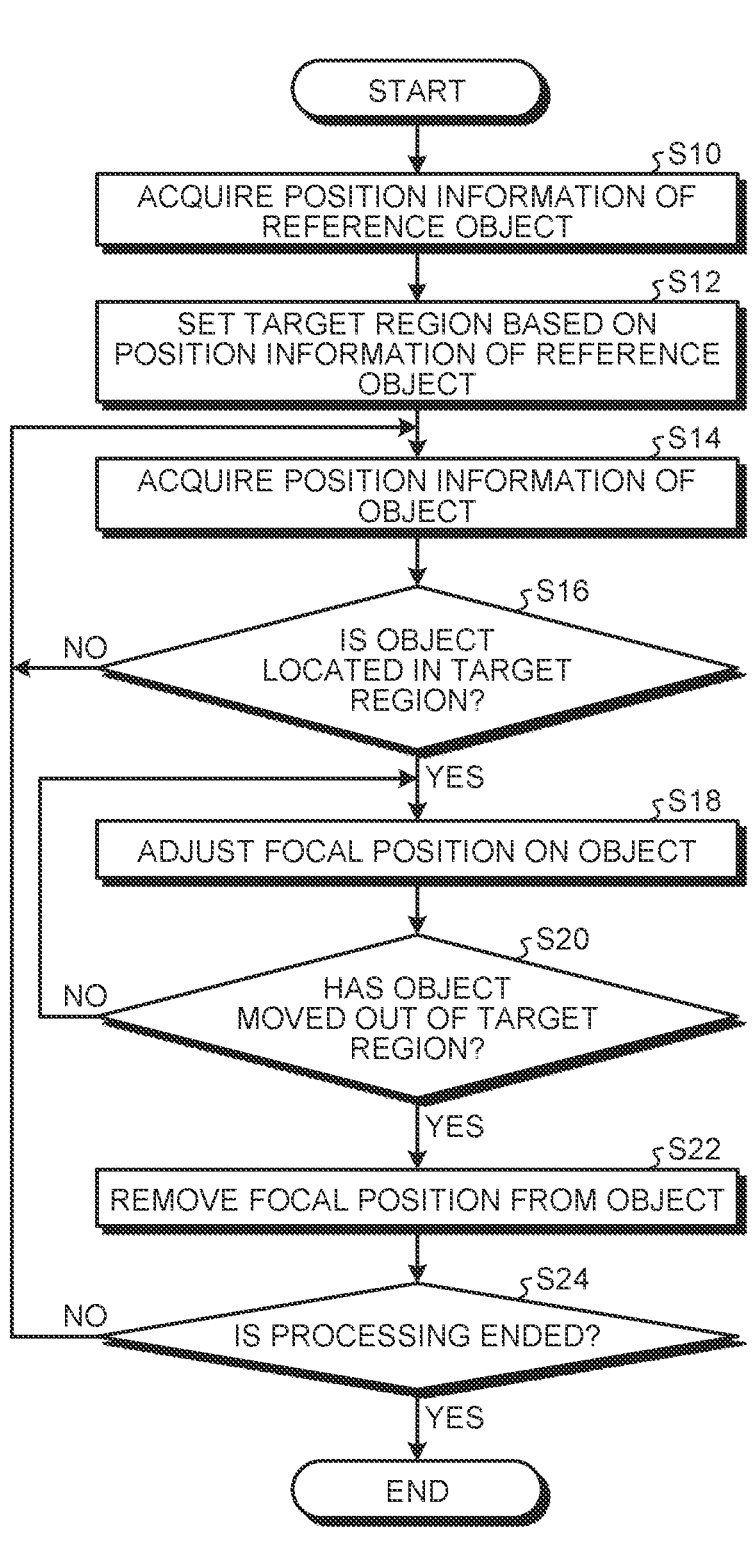
FIG. 5 is a flowchart for explaining a processing flow of adjusting a focal position.

Next, a processing flow of setting the focal position described above will be described. FIG. 5 is a flowchart for explaining a processing flow of adjusting a focal position. As illustrated in FIG. 5, the controller 24 causes the object information acquisition unit 32 to acquire the position information of the reference object B (Step S10), and causes the target region acquisition unit 30 to set the target region AR based on the position information of the reference object B (Step S12). Then, the controller 24 causes the object information acquisition unit 32 to acquire the position information of the object (Step S14). An execution order of Steps S10, S12, and S14 may be arbitrary. The controller 24 causes the focal position controller 34 to determine whether the object is located in the target region AR based on the position information of the object (Step S16). In a case in which the object is not located in the target region AR (Step S16; No), the process returns to Step S14, and the acquisition of the position information of the object is continued. On the other hand, in a case in which the object is located in the target region AR (Step S16; Yes), the focal position controller 34 adjusts the focal position on the object (Step S18). Thereafter, the acquisition of the position information of the object is continued, and it is determined whether the object has moved to the outside of the target region AR (Step S20). In a case in which the object does not move out of the target region AR (Step S20; No), that is, in a case in which the object continues to exist in the target region AR, the process returns to Step S18, and the focal position is kept on the object. In a case in which the object has moved to the outside of the target region AR (Step S20; Yes), the focal position controller 34 removes the focal position from the object (Step S22). Thereafter, in a case in which the processing is not ended (Step S24; No), the process returns to Step S14, and in a case in which the processing is ended (Step S24; Yes), this process ends.

(Effects)

As described above, the imaging device 100 according to the present embodiment includes the imaging element 12, the object information acquisition unit 32, the target region acquisition unit 30, and the focal position controller 34. The object information acquisition unit 32 acquires position information of the object existing in the imaging region AR0 of the imaging element 12. The target region acquisition unit 30 sets the target region AR based on the position information of the reference object B acquired by the object information acquisition unit 32. In a case in which an object other than the reference object B exists in the target region AR, the focal position controller 34 controls the focal position of the imaging device 100 so as to adjust the focal position on the object.

Here, in an autofocus imaging device, it is required to adjust a focal position appropriately. On the other hand, the imaging device 100 according to the present embodiment sets the target region AR based on the position of the reference object B, and in a case in which an object exists in the target region AR, controls the focal position of the imaging device 100 so as to adjust the focal position on the object. Therefore, for example, in a case in which there is a remarkable object in monitoring or the like, it is possible to appropriately focus on an object near the remarkable object as the reference object B.

The target region acquisition unit 30 may set a region around the reference object B as the target region AR. Therefore, it is possible to appropriately focus on an object near the remarkable reference object B.

The target region acquisition unit 30 may set a region surrounded by the multiple objects B as the target region AR. Therefore, it is possible to appropriately focus on an object near the multiple remarkable reference objects.

The target region acquisition unit 30 may set the target region AR based on the position information of the reference object B stopped in the imaging region AR0. Therefore, it is possible to appropriately focus on an object near the stopped reference object B.

The target region acquisition unit 30 may set the target region AR based on the position information of the reference object B located between the first position AX1 at the first distance L1 from the imaging device 100 and the second position AX2 at the second distance L2 shorter than the first distance L1 from the imaging device 100. By setting an object located between the first position AX1 and the second position AX2 as the reference object B, it is possible to appropriately focus on an object near the reference object B located at such a position.

Second Embodiment

Next, a second embodiment will be described. The second embodiment is different from the first embodiment in that a target region AR is set based on position information of a moving reference object B. In the second embodiment, the description of portions having the same configuration as that of the first embodiment will be omitted.

In the second embodiment, the target region acquisition unit 30 sets the target region AR based on the position information of a moving reference object B. The object information acquisition unit 32 sequentially acquires the position information of the reference object B. The target region acquisition unit 30 sets the target region AR such that the target region AR also moves with the movement of the reference object B, that is, with the change in the position information of the reference object B. The target region acquisition unit 30 preferably sets the target region AR such that the target region AR also moves while maintaining the same position (a relative position) of the target region AR with respect to the reference object B. That is, it can be said that the target region acquisition unit 30 sequentially updates the position of the target region AR while maintaining the same position of the target region AR with respect to the reference object B as the reference object B moves.

The focal position controller 34 adjusts the focal position on the object existing in the target region AR. In the second embodiment, in a case in which a stopped (not moving) object is located in the target region AR due to the movement of the target region AR, the focal position controller 34 does not adjust the focal position on the object. That is, the focal position controller 34 does not treat a stopped object as an object whose focal position is to be adjusted and does not adjust the focal position on the object even in a case in which the object is located in the target region AR. On the other hand, in a case in which the moving object is located in the target region AR, that is, in a case in which the moving object reaches the target region AR, the focal position controller 34 adjusts the focal position on the object. Note that whether the object is moving can be determined based on the position information of the object by the object information acquisition unit 32. That is, in a case in which the position information of the objects continuous in time series changes, it can be determined that the object is moving.

Figure 6:
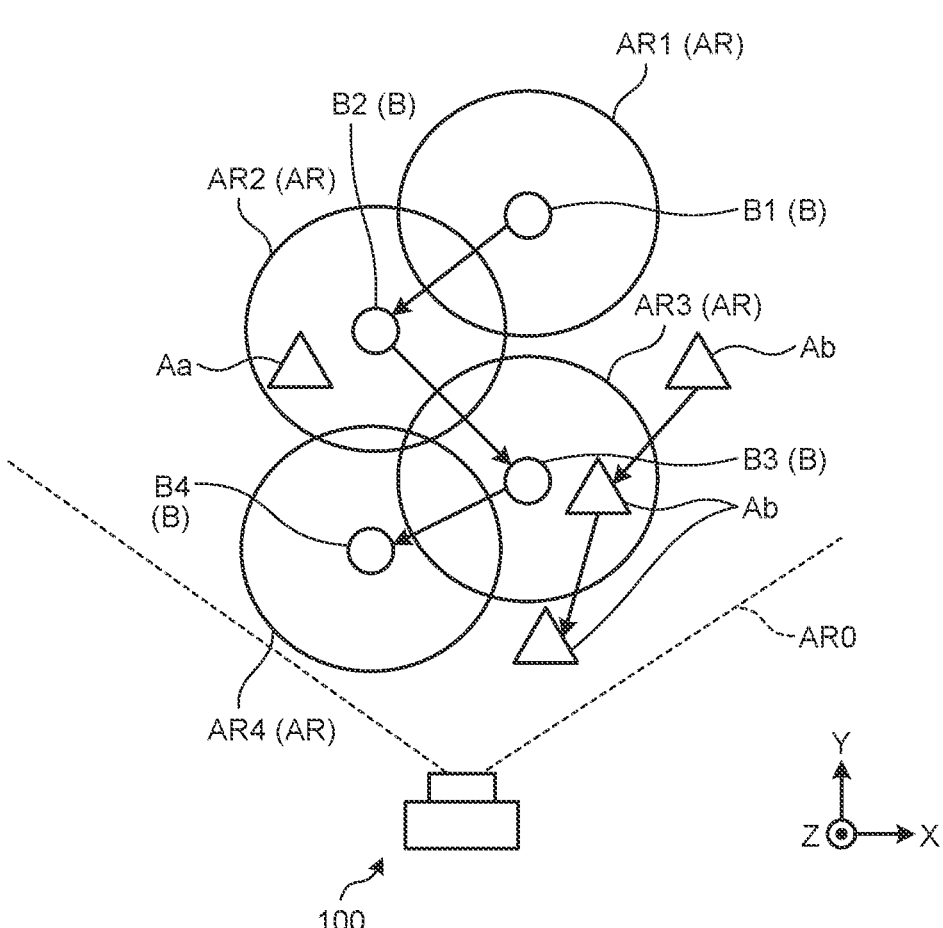
FIG. 6 is a schematic diagram for explaining an example of a target region according to a second embodiment.

An example of the above-described focal position setting processing will be described with reference to FIG. 6. FIG. 6 is a schematic diagram for explaining an example of a target region according to the second embodiment. FIG. 6 illustrates an example in a case in which the reference object B moves in an order of the position B1, the position B2, the position B3, and the position B4, and the target region AR is set as a region centered on the reference object B. In this case, the target region AR also moves with the movement of the reference object B. Hereinafter, the position of the target region AR at a timing when the reference object B is at the position B1 is referred to as a position AR1, the position of the target region AR at a timing when the reference object B is at the position B2 is referred to as a position AR2, the position of the target region AR at a timing when the reference object B is at the position B3 is referred to as a position AR3, and the position of the target region AR at a timing when the reference object B is at the position B4 is referred to as a position AR4. In the example of FIG. 6, since there is no object in the target region AR at the position AR1, the focal position controller 34 does not adjust the focal position on the object but adjusts the focal position on the preset setting position at a timing when the reference object B is at the position B1 (the target region AR is at the position AR1). In addition, the stopped object Aa is located in the target region AR at a timing when the target region AR moves from the position AR1 to the position AR2. In this case, since the object Aa is stopped and the stopped object Aa is located in the target region AR due to the movement of the target region AR, the focal position controller 34 does not set the focal position on the object Aa but sets the focal position on the preset setting position. Note that, since the preset setting position here is set based on the target region AR, the preset setting position also moves with the movement of the target region AR. The preset setting position preferably moves while maintaining the same position (a relative position) with respect to the target region AR.

The moving object Ab is located in the target region AR at a timing when the target region AR moves from the position AR2 to the position AR3. In this case, since the moving object Ab is located in the target region AR, the focal position controller 34 adjusts the focal position on the object Ab and continues to adjust the focal position on the object Ab while the object Ab is located in the target region AR. Thereafter, the object Ab is located outside the target region AR at a timing when the target region AR moves from the position AR3 to the position AR4. At a timing when the object Ab is located outside the target region AR, the focal position controller 34 removes the focal position from the object Ab and adjusts the focal position on the preset setting position.

Figure 7:
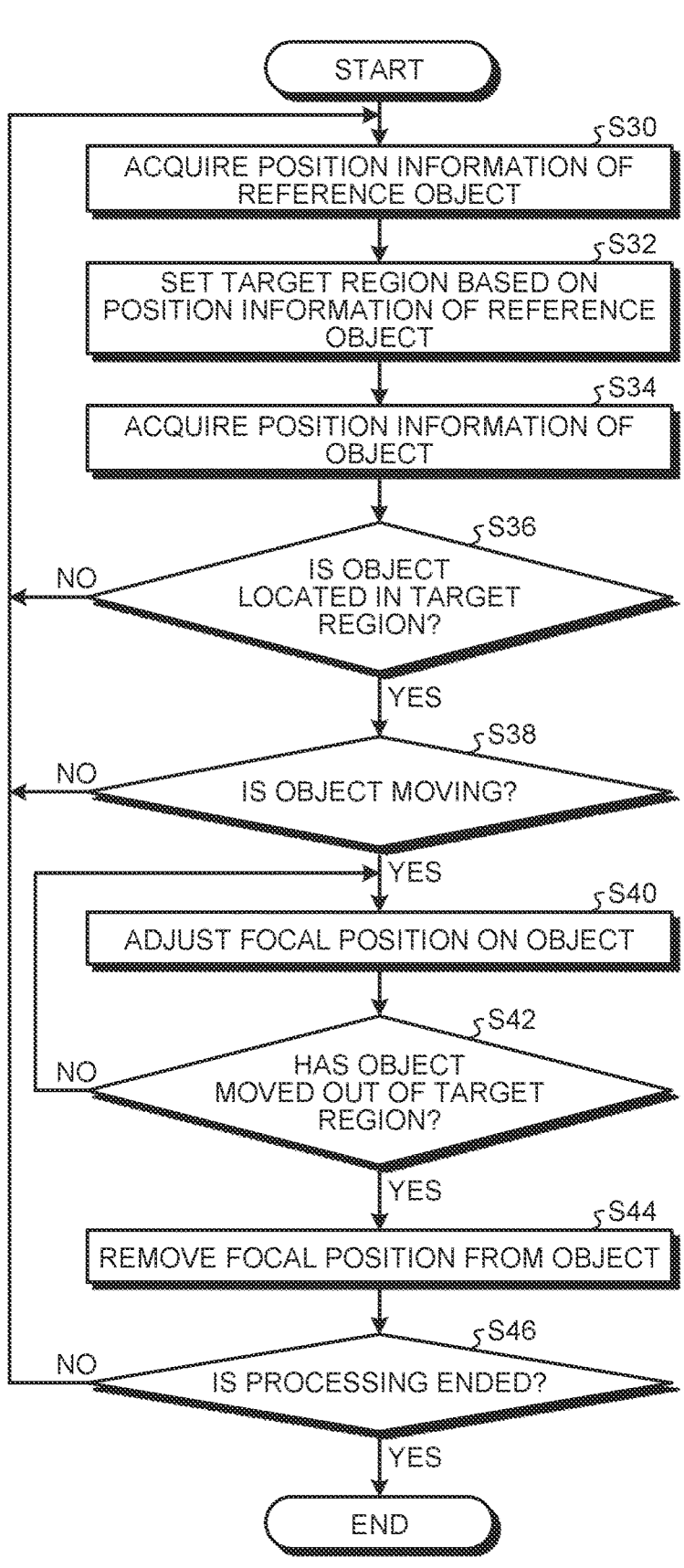
FIG. 7 is a flowchart for explaining a processing flow of adjusting a focal position.

Next, a processing flow of adjusting a focal position in the second embodiment will be described. FIG. 7 is a flowchart for explaining a processing flow of adjusting a focal position. As illustrated in FIG. 7, the controller 24 causes the object information acquisition unit 32 to acquire the position information of the reference object B (Step S30), and causes the target region acquisition unit 30 to set the target region AR based on the position information of the reference object B (Step S32). Then, the controller 24 causes the object information acquisition unit 32 to acquire the position information of the object (Step S34). An execution order of Steps S30, S32, and S34 may be arbitrary. The controller 24 causes the focal position controller 34 to determine whether the object is located in the target region AR based on the position information of the object (Step S36). In a case in which the object is not located in the target region AR (Step S36; No), the process returns to Step S30, and the acquisition of the position information of the object is continued while acquiring the position information of the reference object and updating the target region AR. On the other hand, in a case in which the object is located in the target region AR (Step S36; Yes), the focal position controller 34 determines whether the object is moving (Step S38). In a case in which the object in the target region AR does not move (Step S38; No), the process returns to Step S30, and the focal position controller 34 continues the acquisition of the position information of the object while acquiring the position information of the reference object and updating the target region AR. In a case in which the object in the target region AR is moving (Step S38; Yes), the focal position controller 34 adjusts the focal position on the object (Step S40). Thereafter, while the position information of the reference object is acquired and the target region AR is updated, the acquisition of the position information of the object is continued, and whether the object has moved to the outside of the target region AR is determined (Step S42). In a case in which the object does not move out of the target region AR (Step S42; No), that is, in a case in which the object continues to exist in the target region AR, the process returns to Step S40, and the focal position is kept on the object. In a case in which the object has moved to the outside of the target region AR (Step S42; Yes), the focal position controller 34 removes the focal position from the object (Step S44). Thereafter, in a case in which the processing is not ended (Step S46; No), the process returns to Step S30, and in a case in which the processing is ended (Step S46; Yes), this process ends.

As described above, in the second embodiment, the target region acquisition unit 30 sets the target region AR based on the position information of the moving reference object B. The target region acquisition unit 30 sets the target region AR such that the target region AR also moves with the movement of the reference object B. Therefore, for example, in a case in which a remarkable object moves in monitoring or the like, it is possible to appropriately focus on the vicinity of the moving object by moving the target region AR in accordance with the object.

Third Embodiment

Next, a third embodiment will be described. The third embodiment is different from the first embodiment in that a focal position is set to an object that exists in a target region AR and satisfies a predetermined condition. In the third embodiment, the description of portions having the same configuration as that of the first embodiment will be omitted. The third embodiment is also applicable to the first embodiment.

In the third embodiment, the focal position controller 34 sets the focal position of an object that exists in the target region AR and satisfies a predetermined condition. The focal position controller 34 does not set the focal position on the object that does not satisfy at least one of a condition that the object exists in the target region AR and a condition that the predetermined condition is satisfied. The focal position controller 34 keeps the focal position on the object while the object on the focal position continues to exist in the target region AR with satisfying a predetermined condition. On the other hand, in a case in which the object no longer satisfies at least one of the condition that the object exists in the target region AR and the condition that the predetermined condition is satisfied, the focal position controller 34 removes the focal position from the object. That is, for example, in a case in which the object satisfies the predetermined condition but moves out of the target region AR, or in a case in which the object exists in the target region AR but no longer satisfies the predetermined condition, the focal position controller 34 removes the focal position from the object.

The focal position controller 34 may determine whether the predetermined condition is satisfied by an arbitrary method, but for example, may determine whether the predetermined condition is satisfied based on at least one of the position information of the object or the image of the object. Here, the position information of the object may refer to a measurement result of the object position measurement unit 14, and the image of the object may refer to image data which is acquired by the imaging element 12 and in which the object is imaged.

The predetermined condition here may be any condition except a condition that the object does not exist in the target region AR. For example, the predetermined condition may be at least one of a condition that the object is performing a predetermined motion, a condition that the object has a predetermined shape, or a condition that the object is oriented in a predetermined direction. In addition, any two of these conditions may be set as the predetermined condition, or all of these conditions may be set as the predetermined condition. In a case in which multiple predetermined conditions are set, the focal position controller 34 determines that the predetermined conditions are satisfied in a case in which all the conditions are satisfied.

A case in which the motion of the object is set to a predetermined condition will be described. In this case, the focal position controller 34 determines whether the object is performing a predetermined motion based on the position information of the object continuously acquired in time series. The focal position controller 34 adjusts the focal position of the object existing in the target region AR and performing a predetermined motion. The focal position controller 34 does not adjust the focal position of the object that does not satisfy at least one of the condition that the object exists in the target region AR and the condition that the object performs the predetermined motion. The focal position controller 34 keeps the focal position on the object while the object on the focal position exists in the target region AR and continues the predetermined motion. On the other hand, in a case in which the object no longer satisfies at least one of the condition that the object exists in the target region AR and the condition that the object performs the predetermined motion, the focal position controller 34 removes the focal position from the object. Note that the motion of the object here refers to a moving mode of the object, and may refer to, for example, a moving direction and a moving speed of the object. For example, in a case in which the predetermined motion indicates that the object moves vertically downward at a speed of 10 m/h or more, the focal position controller 34 adjusts the focal position of the object moving vertically downward at a speed of 10 m/h or more in the target region AR. Note that the motion of the object is not limited to a motion indicating the moving direction and the moving speed of the object, and may indicate an arbitrary moving mode. For example, the motion of the object may refer to at least one of the moving direction and the moving speed of the object.

Figure 8:
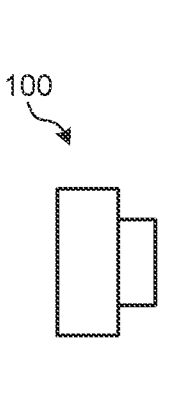
FIG. 8 is a schematic diagram illustrating an example of a case in which a motion of the object is set as a predetermined condition.
Figure 8:
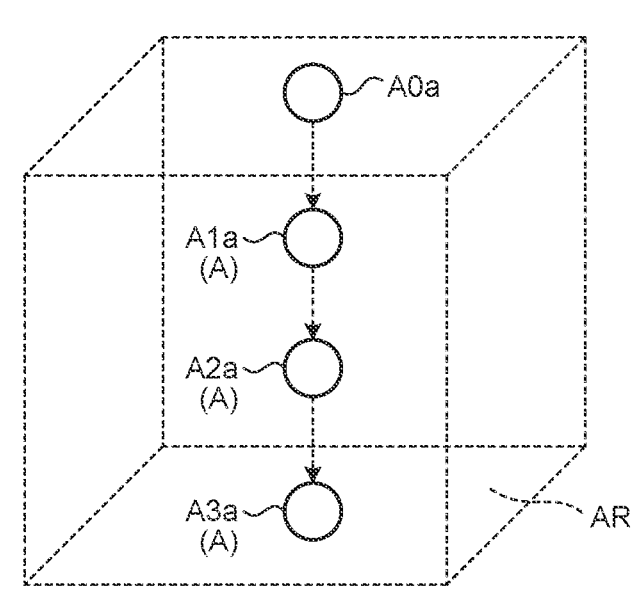

FIG. 8 is a schematic diagram illustrating an example of a case in which a motion of the object is set as a predetermined condition. In the example of FIG. 8, the predetermined condition is that the object moves vertically downward (in the direction opposite to the Z direction), that is, the moving direction of the object. Then, the example of FIG. 8 illustrates a case in which the object A moves vertically downward from the position A0*a* to the position A3*a* through the position A1*a* and the position A2*a* and stops at the position A3*a*. The position A0*a* is outside the target region AR, and the positions A1*a*, A2*a*, and A3*a* are inside the target region AR. In this case, since the object A is out of the target region AR at a timing when the object A exists at the position A0*a*, the focal position controller 34 does not adjust the focal position on the object A but, for example, adjusts the focal position on the preset setting position. Then, the focal position controller 34 adjusts the focal position on the object A at a timing when the object A exists at the position A1*a*, that is, at a timing when the object A enters the target region AR while moving vertically downward. The focal position controller 34 keeps the focal position on the object A even at a timing when the object A exists at the position A2*a*, and removes the focal position from the object A and returns the focal position to the preset setting position at a timing when the object A moves to the position A3*a* and stops.

Next, a case in which a shape of the object is set to a predetermined condition will be described. In this case, the focal position controller 34 determines whether the object has a predetermined shape based on the image data in which the object is captured. The focal position is adjusted on the object existing in the target region AR and having a predetermined shape. The focal position controller 34 does not adjust the focal position on the object that does not satisfy at least one of the condition that the object exists in the target region AR and the condition that the object has a predetermined shape. The focal position controller 34 keeps the focal position on the object while the object at the focal position has a predetermined shape and continues to exist in the target region AR. On the other hand, in a case in which the object no longer satisfies at least one of the condition that the object exists in the target region AR and the condition that the object has the predetermined shape, the focal position controller 34 removes the focal position from the object. The shape of the object here may be, for example, at least one of a size of the object or an outer shape of the object. For example, in a case in which the predetermined shape indicates a predetermined size or more, the focal position controller 34 adjusts the focal position on an object existing in the target region AR and having a predetermined size or more. Note that a 3D shape information acquired by the object information acquisition unit 32 may be used to acquire a shape information of the object.

A case in which the orientation of the object is set to a predetermined condition will be described. In this case, the focal position controller 34 determines whether the object is directed in a predetermined direction based on the image data in which the object is captured. The focal position is adjusted with respect to the object existing in the target region AR and facing the predetermined direction. The focal position controller 34 does not adjust the focal position on the object that does not satisfy at least one of the condition that the object exists in the target region AR and the condition that the object is directed in the predetermined direction. The focal position controller 34 keeps the focal position on the object during a period in which the object on the focal position is kept existing in the target region AR while facing the predetermined direction. On the other hand, in a case in which the object no longer satisfies at least one of the condition that the object exists in the target region AR and the condition that the object is directed in the predetermined direction, the focal position controller 34 removes the focal position from the object. Note that the information on the 3D shape acquired by the object information acquisition unit 32 may be used to acquire the information on the orientation of the object.

Note that the predetermined condition may be set by an arbitrary method, for example, may be set in advance. In this case, the focal position controller 34 may read information (for example, the moving direction and the moving speed) indicating a preset predetermined condition from the storage 22, or may acquire a predetermined condition from another device via the communication unit 20. Furthermore, for example, in a case in which a predetermined condition is not set in advance, the focal position controller 34 may automatically set a predetermined condition. Furthermore, for example, the user may set a predetermined condition. In this case, for example, the user may input information (for example, a moving direction and a moving speed) designating a predetermined condition to the input unit 16, and the focal position controller 34 may set a predetermined condition based on the information designated by the user.

As described above, in the third embodiment, the focal position controller 34 may set the focal position on the object existing in the target region AR and performing the predetermined motion. The focal position controller 34 keeps the focal position on the object during a period in which the object performs the predetermined motion, and removes the focal position from the object when the object no longer performs the predetermined motion. In this manner, in addition to being within the target region AR, satisfying a predetermined motion is also a condition for setting the focal position, whereby an object having a specific motion can be tracked and the focal position can be adjusted appropriately.

In the third embodiment, the focal position controller 34 may adjust the focal position on an object existing in the target region AR and having a predetermined shape. As described above, in addition to being in the target region AR, it is possible, by setting the predetermined shape as a condition for adjusting the focal position, to track an object having a specific shape and appropriately adjust the focal position.

In the third embodiment, the focal position controller 34 may adjust the focal position on an object existing in the target region AR and facing a predetermined direction. As described above, in addition to being in the target region AR, it is possible, by setting the condition that the object faces the predetermined direction as the condition for setting the focal position, to track the object in a specific direction and appropriately adjust the focal position.

Fourth Embodiment (Configuration of Imaging Device)

Figure 9:
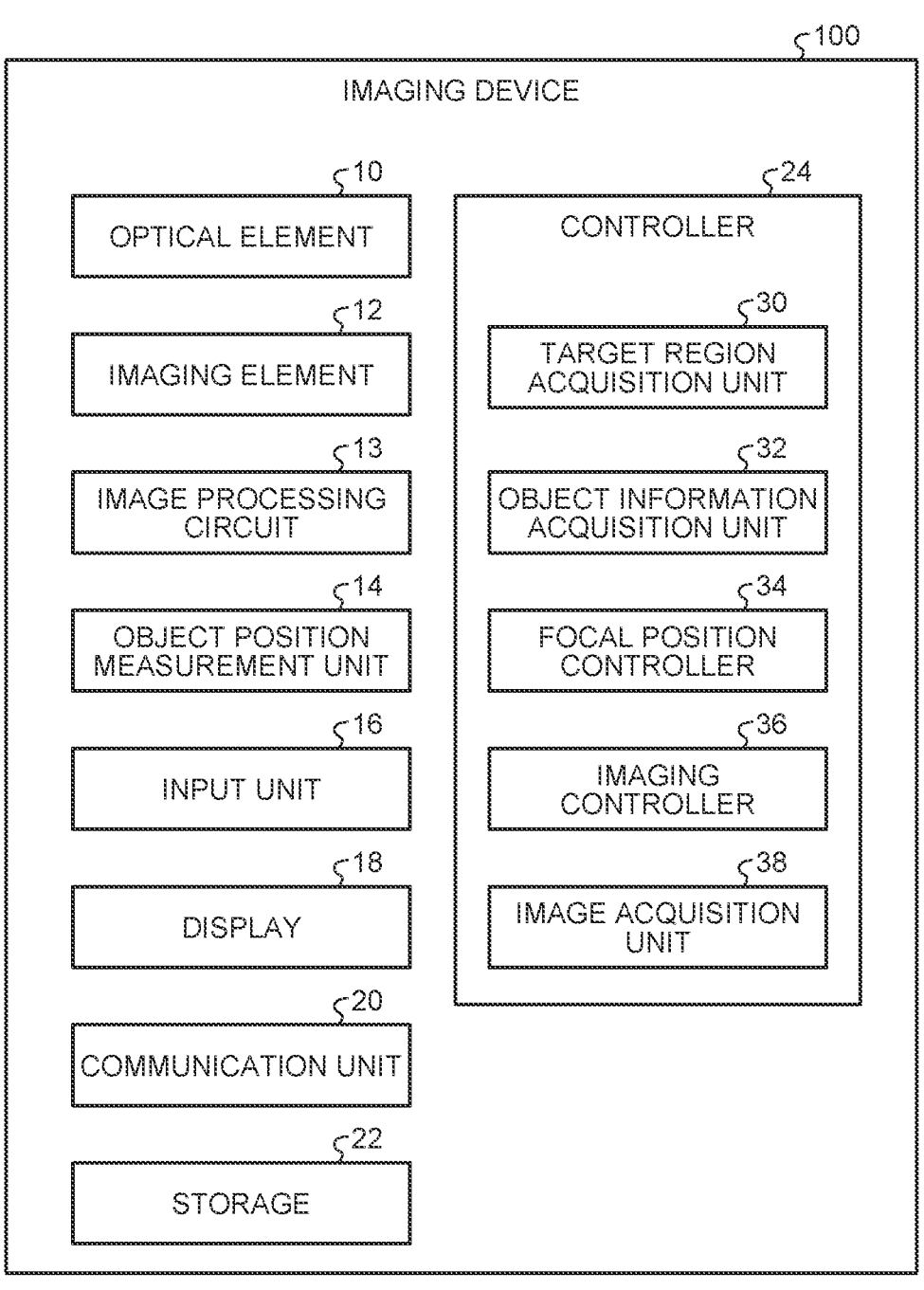
FIG. 9 is a schematic block diagram of an imaging device according to a fourth embodiment.

FIG. 9 is a schematic block diagram of an imaging device according to a fourth embodiment. An imaging device 100 according to the fourth embodiment is an imaging device that images an object within an imaging range. The imaging device 100 is an autofocus camera capable of automatically adjusting a focal position. The imaging device 100 may be a video camera that captures a moving image by capturing an image for each predetermined frame, or may be a camera that captures a still image. The imaging device 100 may be used for any purpose, and for example, may be used as a monitoring camera set at a predetermined position in facilities or outdoors.

As illustrated in FIG. 9, the imaging device 100 includes an optical element 10, an imaging element 12, an image processing circuit 13, an object position measurement unit 14, an input unit 16, a display 18, a communication unit 20, a storage 22, and a controller 24.

The optical element 10 is, for example, an element of an optical system such as a lens. The number of optical elements 10 may be one or plural.

The imaging element 12 is an element that converts light incident through the optical element 10 into an image signal that is an electric signal. The imaging element 12 is, for example, a charge coupled device (CCD) sensor, a complementary metal oxide semiconductor (CMOS) sensor, or the like.

The image processing circuit 13 generates image data for each frame from the image signal generated by the imaging element 12. The image data is, for example, data including information of luminance and color of each pixel in one frame, and may be data to which gradation for each pixel is assigned.

The object position measurement unit 14 is a sensor that measures a position of an object to be measured with respect to the imaging device 100 (a relative position of the object). The object here may be any object, and may be a living thing or an inanimate object, and it similarly applies to the following descriptions. In addition, the object here may refer to a movable object, but is not limited thereto, and may refer to an object that does not move.

In the present embodiment, the object position measurement unit 14 measures a distance from the imaging device 100 to the object as a relative position of the object. The object position measurement unit 14 may be any sensor capable of measuring the relative position of the object, and may be, for example, a time of flight (TOF) sensor. In a case in which the object position measurement unit 14 is a TOF sensor, for example, a light emitting element (for example, a light emitting diode (LED) that emits light and a light receiving unit that receives light are provided, and the distance to the object is measured by a flight time of the light emitted from the light emitting element to the object and returned to the light receiving unit. Note that, in addition to measuring the distance from the imaging device 100 to the object as the relative position of the object, the object position measurement unit 14 may also measure, for example, a direction in which the object exists with respect to the imaging device 100. In other words, the object position measurement unit 14 may measure, as the relative position of the object, the position (coordinates) of the object in the coordinate system in which the imaging device 100 is set as an origin.

The input unit 16 is a mechanism that receives an input (operation) from a user, and may be, for example, a button, a keyboard, a touch panel, or the like.

The display 18 is a display panel that displays an image. In addition to the image captured by the imaging device 100, the display 18 may be capable of displaying an image for the user to set a target region AR described later.

The communication unit 20 is a communication module that communicates with an external device, and may be, for example, an antenna, a Wi-Fi (registered trademark) module, or the like. Although the imaging device 100 communicates with an external device by wireless communication, wired communication may be used, and a communication method may be arbitrary.

The storage 22 is a memory that stores captured image data and various types of information such as calculation contents and programs of the controller 24, and includes at least one of, for example, a random access memory (RAM), a main storage device such as a read only memory (ROM), or an external storage device such as a hard disk drive (HDD). The program for the controller 24 stored in the storage 22 may be stored in a recording medium readable by the imaging device 100.

The controller 24 is an arithmetic device, and includes, for example, an arithmetic circuit such as a central processing unit (CPU). The controller 24 includes a target region acquisition unit 30, an object information acquisition unit 32, a focal position controller 34, an imaging controller 36, and an image acquisition unit 38. The controller 24 reads and executes a program (software) from the storage 22 to implement the target region acquisition unit 30, the object information acquisition unit 32, the focal position controller 34, the imaging controller 36, and the image acquisition unit 38, and executes these processes. Note that the controller 24 may execute these processes by one CPU, or may include multiple CPUs and execute the processes by the multiple CPUs. In addition, at least a part of the processing of the target region acquisition unit 30, the object information acquisition unit 32, the focal position controller 34, the imaging controller 36, and the image acquisition unit 38 may be implemented by a hardware circuit.

(Target Region Acquisition Unit)

The target region acquisition unit 30 acquires information of a target region AR set in the imaging region of the imaging device 100. The target region AR is a region set to adjust the focal position automatically. The information of the target region AR refers to shape information and movement information of the target region AR, which will be described later in detail. Hereinafter, the target region AR will be described.

Figure 10:
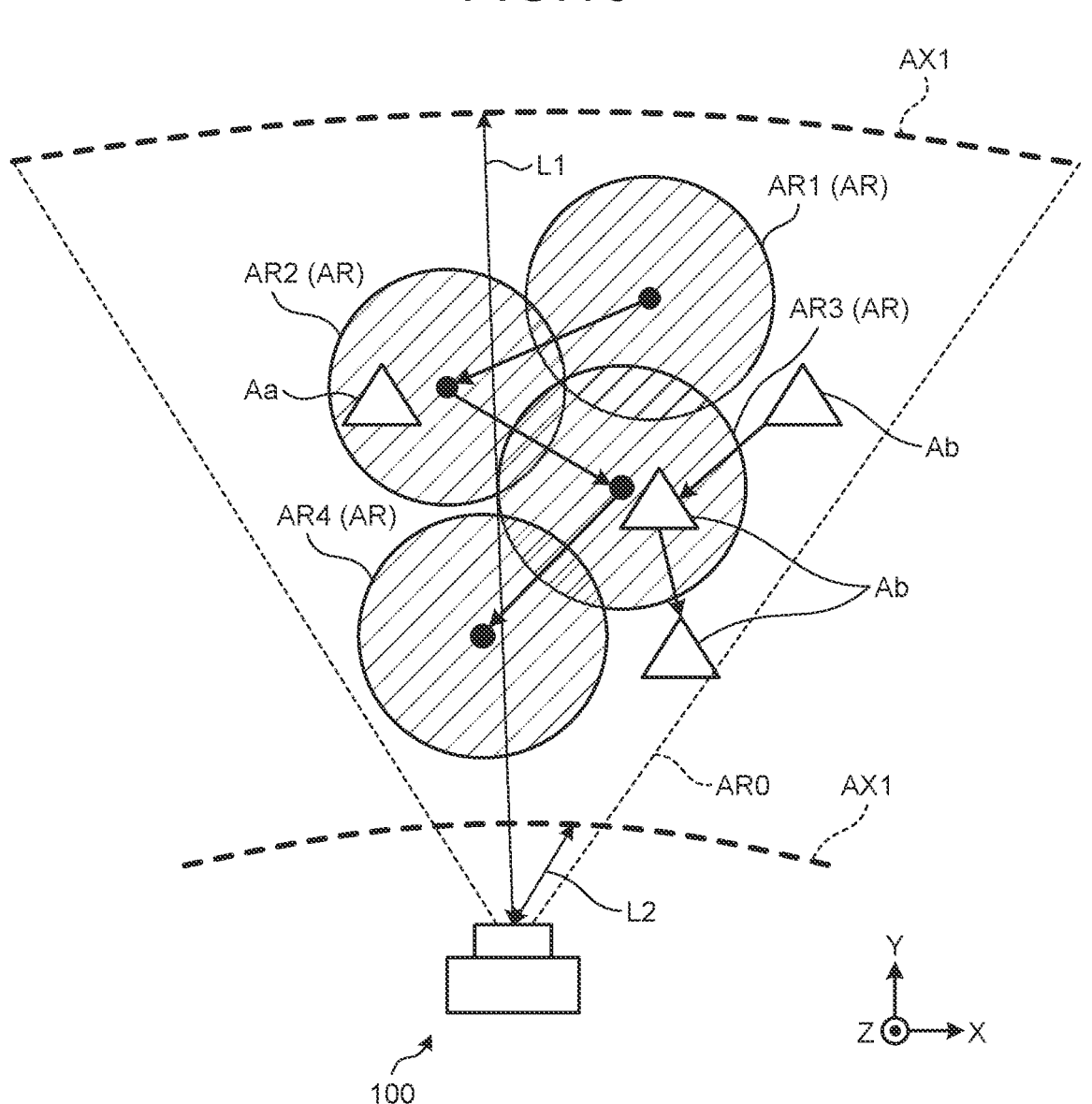
FIG. 10 is a schematic diagram for explaining an example of a target region.
Figure 11:
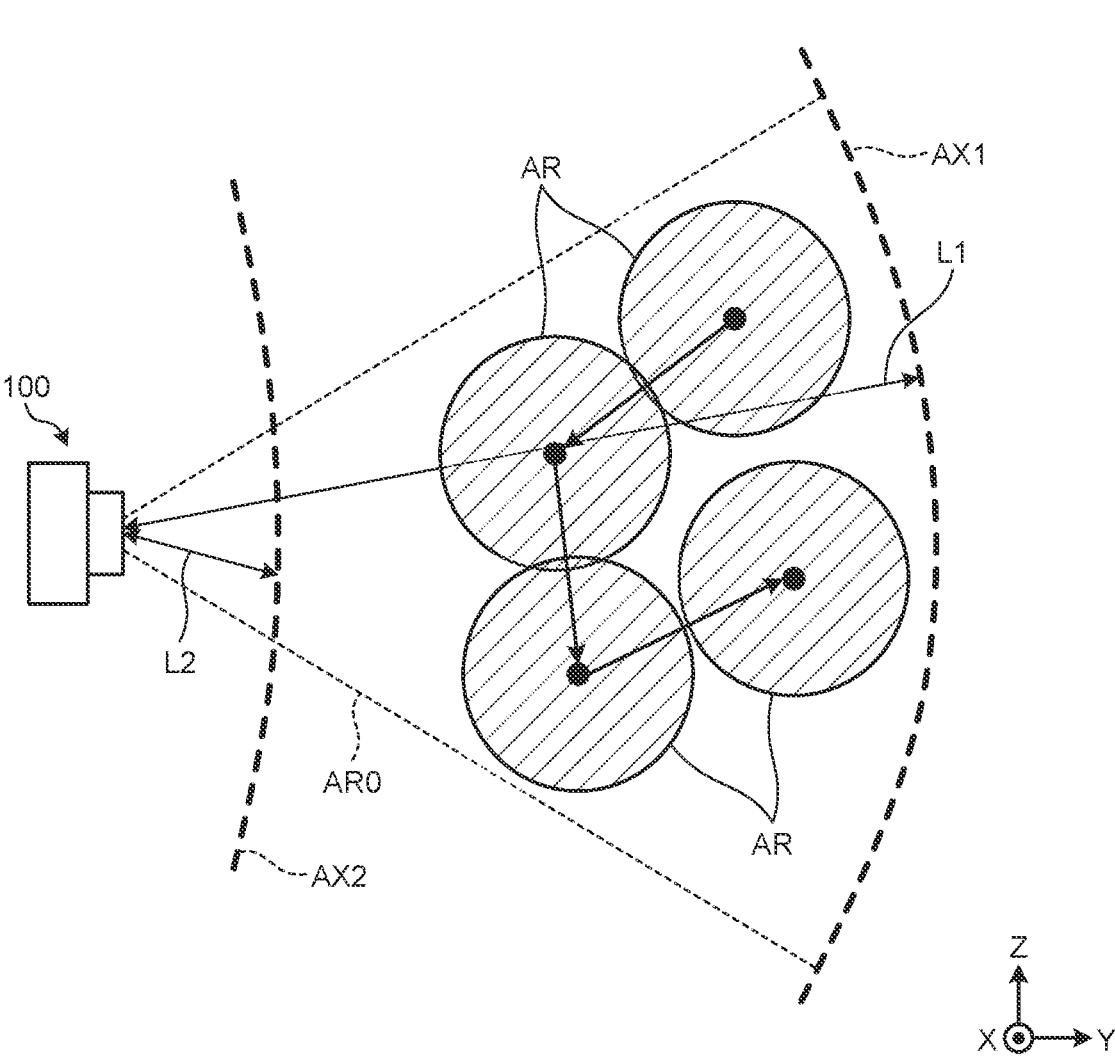
FIG. 11 is a schematic diagram for explaining an example of the target region.

FIGS. 10 and 11 are schematic diagrams for explaining an example of a target region. FIG. 10 is a diagram of the imaging device 100 and the target region AR as viewed from above in a vertical direction, and FIG. 11 is a diagram of the imaging device 100 and the target region AR as viewed from a horizontal direction.

Hereinafter, the direction Z is a vertical direction, the direction X is one direction of a horizontal direction orthogonal to the direction Z, and the direction Y is a direction (horizontal direction) orthogonal to the direction Z and the direction X. As illustrated in FIGS. 10 and 11, a range in which an image can be captured by the imaging device 100 is set as an imaging region AR0. The imaging region AR0 refers to a region (space) within an angle of view of the imaging element 12, in other words, a range that can be captured in the real space. The target region AR is a region (space) set within the range of the imaging region AR0.

The target region acquisition unit 30 sets the target region AR such that the target region AR moves within the imaging region AR0. The target region acquisition unit 30 acquires the shape information and the movement information of the target region AR, and sets the target region AR such that the target region AR moves within the imaging region AR0 based on the shape information and the movement information of the target region AR. The shape information of the target region AR is information indicating a shape and a size of the target region AR, and the movement information of the target region AR is information indicating how the target region AR moves. The movement information of the target region AR may be, for example, a position of a reference coordinate of the target region AR for each time, the initial position of the reference coordinate of the target region AR, and the moving direction and the moving speed of the reference coordinate of the target region AR. Note that the reference coordinate here is a center coordinate of the target region AR, and the target region AR is set as a circular (spherical) region having a predetermined radius around the reference coordinate. The target region acquisition unit 30 preferably moves the target region AR so that a shape and a size of the target region AR are kept the same.

More specifically, the target region AR is preferably set so as to be located in a region between a first position AX1 and a second position AX2 in the imaging region AR0. In other words, the target region AR is preferably set to move within the region between the first position AX1 and the second position AX2 within the imaging region AR0 (in other words, not to go out of this region). The first position AX1 is a position where the distance from the imaging device 100 is a first distance L1, and the second position AX2 is a position where the distance from the imaging device 100 is a second distance L2 shorter than the first distance L1. As illustrated in FIGS. 10 and 11, in the present embodiment, the first position AX1 can be said to be a virtual plane including each position (coordinate) at which the distance from the imaging device 100 is a first distance L1 in the imaging region AR0. Similarly, the second position AX2 can be said to be a virtual plane including each position (coordinate) at which the distance from the imaging device 100 is a second distance L2 in the imaging region AR0. That is, in the imaging region AR0, the target region AR may be set to move in a space surrounded by a virtual plane whose distance from the imaging device 100 is the second distance L2 and a virtual plane whose distance from the imaging device 100 is the first distance L1. Note that the first position AX1 is not limited to a virtual plane in which all positions (coordinates) included in the first position AX1 become the first distance L1 from the imaging device 100, and may be a virtual plane in which at least some positions (coordinates) included in the first position AX1 become the first distance L1 from the imaging device 100. Similarly, the second position AX2 may be a virtual plane in which at least a part of the position (coordinates) included in the second position AX2 is a second distance L2 from the imaging device 100.

Note that the size and the shape of the target region AR are not limited to the above description and may be arbitrary, and may not be a circular (spherical) region having a predetermined radius around the reference coordinate. Furthermore, in the above description, the target region AR is a region set in the imaging region AR0, but the present invention is not limited thereto. For example, when a range that can be measured by the object position measurement unit 14 is a distance measurement region (a distance measurement space), the target region AR may be a region set in the distance measurement region. In this case, the imaging region AR0 in FIGS. 10 and 11 may be treated as a distance measurement region.

The target region acquisition unit 30 may acquire shape information and movement information of the target region AR by an arbitrary method. For example, the shape information and the movement information of the target region AR may be set in advance. In this case, the target region acquisition unit 30 may read the shape information and the movement information of the target region AR set in advance from the storage 22, or may acquire the shape information and the movement information of the target region AR from another device via the communication unit 20. Furthermore, for example, in a case in which the shape information and the movement information of the target region AR are not set in advance, the target region acquisition unit 30 may automatically set the shape information and the movement information of the target region AR. Furthermore, for example, the user may set the shape information and the movement information of the target region AR. In this case, for example, the user may input the shape information and the movement information (for example, a size of the target region AR and a position of the reference coordinate for each time) of the target region AR to the input unit 16, and the target region acquisition unit 30 may set the target region AR based on the shape information and the movement information of the target region AR designated by the user.

(Object Information Acquisition Unit)

The object information acquisition unit 32 acquires position information of an object existing in the imaging region AR0. The object information acquisition unit 32 controls the object position measurement unit 14 to cause the object position measurement unit 14 to measure a relative position of the object with respect to the imaging device 100. The object information acquisition unit 32 acquires a measurement result of the relative position of the object with respect to the imaging device 100 by the object position measurement unit 14 as position information of the object. The object information acquisition unit 32 sequentially acquires the position information of the object by acquiring the position information of the object every predetermined time. Furthermore, the object information acquisition unit 32 can also acquire information indicating a shape of the object (for example, a 3D shape of the object) based on the position information of the object. For example, the object information acquisition unit 32 can acquire the 3D shape of the object by accumulating multiple pieces of position information such as TOF image information.

(Focal Position Controller)

The focal position controller 34 sets the focal position of the imaging device 100. The focal position controller 34 controls the focal position by controlling a position of the optical element 10, that is, by moving the position of the optical element 10.

The focal position controller 34 adjusts the focal position on the object existing in the target region AR. The object here preferably refers to a moving object. The focal position controller 34 sets the focal position at a position of the object determined to exist in the target region AR. In the present embodiment, the focal position controller 34 determines whether the object exists in the target region AR based on the position information of the object acquired by the object information acquisition unit 32. In a case in which the position of the object acquired by the object information acquisition unit 32 overlaps with the position of the target region AR at that timing, the focal position controller 34 determines that the object exists in the target region AR and adjusts the focal position on the position of the object acquired by the object information acquisition unit 32. On the other hand, the focal position controller 34 does not adjust the focal position of an object that does not exist in the target region AR.

The focal position controller 34 keeps the focal position on the object during a period in which the object on the focal position exists in the target region AR. That is, the focal position controller 34 determines whether or not the object continues to exist in the target region AR based on the position information of the object at every predetermined time acquired by the object information acquisition unit 32, and keeps the focal position on the object during the period in which the object continues to exist in the target region AR. On the other hand, in a case in which the object on the focal position moves out of the target region AR, that is, in a case in which the object no longer exists in the target region AR, the focal position controller 34 takes the focal position out of the object and focuses on a position other than the object.

Note that the focal position controller 34 may not set the focal position of the object existing in the target region AR from the start of the operation of the imaging device 100 (a timing at which the imaging becomes possible). That is, the focal position controller 34 may adjust the focal position of the object entering the target region AR after starting the operation. In other words, the focal position controller 34 may set, for an object that exists in the target region AR at a certain timing but does not exist in the target region AR at a timing before the certain timing, the focal position of the object from a timing at which the object starts to exist in the target region AR. In other words, in a case in which the object moves from the outside of the target region AR into the target region AR, the object may be recognized as a target on which the focal position controller 34 focuses. That is, the focal position controller 34 may set the focal position of the object moved from the outside of the target region AR into the target region AR.

Furthermore, in a case in which there is no object in the target region AR, the focal position controller 34 may set the focal position to a preset setting position. The preset setting position may be arbitrarily set, but is preferably set in the target region AR such as a center position of the target region AR.

In addition, it is preferable that the focal position controller 34 does not set the focal position on the stopped object but sets the focal position on the moving object. More specifically, in a case in which a stopped (not moving) object is located in the target region AR due to the movement of the target region AR, the focal position controller 34 does not adjust the focal position on the object. That is, the focal position controller 34 does not treat a stopped object as an object whose focal position is to be adjusted and does not adjust the focal position on the object even in a case in which the object is located in the target region AR. On the other hand, in a case in which the moving object is located in the target region AR, that is, in a case in which the moving object reaches the target region AR, the focal position controller 34 adjusts the focal position on the object. Note that whether the object is moving can be determined based on the position information of the object by the object information acquisition unit 32. That is, in a case in which the position information of the objects continuous in time series changes, it can be determined that the object is moving.

An example of the above-described focal position setting processing will be described with reference to FIG. 10. FIG. 10 exemplifies a case in which the target region AR moves in an order of a position AR1, a position AR2, a position AR3, and a position AR4. In the example of FIG. 10, since there is no object in the target region AR at the position AR1, the focal position controller 34 does not adjust the focal position on the object but adjusts the focal position on the preset setting position at a timing when the target region AR is at the position AR1. In addition, the stopped object Aa is located in the target region AR at a timing when the target region AR moves from the position AR1 to the position AR2. In this case, since the object Aa is stopped and the stopped object Aa is located in the target region AR due to the movement of the target region AR, the focal position controller 34 does not adjust the focal position on the object Aa but adjusts the focal position on the preset setting position. Note that, since the preset setting position here is set based on the target region AR, the preset setting position also moves with the movement of the target region AR. The setting position preferably moves while maintaining the same position (a relative position) with respect to the target region AR.

The moving object Ab is located in the target region AR at a timing when the target region AR moves from the position AR2 to the position AR3. In this case, since the moving object Ab enters the target region AR, the focal position controller 34 adjusts the focal position on the object Ab and continues to adjust the focal position on the object Ab while the object Ab is located in the target region AR. Thereafter, the object Ab moves to the outside of the target region AR at a timing when the target region AR moves from the position AR3 to the position AR4. At a timing when the object Ab moves out of the target region AR, the focal position controller 34 removes the focal position from the object Ab and adjusts the focal position on the preset setting position. That is, the focal position controller 34 adjusts the focal position on the object Ab from the timing at which the moving object Ab enters the target region AR, moves the focal position to the moving object Ab while the object Ab moves in the target region AR, and removes the focal position from the object Ab at the timing at which the object Ab moves out of the target region AR.

Note that the focal position may be set by the user. In this case, for example, an auto mode in which the focal position is automatically adjusted and a manual mode in which the focal position is adjusted by the user may be switchable. Then, in a case of the auto mode, the focal position is adjusted by the focal position controller 34 as described above. On the other hand, in a case of the manual mode, the user inputs an operation of adjusting the focal position to the input unit 16, and the focal position controller 34 adjusts the focal position according to the user's operation.

(Imaging Controller)

The imaging controller 36 controls imaging by the imaging device 100 to capture an image. The imaging controller 36 controls, for example, the imaging element 12 to cause the imaging element 12 to acquire an image signal. For example, the imaging controller 36 may cause the imaging element 12 to automatically acquire the image signal, or may cause the imaging element to acquire the image signal according to a user's operation.

(Image Acquisition Unit)

The image acquisition unit 38 acquires image data acquired by the imaging element 12. For example, the image acquisition unit 38 controls the image processing circuit 13 to cause the image processing circuit 13 to generate image data from the image signal generated by the imaging element 12, and acquires the image data. The image acquisition unit 38 stores the image data in the storage 22.

(Setting Flow of Focal Position)

Figure 12:
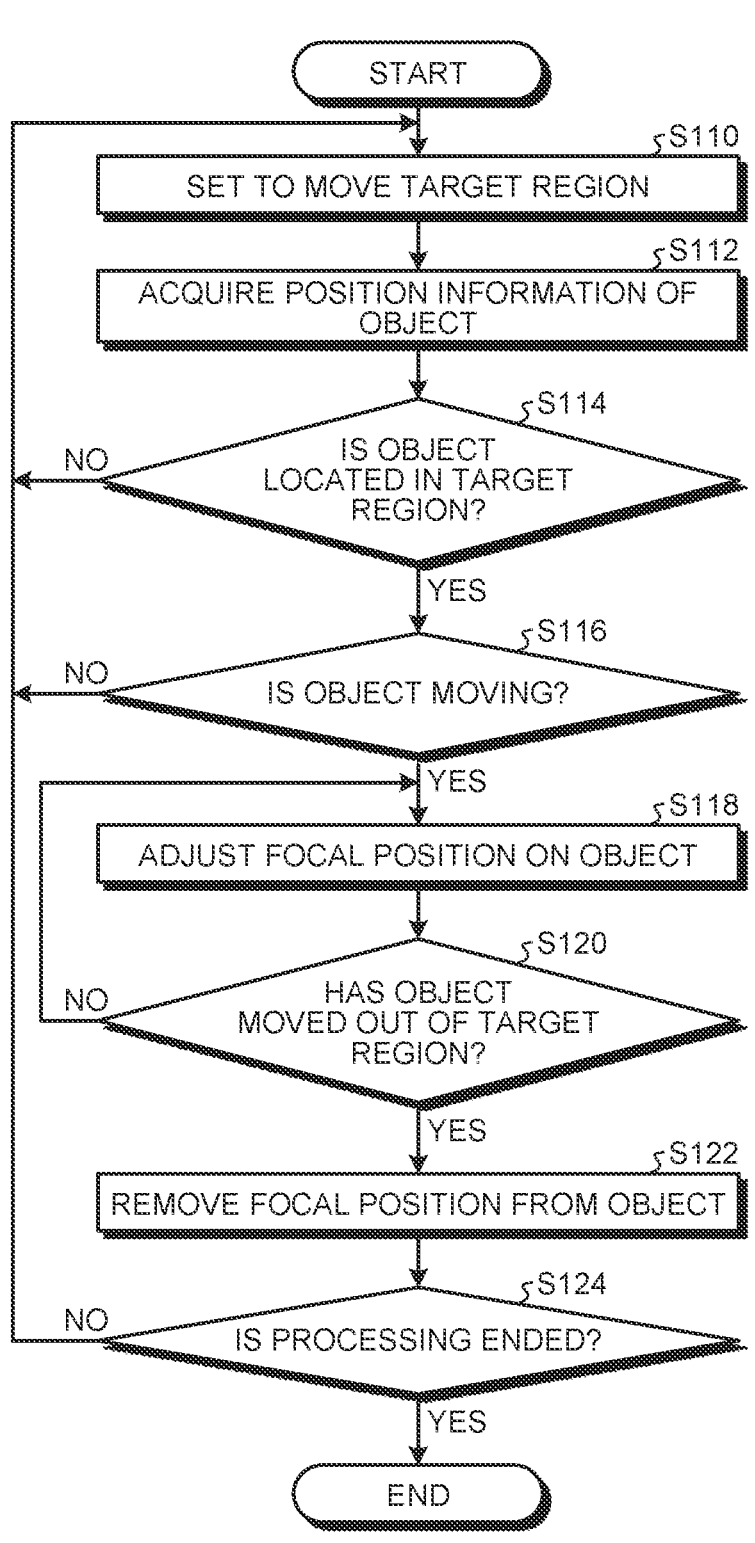
FIG. 12 is a flowchart for explaining a processing flow of adjusting a focal position.

Next, a processing flow of setting the focal position described above will be described. FIG. 12 is a flowchart for explaining a processing flow of adjusting a focal position. As illustrated in FIG. 12, the controller 24 causes the target region acquisition unit 30 to set target region AR such that target region AR moves (Step S110). Then, the controller 24 causes the object information acquisition unit 32 to acquire the position information of the object (Step S112). An execution order of Steps S110 and S112 may be arbitrary. The controller 24 causes the focal position controller 34 to determine whether the object is located in the target region AR based on the position information of the object (Step S114). In a case in which the object is not located in the target region AR (Step S114; No), the process returns to Step S110, and acquisition of the position information of the object is continued while updating the target region AR (that is, while moving the target region AR). On the other hand, in a case in which the object is located in the target region AR (Step S114; Yes), the focal position controller 34 determines whether the object is moving (Step S116). In a case in which the object in the target region AR does not move (Step S116; No), the process returns to Step S110 without adjusting the focal position on the object, and the focal position controller 34 continues the acquisition of the position information of the object while updating the target region AR. In a case in which the object in the target region AR is moving (Step S116; Yes), the focal position controller 34 adjusts the focal position on the object (Step S118). Thereafter, while the position information of the reference object is acquired and the target region AR is updated, the acquisition of the position information of the object is continued, and whether the object has moved to the outside of the target region AR is determined (Step S120). In a case in which the object does not move out of the target region AR (Step S120; No), that is, in a case in which the object continues to exist in the target region AR, the process returns to Step S118, and the focal position is kept on the object. In a case in which the object has moved to the outside of the target region AR (Step S120; Yes), the focal position controller 34 removes the focal position from the object (Step S122). Thereafter, in a case in which the processing is not ended (Step S124; No), the process returns to Step S110, and in a case in which the processing is ended (Step S124; Yes), this process ends.

(Effects)

As described above, the imaging device 100 according to the present embodiment includes the imaging element 12, the object information acquisition unit 32, the target region acquisition unit 30, and the focal position controller 34. The object information acquisition unit 32 acquires the position information of the object existing in the imaging region AR0 of the imaging element 12. The target region acquisition unit 30 sets the target region AR to move within the imaging region AR0. In a case in which an object exists in the target region AR, the focal position controller 34 controls the focal position of the imaging device 100 so as to adjust the focal position on the object.

Here, in an autofocus imaging device, it is required to adjust a focal position appropriately. On the other hand, the imaging device 100 according to the present embodiment sets the target region AR to be moved, and in a case in which an object exists in the target region AR, controls the focal position of the imaging device 100 so as to adjust the focal position on the object. Therefore, for example, in a case in which a remarkable region in monitoring or the like changes in time series, the focus can be appropriately adjusted in accordance with the change.

In a case in which a non-moving object is located in the target region AR, the focal position controller 34 may not adjust the focal position on the object, and in a case in which a moving object is located in the target region AR, the focal position controller 34 may adjust the focal position on the object. Therefore, it is possible to prevent the focal position from being adjusted to the stationary object that has entered the region due to the movement of the target region AR, and to appropriately adjust the focal position on the moving object that has entered the target region AR.

The target region acquisition unit 30 may set the target region AR such that the target region AR is located between a first position AX1 at which a distance from the imaging device 100 is a first distance L1 and a second position AX2 at which a distance from the imaging device 100 is a second distance L2 shorter than the first distance L1. Therefore, the focal position can be appropriately adjusted with respect to the object entering the target region AR.

Fifth Embodiment

Next, a fifth embodiment will be described. The fifth embodiment is different from the fourth embodiment in that a target region AR is set based on position information of a moving reference object B. In the fifth embodiment, the description of portions having the same configuration as that of the fourth embodiment will be omitted.

Figure 13:
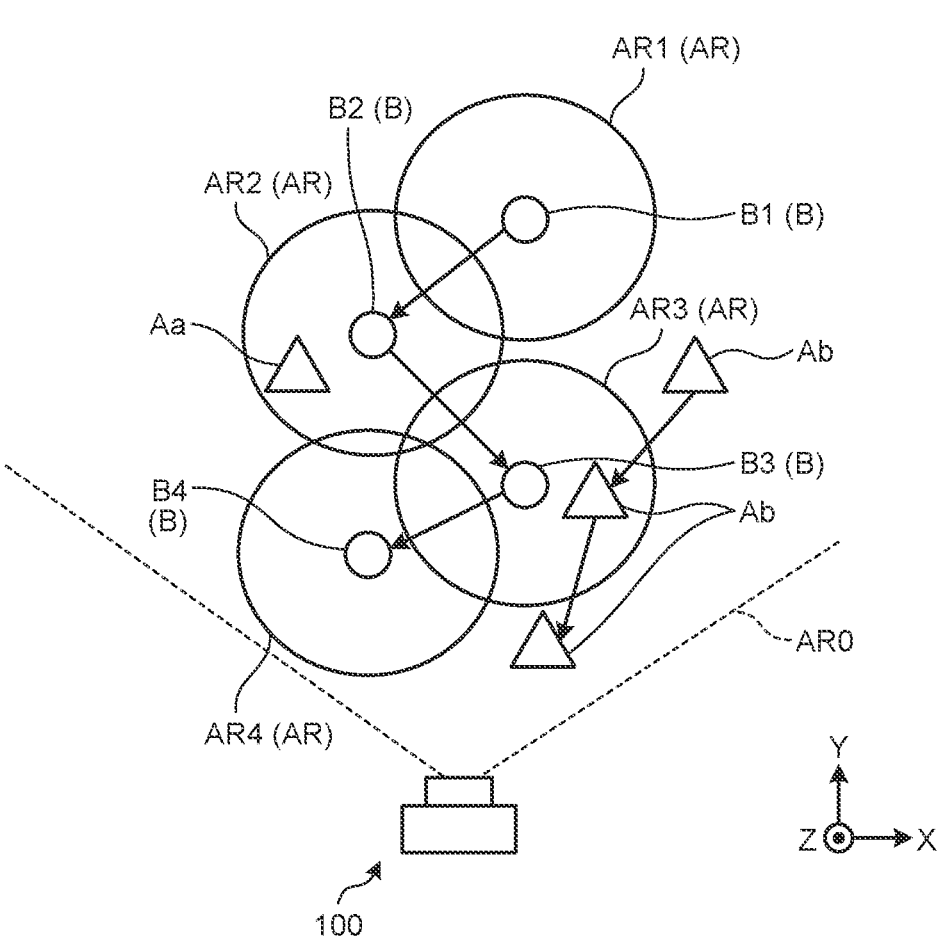
FIG. 13 is a schematic diagram for explaining an example of a target region according to a fifth embodiment.

FIG. 13 is a schematic diagram for explaining an example of a target region according to the fifth embodiment. As illustrated in FIG. 13, in the fifth embodiment, the target region acquisition unit 30 sets the target region AR based on the position information of a moving reference object B. The reference object B is an object located in the imaging region AR0, which is a reference for position setting of the target region AR, and is a moving object.

The reference object B may be an object located between the first position AX1 and the second position AX2 in the imaging region AR0. However, the reference object B is not limited to being located between the first position AX1 and the second position AX2, and may be located at any position.

The reference object B may be set by any method, and for example, the target region acquisition unit 30 may automatically set the reference object B. In this case, for example, the target region acquisition unit 30 may select the reference object B from objects located in the imaging region AR0 by an arbitrary method. Further, for example, the reference object B may be set by a user. In this case, for example, the user may input information for selecting the reference object B to the input unit 16, and the target region acquisition unit 30 may set the reference object B based on the information for designating the reference object B designated by the user. In this case, for example, the image in the imaging region AR0 may be displayed on the display 18 in real time, and the user may input information for selecting the reference object B by selecting the image of the reference object B from among the objects shown in the image in the imaging region AR0.

The target region acquisition unit 30 sets the target region AR based on the position information of the reference object B acquired by the object information acquisition unit 32. In the present embodiment, the target region acquisition unit 30 sets a region (space) having a predetermined size around the reference object B, that is, a region having a predetermined size including the position of the reference object B in a range, as the target region AR. In the example of FIG. 13, the target region acquisition unit 30 sets a circle (a sphere in this case) having a predetermined radius centered on the position of the reference object B as the target region AR. Furthermore, in the present embodiment, since the reference object B is located in the region AR0$a$ between the first position AX1 and the second position AX2 as described above, the target region AR is also located in the region AR0$a$ between the first position AX1 and the second position AX2. However, the target region AR is not limited to being set in a spherical shape centered on the position of the reference object B, and may be a region arbitrarily set based on the position information of the reference object B. Further, the target region AR may not be located in the region AR0$a$ between the first position AX1 and the second position AX2.

Figure 14:
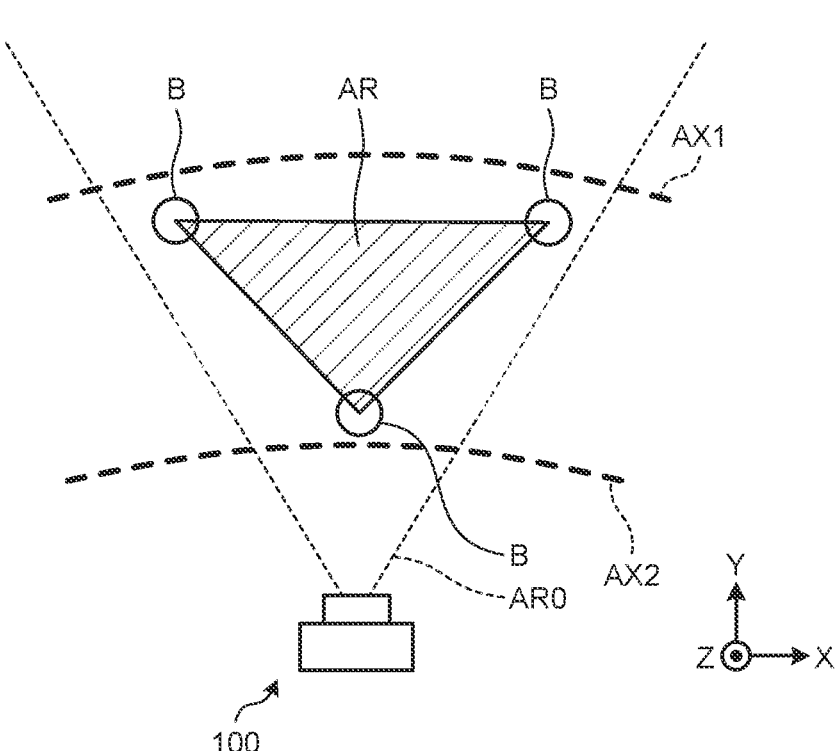
FIG. 14 is a schematic diagram illustrating an example of a case in which multiple reference objects are set.

FIG. 14 is a schematic diagram illustrating an example in a case in which multiple reference objects are set. Multiple reference objects B may be set. In this case, the target region acquisition unit 30 sets the target region AR based on the position information of the multiple reference objects B. For example, as illustrated in FIG. 14, the target region acquisition unit 30 may set a region (space) surrounded by the multiple reference objects B as the target region AR.

Since the reference object B moves as described above, the object information acquisition unit 32 sequentially acquires the position information of the reference object B. The target region acquisition unit 30 sequentially sets the target region AR based on the position information of the reference object B acquired by the object information acquisition unit 32. The target region acquisition unit 30 sets the target region AR such that the target region AR also moves with the movement of the reference object B, that is, moves with the change in the position information of the reference object B. The target region acquisition unit 30 preferably sets the target region AR such that the target region AR also moves while maintaining the same position (a relative position) of the target region AR with respect to the reference object B. That is, it can be said that the target region acquisition unit 30 sequentially updates the position of the target region AR while maintaining the same position of the target region AR with respect to the reference object B as the reference object B moves.

An example of the above-described focal position setting processing will be described with reference to FIG. 13. FIG. 13 illustrates an example in a case in which the reference object B moves in an order of the position B1, the position B2, the position B3, and the position B4, and the target region AR is set as a region centered on the reference object B. In this case, the target region AR also moves with the movement of the reference object B. Hereinafter, the position of the target region AR at a timing when the reference object B is at the position B1 is referred to as a position AR1, the position of the target region AR at a timing when the reference object B is at the position B2 is referred to as a position AR2, the position of the target region AR at a timing when the reference object B is at the position B3 is referred to as a position AR3, and the position of the target region AR at a timing when the reference object B is at the position B4 is referred to as a position AR4. In the example of FIG. 13, since there is no object in the target region AR at the position AR1, the focal position controller 34 does not adjust the focal position on the object but adjusts the focal position on the preset setting position at a timing when the reference object B is at the position B1 (the target region AR is at the position AR1). In addition, the stopped object Aa is located in the target region AR at a timing when the target region AR moves from the position AR1 to the position AR2. In this case, since the object Aa is stopped and the stopped object Aa is located in the target region AR due to the movement of the target region AR, the focal position controller 34 does not adjust the focal position on the object Aa but adjusts the focal position on the preset setting position. Note that, since the preset setting position here is set based on the target region AR, the preset setting position also moves with the movement of the target region AR. The preset setting position preferably moves while maintaining the same position (a relative position) with respect to the target region AR.

The moving object Ab is located in the target region AR at a timing when the target region AR moves from the position AR2 to the position AR3. In this case, since the moving object Ab is located in the target region AR, the focal position controller 34 adjusts the focal position on the object Ab and continues to adjust the focal position on the object Ab while the object Ab is located in the target region AR. Thereafter, the object Ab is located outside the target region AR at a timing when the target region AR moves from the position AR3 to the position AR4. At a timing when the object Ab is located outside the target region AR, the focal position controller 34 removes the focal position from the object Ab and adjusts the focal position on the preset setting position.

Figure 15:
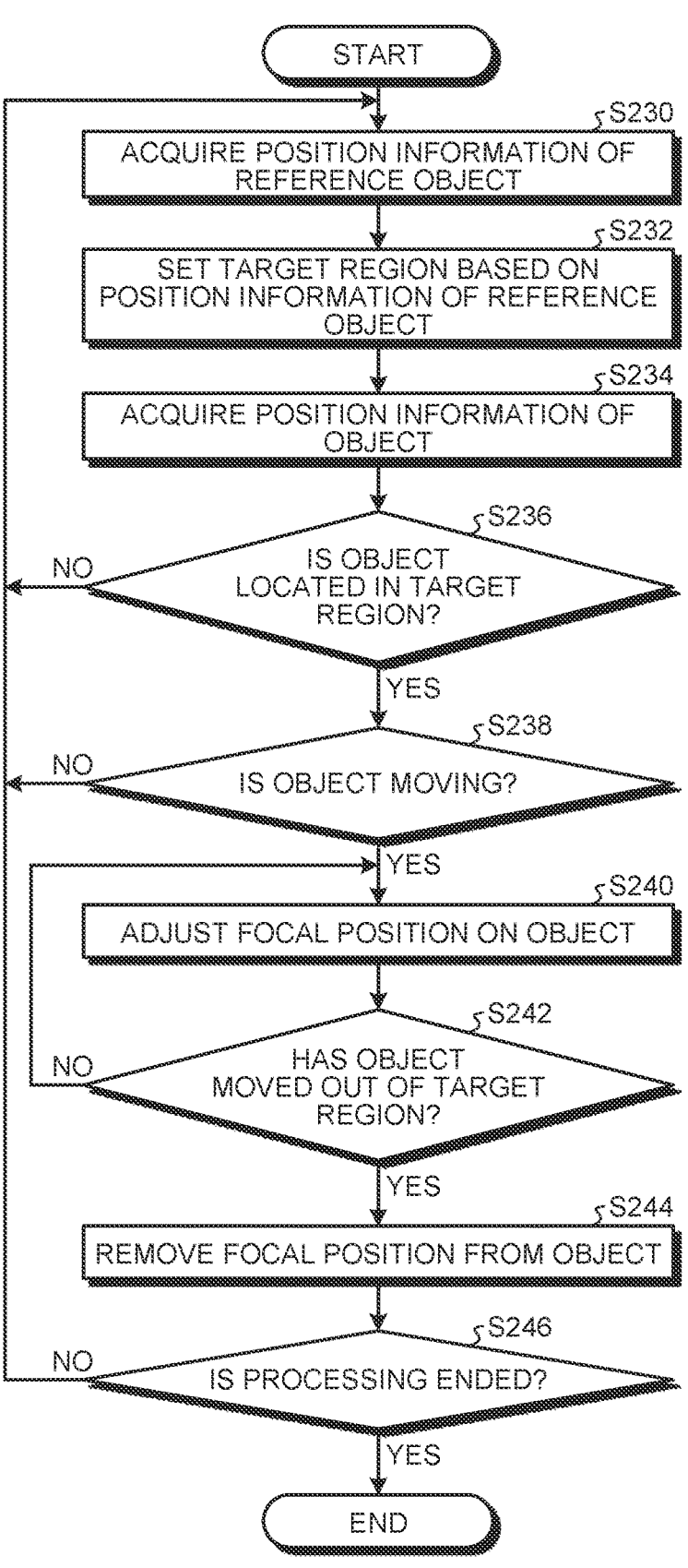
FIG. 15 is a flowchart for explaining a processing flow of adjusting a focal position.

Next, a processing flow of adjusting a focal position in the fifth embodiment will be described. FIG. 15 is a flowchart for explaining a processing flow of adjusting a focal position. As illustrated in FIG. 15, the controller 24 causes the object information acquisition unit 32 to acquire the position information of the reference object B (Step S230), and causes the target region acquisition unit 30 to set the target region AR based on the position information of the reference object B (Step S232). Then, the controller 24 causes the object information acquisition unit 32 to acquire the position information of the object (Step S234). An execution order of Steps S230, S232, and S234 may be arbitrary. The controller 24 causes the focal position controller 34 to determine whether the object is located in the target region AR based on the position information of the object (Step S236). In a case in which the object is not located in the target region AR (Step S236; No), the process returns to Step S230, and the acquisition of the position information of the object is continued while acquiring the position information of the reference object and updating the target region AR. On the other hand, in a case in which the object is located in the target region AR (Step S236; Yes), the focal position controller 34 determines whether the object is moving (Step S238). In a case in which the object in the target region AR does not move (Step S238; No), the process returns to Step S230, and the focal position controller 34 continues the acquisition of the position information of the object while acquiring the position information of the reference object and updating the target region AR. In a case in which the object in the target region AR is moving (Step S238; Yes), the focal position controller 34 adjusts the focal position on the object (Step S240). Thereafter, while the position information of the reference object is acquired and the target region AR is updated, the acquisition of the position information of the object is continued, and whether the object has moved to the outside of the target region AR is determined (Step S242). In a case in which the object does not move out of the target region AR (Step S242; No), that is, in a case in which the object continues to exist in the target region AR, the process returns to Step S240, and the focal position is kept on the object. In a case in which the object has moved to the outside of the target region AR (Step S242; Yes), the focal position controller 34 removes the focal position from the object (Step S244). Thereafter, in a case in which the processing is not ended (Step S246; No), the process returns to Step S230, and in a case in which the processing is ended (Step S246; Yes), this process ends.

As described above, in the fifth embodiment, the target region acquisition unit 30 sets the target region AR so as to be moved based on the position information of the moving reference object B acquired by the object information acquisition unit 32. That is, the target region acquisition unit 30 sets the target region AR such that the target region AR also moves with the movement of the reference object B. Therefore, for example, in a case in which a remarkable object moves in monitoring or the like, it is possible, by moving the target region AR in accordance with the object, to appropriately focus on the vicinity of the moving object.

In addition, the target region acquisition unit 30 sets the target region AR so as to be moved along with the movement of the reference object B while keeping the position of the target region AR with respect to the reference object B the same. Therefore, it is possible, by appropriately moving the target region AR according to the remarkable object, to more appropriately focus on the vicinity of the moving object.

Sixth Embodiment

Next, a sixth embodiment will be described. The sixth embodiment is different from the fourth embodiment in that a focal position is adjusted on an object that exists in a target region AR and satisfies a predetermined condition. In the sixth embodiment, the description of portions having the same configuration as that of the fourth embodiment will be omitted. The sixth embodiment is also applicable to the fifth embodiment.

In the sixth embodiment, the focal position controller 34 adjusts the focal position on an object that exists in the target region AR and satisfies a predetermined condition. The focal position controller 34 does not adjust the focal position on the object that does not satisfy at least one of the condition that the object exists in the target region AR and the condition that the predetermined condition is satisfied. The focal position controller 34 keeps the focal position on the object while the object at the focal position continues to exist in the target region AR while satisfying the predetermined condition. On the other hand, in a case in which the object no longer satisfies at least one of the condition that the object exists in the target region AR and the condition that the predetermined condition is satisfied, the focal position controller 34 removes the focal position from the object. That is, for example, in a case in which the object satisfies the predetermined condition but moves out of the target region AR, or in a case in which the object exists in the target region AR but no longer satisfies the predetermined condition, the focal position controller 34 removes the focal position from the object.

The focal position controller 34 may determine whether the predetermined condition is satisfied by an arbitrary method, but for example, may determine whether the predetermined condition is satisfied based on at least one of the position information of the object and the image of the object. Here, the position information of the object may refer to a measurement result of the object position measurement unit 14, and the image of the object may refer to image data which is acquired by the imaging element 12 and in which the object is imaged.

The predetermined condition here may be any condition except a condition that the object does not exist in the target region AR. For example, the predetermined condition may be at least one of a condition that the object is performing a predetermined motion, a condition that the object has a predetermined shape, or a condition that the object is oriented in a predetermined direction. In addition, any two of these conditions may be set as the predetermined condition, or all of these conditions may be set as the predetermined condition. In a case in which multiple predetermined conditions is set, the focal position controller 34 determines that the predetermined conditions are satisfied in a case in which all the conditions are satisfied.

A case in which the motion of the object is set as a predetermined condition will be described. In this case, the focal position controller 34 determines whether the object is performing a predetermined motion based on the position information of the object continuously acquired in time series. The focal position controller 34 adjusts the focal position on the object existing in the target region AR and performing a predetermined motion. The focal position controller 34 does not adjust the focal position on the object that does not satisfy at least one of the condition that the object exists in the target region AR and the condition that the object performs the predetermined motion. The focal position controller 34 keeps the focal position on the object while the object at the focal position exists in the target region AR and continues the predetermined motion. On the other hand, in a case in which the object no longer satisfies at least one of the condition that the object exists in the target region AR and the condition that the object performs the predetermined motion, the focal position controller 34 removes the focal position from the object. Note that the motion of the object here refers to a moving mode of the object, and may refer to, for example, a moving direction and a moving speed of the object. For example, in a case in which the predetermined motion indicates that the object moves vertically downward at a speed of 10 m/h or more, the focal position controller 34 adjusts the focal position on the object moving vertically downward at a speed of 10 m/h or more in the target region AR. Note that the motion of the object is not limited to a motion indicating the moving direction and the moving speed of the object, and may indicate an arbitrary moving mode. For example, the motion of the object may refer to at least one of the moving direction and the moving speed of the object.

Figure 16:
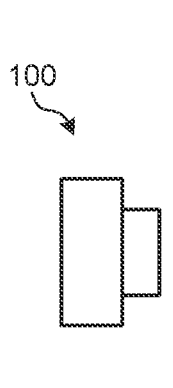
FIG. 16 is a schematic diagram illustrating an example of a case in which a motion of the object is set as a predetermined condition.
Figure 16:
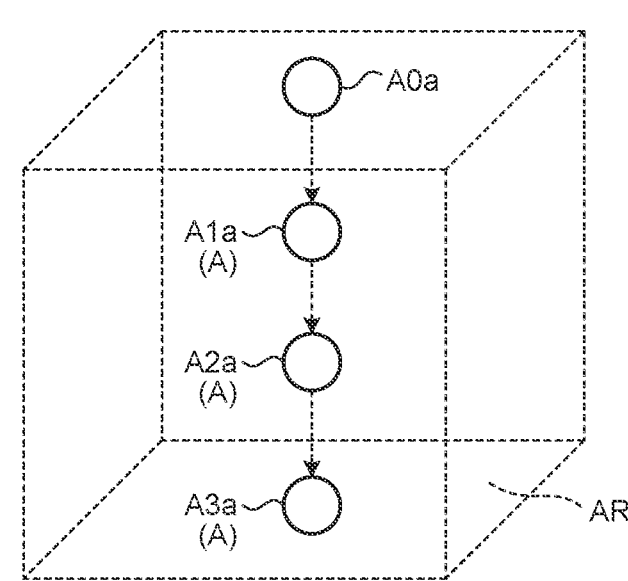

FIG. 16 is a schematic diagram illustrating an example of a case in which a motion of the object is set as a predetermined condition. In the example of FIG. 8, the predetermined condition is that the object moves vertically downward (in the direction opposite to the Z direction), that is, the moving direction of the object. Then, the example of FIG. 8 illustrates a case in which the object A moves vertically downward from the position A0a to the position A3a through the position A1a and the position A2a and stops at the position A3a. The position A0a is outside the target region AR, and the positions A1a, A2a, and A3a are inside the target region AR. In this case, since the object A is out of the target region AR at a timing when the object A exists at the position A0a, the focal position controller 34 does not adjust the focal position on the object A but, for example, adjusts the focal position on the preset setting position. Then, the focal position controller 34 adjusts the focal position on the object A at a timing when the object A exists at the position A1a, that is, at a timing when the object A enters the target region AR while moving vertically downward. The focal position controller 34 keeps the focal position on the object A even at a timing when the object A exists at the position A2a, and removes the focal position from the object A and returns the focal position to the preset setting position at a timing when the object A moves to the position A3a and stops.

Next, a case in which a shape of the object is set to a predetermined condition will be described. In this case, the focal position controller 34 determines whether the object has a predetermined shape based on the image data in which the object is captured. The focal position is adjusted on the object existing in the target region AR and having a predetermined shape. The focal position controller 34 does not adjust the focal position on the object that does not satisfy at least one of the condition that the object exists in the target region AR and the condition that the object has a predetermined shape. The focal position controller 34 keeps the focal position on the object while the object at the focal position has a predetermined shape and continues to exist in the target region AR. On the other hand, in a case in which the object no longer satisfies at least one of the condition that the object exists in the target region AR and the condition that the object has the predetermined shape, the focal position controller 34 removes the focal position from the object. The shape of the object here may be, for example, at least one of a size of the object or an outer shape of the object. For example, in a case in which the predetermined shape indicates a predetermined size or more, the focal position controller 34 adjusts the focal position on an object existing in the target region AR and having a predetermined size or more. Note that a 3D shape information acquired by the object information acquisition unit 32 may be used to acquire a shape information of the object.

A case in which the orientation of the object is set to a predetermined condition will be described. In this case, the focal position controller 34 determines whether the object is directed in a predetermined direction based on the image data in which the object is captured. The focal position is adjusted with respect to the object existing in the target region AR and facing the predetermined direction. The focal position controller 34 does not adjust the focal position on the object that does not satisfy at least one of the condition that the object exists in the target region AR and the condition that the object is directed in the predetermined direction. The focal position controller 34 keeps the focal position on the object during a period in which the object on the focal position is kept existing in the target region AR while facing the predetermined direction. On the other hand, in a case in which the object no longer satisfies at least one of the condition that the object exists in the target region AR and the condition that the object is directed in the predetermined direction, the focal position controller 34 removes the focal position from the object. Note that the information on the 3D shape acquired by the object information acquisition unit 32 may be used to acquire the information on the orientation of the object.

Note that the predetermined condition may be set by an arbitrary method, for example, may be set in advance. In this case, the focal position controller 34 may read information (for example, the moving direction and the moving speed)

indicating a preset predetermined condition from the storage 22, or may acquire a predetermined condition from another device via the communication unit 20. Furthermore, for example, in a case in which a predetermined condition is not set in advance, the focal position controller 34 may automatically set a predetermined condition. Furthermore, for example, the user may set a predetermined condition. In this case, for example, the user may input information (for example, a moving direction and a moving speed) designating a predetermined condition to the input unit 16, and the focal position controller 34 may set a predetermined condition based on the information designated by the user.

As described above, in the sixth embodiment, the focal position controller 34 may set the focal position on the object existing in the target region AR and performing the predetermined motion. The focal position controller 34 keeps the focal position on the object during a period in which the object performs the predetermined motion, and removes the focal position from the object when the object no longer performs the predetermined motion. In this manner, in addition to being within the target region AR, satisfying a predetermined motion is also a condition for setting the focal position, whereby an object having a specific motion can be tracked and the focal position can be adjusted appropriately.

In the sixth embodiment, the focal position controller 34 may adjust the focal position on an object existing in the target region AR and having a predetermined shape. As described above, in addition to being in the target region AR, it is possible, by setting the predetermined shape as a condition for adjusting the focal position, to track an object having a specific shape and appropriately adjust the focal position.

In the sixth embodiment, the focal position controller 34 may adjust the focal position on an object existing in the target region AR and facing a predetermined direction. As described above, in addition to being in the target region AR, it is possible, by setting the condition that the object faces the predetermined direction as the condition for setting the focal position, to track the object in a specific direction and appropriately adjust the focal position.

Seventh Embodiment (Configuration of Imaging Device)

Figure 17:
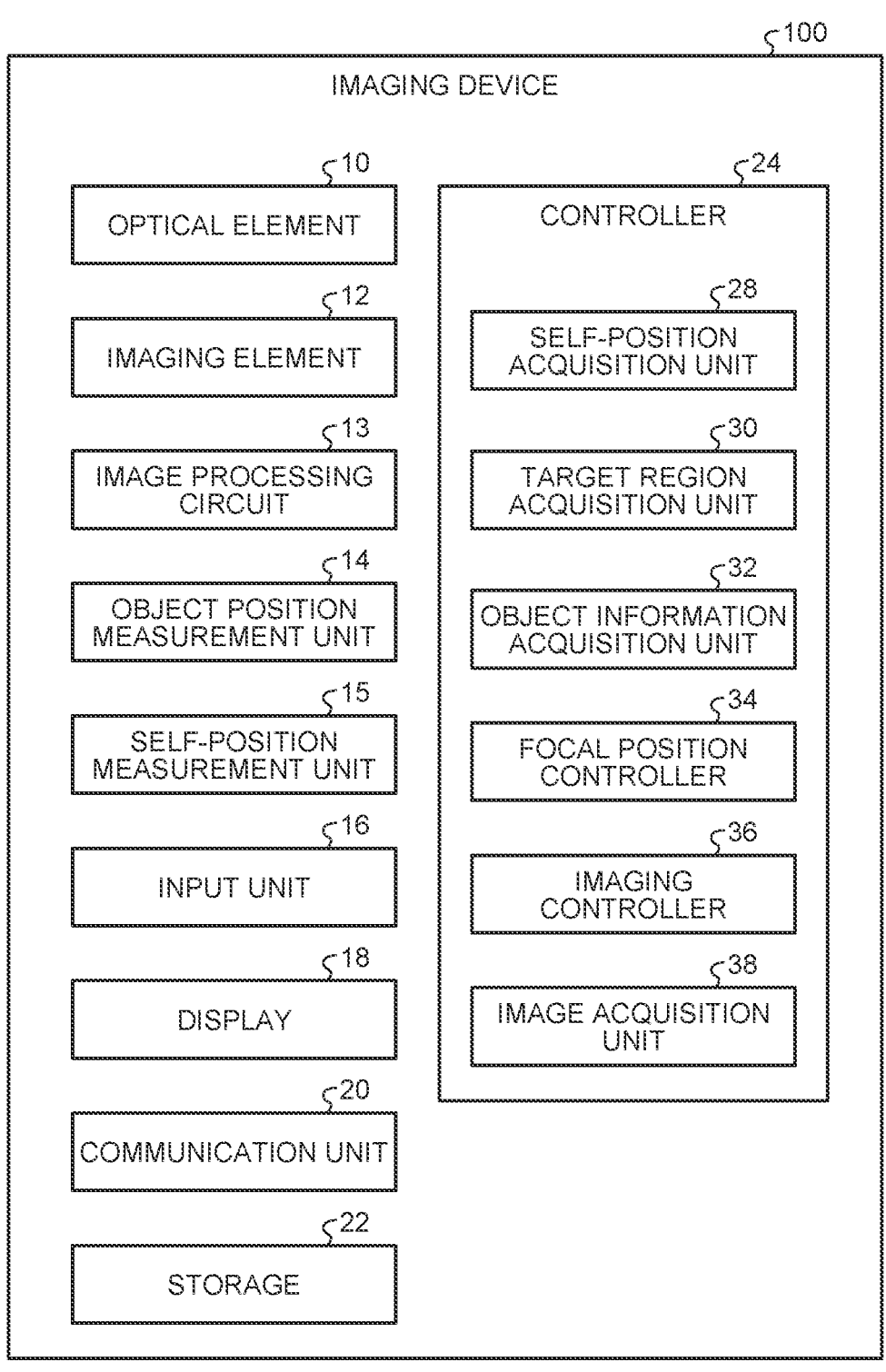
FIG. 17 is a schematic block diagram of an imaging device according to a seventh embodiment.

FIG. 17 is a schematic block diagram of an imaging device according to a seventh embodiment. An imaging device 100 according to the seventh embodiment is an imaging device that images an object within an imaging range. The imaging device 100 is an autofocus camera capable of automatically adjusting a focal position. The imaging device 100 may be a video camera that captures a moving image by capturing an image for each predetermined frame, or may be a camera that captures a still image. The imaging device 100 may be used for any purpose, and for example, may be used as a monitoring camera set at a predetermined position in facilities or outdoors.

As illustrated in FIG. 17, the imaging device 100 includes an optical element 10, an imaging element 12, an image processing circuit 13, an object position measurement unit 14, a self-position measurement unit 15, an input unit 16, a display 18, a communication unit 20, a storage 22, and a controller 24.

The optical element 10 is, for example, an element of an optical system such as a lens. The number of optical elements 10 may be one or plural.

The imaging element 12 is an element that converts light incident through the optical element 10 into an image signal that is an electric signal. The imaging element 12 is, for example, a charge coupled device (CCD) sensor, a complementary metal oxide semiconductor (CMOS) sensor, or the like.

The image processing circuit 13 generates image data for each frame from the image signal generated by the imaging element 12. The image data is, for example, data including information of luminance and color of each pixel in one frame, and may be data to which gradation for each pixel is assigned.

The object position measurement unit 14 is a sensor that measures a position of an object to be measured with respect to the imaging device 100 (a relative position of the object). The object here may be any object, and may be a living thing or an inanimate object, and it similarly applies to following descriptions. In addition, the object here may refer to a movable object, but is not limited thereto, and may refer to an object that does not move.

In the present embodiment, the object position measurement unit 14 measures the distance from the imaging device 100 to the object as the relative position of the object. The object position measurement unit 14 may be any sensor capable of measuring the relative position of the object, and may be, for example, a time of flight (TOF) sensor. In a case in which the object position measurement unit 14 is a TOF sensor, for example, a light emitting element (for example, a light emitting diode (LED) that emits light and a light receiving unit that receives light are provided, and the distance to the object is measured by a flight time of the light emitted from the light emitting element to the object and returned to the light receiving unit. Note that, in addition to measuring the distance from the imaging device 100 to the object as the relative position of the object, the object position measurement unit 14 may also measure, for example, a direction in which the object exists with respect to the imaging device 100. In other words, the object position measurement unit 14 may measure, as the relative position of the object, the position (coordinates) of the object in the coordinate system in which the imaging device 100 is set as an origin.

The self-position measurement unit 15 is a sensor that measures a position (that is, a self-position) of the imaging device 100. In the present embodiment, the self-position measurement unit 15 measures the position (coordinates) and a posture (orientation) of the imaging device 100. The self-position measurement unit 15 may be any sensor capable of measuring the position and the posture of the imaging device 100, but may be, for example, a three-dimensional acceleration sensor that measures acceleration in three axes of the imaging device 100 or a gyro sensor. For example, the self-position measurement unit 15 can measure the position and the posture of the imaging device 100, that is, the position and the posture of the imaging device 100 after the movement with respect to the position and the posture of the imaging device 100 before the movement by measuring accelerations in the three axes of the imaging device 100. However, the self-position measurement unit 15 is not limited to measuring both the position and the posture of the imaging device 100, and may measure at least one of the position and the posture of the imaging device 100.

The input unit 16 is a mechanism that receives an input (operation) from a user, and may be, for example, a button, a keyboard, a touch panel, or the like.

The display 18 is a display panel that displays an image. In addition to the image captured by the imaging device 100, the display 18 may be capable of displaying an image for the user to set a target region AR described later.

The communication unit 20 is a communication module that communicates with an external device, and may be, for example, an antenna, a Wi-Fi (registered trademark) module, or the like. Although the imaging device 100 communicates with an external device by wireless communication, wired communication may be used, and a communication method may be arbitrary.

The storage 22 is a memory that stores captured image data and various types of information such as calculation contents and programs of the controller 24, and includes at least one of, for example, a random access memory (RAM), a main storage device such as a read only memory (ROM), or an external storage device such as a hard disk drive (HDD). The program for the controller 24 stored in the storage 22 may be stored in a recording medium readable by the imaging device 100.

The controller 24 is an arithmetic device, and includes, for example, an arithmetic circuit such as a central processing unit (CPU). The controller 24 includes a self-position acquisition unit 28, a target region acquisition unit 30, an object information acquisition unit 32, a focal position controller 34, an imaging controller 36, and an image acquisition unit 38. The controller 24 reads and executes a program (software) from the storage 22 to implement the self-position acquisition unit 28, the target region acquisition unit 30, the object information acquisition unit 32, the focal position controller 34, the imaging controller 36, and the image acquisition unit 38, and executes these processes. Note that the controller 24 may execute these processes by one CPU, or may include multiple CPUs and execute the processes by the multiple CPUs. In addition, at least a part of the processing of the self-position acquisition unit 28, the target region acquisition unit 30, the object information acquisition unit 32, the focal position controller 34, the imaging controller 36, and the image acquisition unit 38 may be implemented by a hardware circuit.

(Self-Position Acquisition Unit)

The self-position acquisition unit 28 acquires position information of the imaging device 100. The position information of the imaging device 100 is information indicating a position (coordinates) and a posture (orientation) of the imaging device 100. The self-position acquisition unit 28 controls the self-position measurement unit 15 to cause the self-position measurement unit 15 to measure the position and the posture of the imaging device 100. The self-position acquisition unit 28 acquires a measurement result of the position and the posture of the imaging device 100 by the self-position measurement unit 15 as position information of the imaging device 100. The self-position acquisition unit 28 sequentially acquires the position information of the imaging device 100 by acquiring the position information of the imaging device 100 every predetermined time. Note that the position information of the imaging device 100 is not limited to both the position and the posture of the imaging device 100, and may be information indicating at least one of the position or the posture of the imaging device 100.

The self-position acquisition unit 28 determines whether the imaging device 100 has moved based on the position information of the imaging device 100. The self-position acquisition unit 28 determines that the imaging device 100 moves in a case in which the position information of the imaging device 100 changes, and determines that the imaging device 100 does not move in a case in which the position information of the imaging device 100 does not change. The change in the position information of the imaging device 100 may indicate that a difference between the position information (here, at least one of the position and the posture) of the imaging device 100 acquired immediately before and the position information (here, at least one of the position or the posture) of the imaging device 100 acquired this time is greater than or equal to a predetermined value.

In a case of determining that the imaging device 100 has moved, the self-position acquisition unit 28 may acquire a degree of movement of the imaging device 100. Here, the degree of movement of the imaging device 100 refers to a moving direction and a movement amount of a position (coordinates) and a posture (orientation) of the imaging device 100. The self-position acquisition unit 28 may calculate a change direction and a change amount between the position and the posture of the imaging device 100 acquired immediately before and the position and the posture of the imaging device 100 acquired this time as the degree of movement of the imaging device 100.

(Target Region Acquisition Unit)
(Acquisition of Target Region)

The target region acquisition unit 30 acquires information of the target region AR set in the imaging region of the imaging device 100. The target region AR is a region set to adjust the focal position automatically. The information of the target region AR is information indicating a position of the target region AR, that is, position information of the target region AR. Hereinafter, the target region AR will be described.

Figure 18:
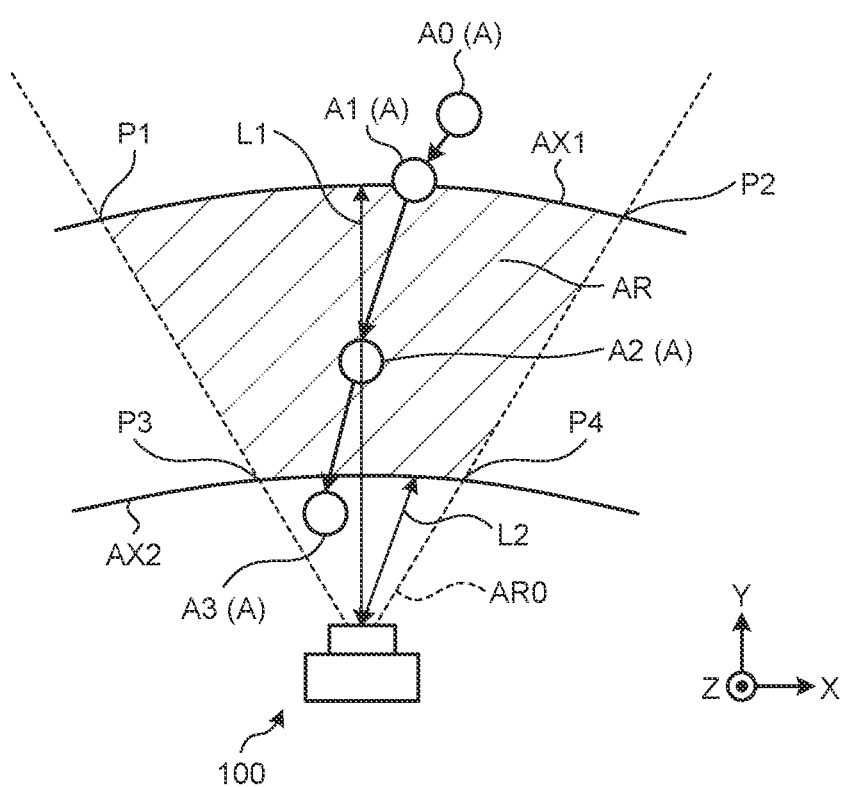
FIG. 18 is a schematic diagram for explaining an example of a target region.
Figure 19:
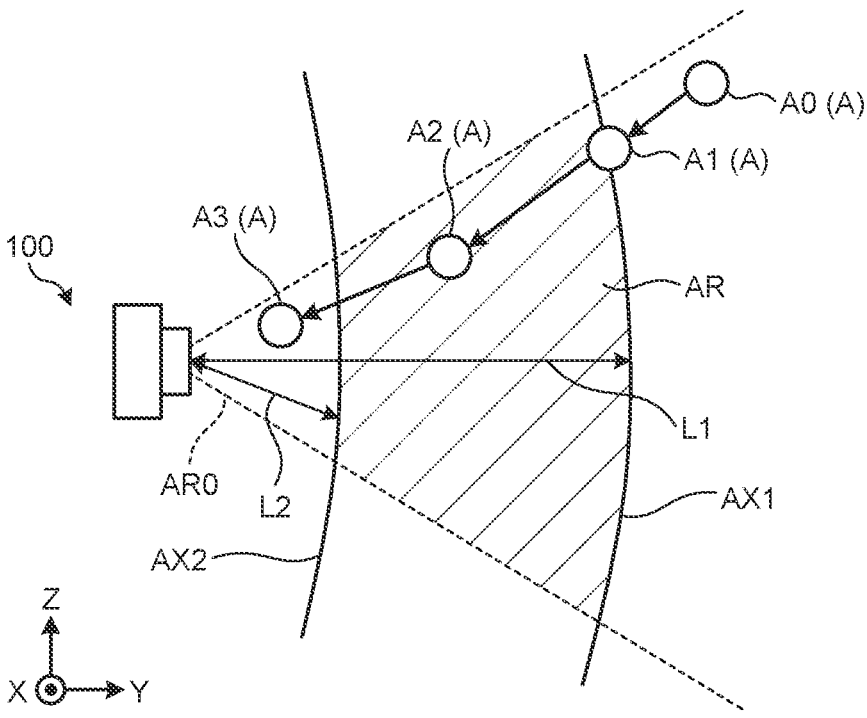
FIG. 19 is a schematic diagram for explaining an example of the target region.

FIGS. 18 and 19 are schematic diagrams for explaining an example of a target region. FIG. 18 is a diagram of the imaging device 100 and the target region AR as viewed from above in a vertical direction, and FIG. 19 is a diagram of the imaging device 100 and the target region AR as viewed from a horizontal direction. Hereinafter, the direction Z is a vertical direction, the direction X is one direction of a horizontal direction orthogonal to the direction Z, and the direction Y is a direction (horizontal direction) orthogonal to the direction Z and the direction X. As illustrated in FIGS. 18 and 19, a range in which an image can be captured by the imaging device 100 is defined as an imaging region AR0. The imaging region AR0 refers to a region (space) within an angle of view of the imaging element 12, in other words, a range that can be captured as an image in the real space. The target region AR is a region (space) set within the range of the imaging region AR0.

More specifically, the target region AR is a region between a first position AX1 and a second position AX2 in the imaging region AR0. The first position AX1 is a position where the distance from the imaging device 100 is a first distance L1, and the second position AX2 is a position where the distance from the imaging device 100 is a second distance L2 shorter than the first distance L1. As illustrated in FIGS. 18 and 19, in the present embodiment, the first position AX1 can be said to be a virtual plane including each position (coordinate) where the distance from the imaging device 100 is the first distance L1 in the imaging region AR0. Similarly, the second position AX2 can be said to be a virtual plane including each position (coordinate) at which the distance from the imaging device 100 is the second distance L2 in the imaging region AR0. That is, the target region AR can be said to be a space surrounded by a virtual plane whose distance from the imaging device 100 is the second distance L2 and a virtual plane whose distance from the imaging device 100 is the first distance L1 in the imaging region AR0. Note that the first position AX1 is not limited to a virtual plane in which all positions (coordinates) included in the first position AX1 become the first distance L1 from the imaging device 100, and may be a virtual plane in which at least some positions (coordinates) included in the first position AX1 become the first distance L1 from the imaging device 100. Similarly, the second position AX2 may be a virtual plane in which at least a part of the position (coordinates) included in the second position AX2 is the second distance L2 from the imaging device 100.

Figure 20:
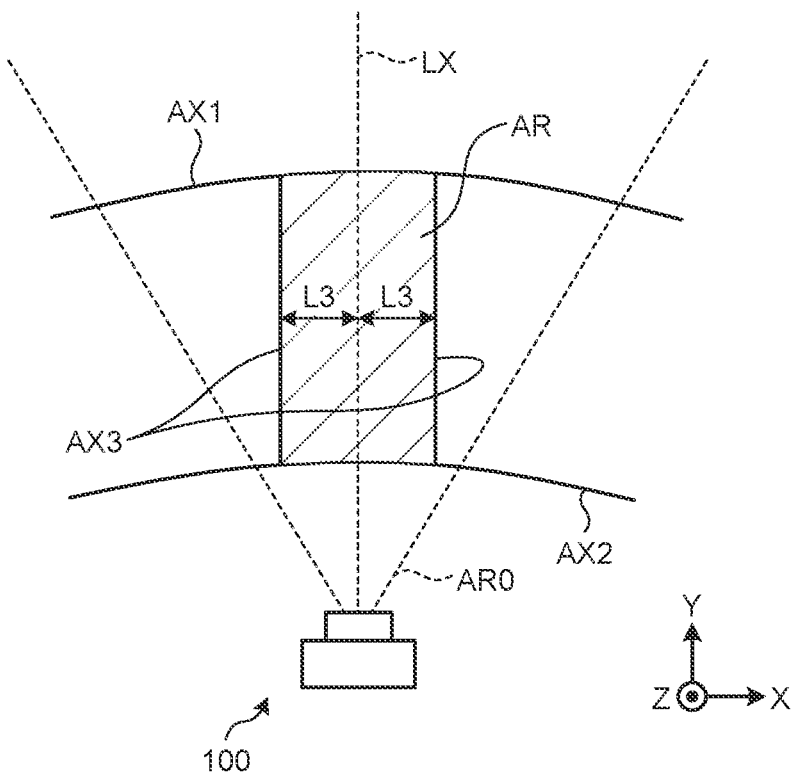
FIG. 20 is a schematic diagram illustrating another example of the target region.
Figure 21:
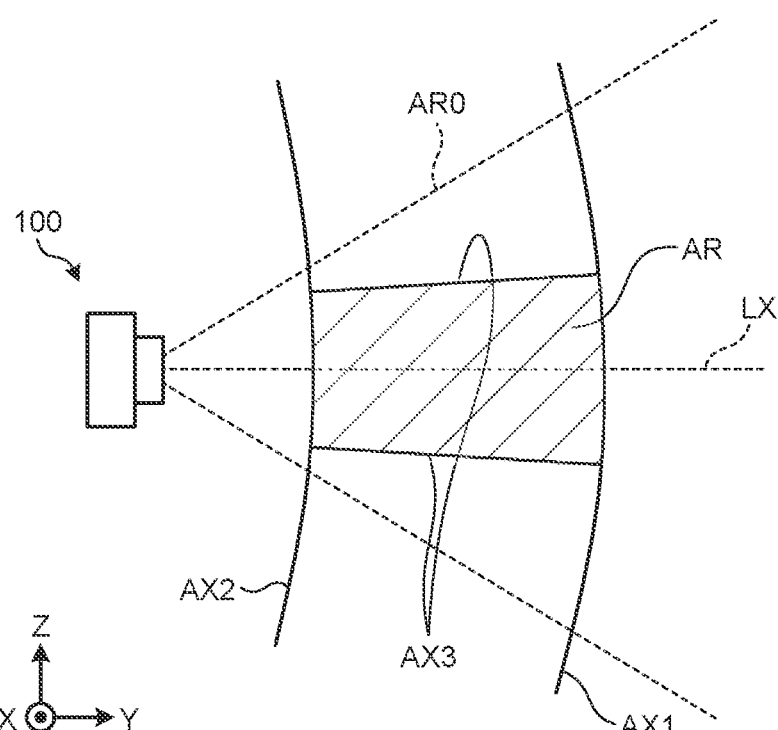
FIG. 21 is a schematic diagram illustrating another example of the target region.

FIGS. 20 and 21 are schematic diagrams illustrating another example of the target region. In the description of FIGS. 18 and 19, the target region AR is divided by the first position AX1 and the second position AX2 with respect to the imaging region AR0 in the optical axis direction (depth direction of the image) of the imaging device 100, but is not divided with respect to the imaging region AR0 in a radiation direction (a spread direction of an angle of view) with respect to the optical axis direction of the imaging device 100. In other words, end surfaces in the direction in which the angle of view of the target region AR spreads coincide with end surfaces in the direction in which the angle of view of the imaging region AR0 spreads. However, the present invention is not limited thereto, and the target region AR may also be divided with respect to the imaging region AR0 in the direction in which the angle of view spreads. That is, for example, as illustrated in FIGS. 20 and 21, the target region AR may also be divided with respect to the imaging region AR0 in the spread direction of the angle of view by a third position AX3. In this example, the third position AX3 is a virtual surface (here, a closed curved surface having a side surface shape of a cylinder) including positions (coordinate) radially outward and away from the optical axis LX of the imaging device 100 by a predetermined distance. In this case, the target region AR is a region (space) surrounded by the first position AX1, the second position AX2, and the third position AX3. Note that the third position AX3 is not limited to a virtual plane in which all positions (coordinates) included in the third position AX3 become the third distance L3 from the optical axis LX, and may be a virtual plane in which at least some positions (coordinates) included in the third position AX3 become the third distance L3 from the optical axis LX. For example, the third position AX3 may be a virtual plane that expands radially outward (in a horizontal direction and an elevation angle direction) at a predetermined angle as the distance from the imaging device 100 increases along the optical axis direction.

Note that the size and the shape of the target region AR are not limited to the above description and may be arbitrary. Furthermore, the position of the target region AR is not limited to the above description and may be arbitrary. For example, the target region AR is not limited to being located between the first position AX1 and the second position AX2. Furthermore, in the above description, the target region AR is a region set in the imaging region AR0, but the present invention is not limited thereto. For example, when a range that can be measured by the object position measurement unit 14 is a distance measurement region (a distance measurement space), the target region AR may be a region set in the distance measurement region. In this case, the imaging region AR0 in FIGS. 18 to 21 may be treated as a distance measurement region.

The target region acquisition unit 30 may acquire the information of the target region AR by an arbitrary method. For example, the position of the target region AR may be set in advance. In this case, the target region acquisition unit 30 may read the position information of the target region AR set in advance from the storage 22, or may acquire the position information of the target region AR from another device via the communication unit 20. Furthermore, for example, in a case in which the position of the target region AR is not set in advance, the target region acquisition unit 30 may set the position of the target region AR automatically. Furthermore, for example, the user may set the position of the target region AR. In this case, for example, the user may input information (for example, values of the first distance L1, the second distance L2, and the third distance L3, and the like) designating the position of the target region AR to the input unit 16, and the target region acquisition unit 30 may set the target region AR based on the position information of the target region AR designated by the user. Furthermore, for example, the target region AR may be set by designating coordinates. That is, for example, in the example of FIG. 18, coordinates P1, P2, P3, and P4 that are vertex positions of the target region AR may be designated, and a region surrounded by the coordinates P1 to P4 may be set as the target region AR.

(Target Region When Imaging Device Moves)

Here, even in a case in which the imaging device 100 moves, it is required to adjust the target region AR appropriately. For that, in a case in which the self-position acquisition unit 28 determines that the imaging device 100 has moved, the target region acquisition unit 30 fixes the position of the target region AR and does not move the target region AR. As a result, it is possible to fix the target region AR and prevent a remarkable region from unintentionally change due to the movement of the imaging device 100.

Furthermore, in the present embodiment, the target region acquisition unit 30 acquires mode information indicating whether or not to move the target region AR, and determines whether or not to move the target region AR based on the mode information in a case in which the self-position acquisition unit 28 determines that the imaging device 100 has moved. Hereinafter, a specific description will be given.

The target region acquisition unit 30 acquires mode information. The mode information is information indicating whether or not the target region AR is also moved when the imaging device 100 is moved. Either information indicating that the mode is a first mode or information indicating that a mode is the second mode is allocated to the mode information. The first mode is a mode in which the target region AR is not moved (the position of the target region AR is fixed) when the imaging device 100 moves, and the second mode is a mode in which the target region AR is moved when the imaging device 100 moves.

Figure 22:
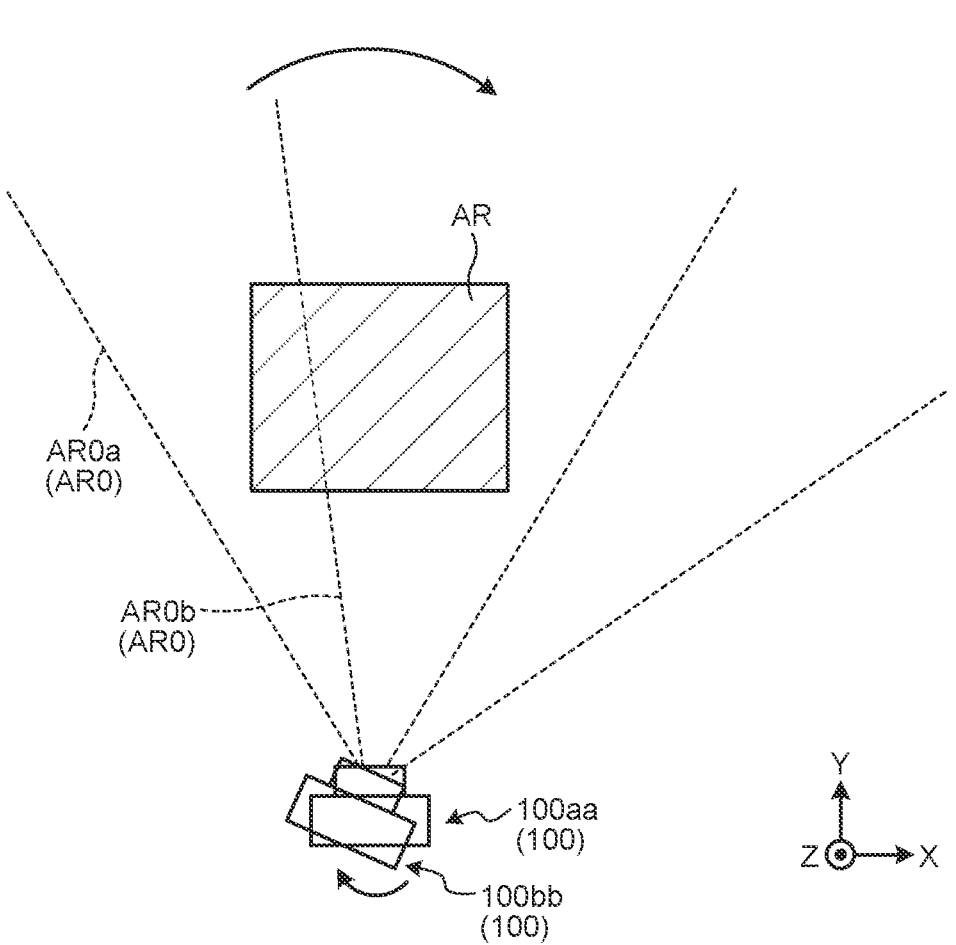
FIG. 22 is a schematic diagram illustrating an example of a target region in a case in which a first mode is set.

FIG. 22 is a schematic diagram illustrating an example of a target region in a case in which the first mode is set. In a case in which the mode information indicating the first mode is acquired, the target region acquisition unit 30 sets the target region AR to the first mode to be fixed, and does not move the target region AR even in a case in which the self-position acquisition unit 28 determines that the imaging device 100 has moved. That is, in the first mode, the position of the target region AR is fixed regardless of the position of the imaging device 100. FIG. 22 exemplifies a case in which the imaging device 100 has moved from the position 100*aa* to the position 100*bb*. In this case, the position of the imaging region AR0 moves from the position AR0*a* to the position AR0*b*. However, in a case in which the mode is set to the first mode, the position of the target region AR is fixed and does not move. Note that, since the distance measurement region also moves along with the movement of the imaging device 100, it can be said that the distance measurement region moves from the position AR0*a* to the position AR0*b*.

Figure 23:
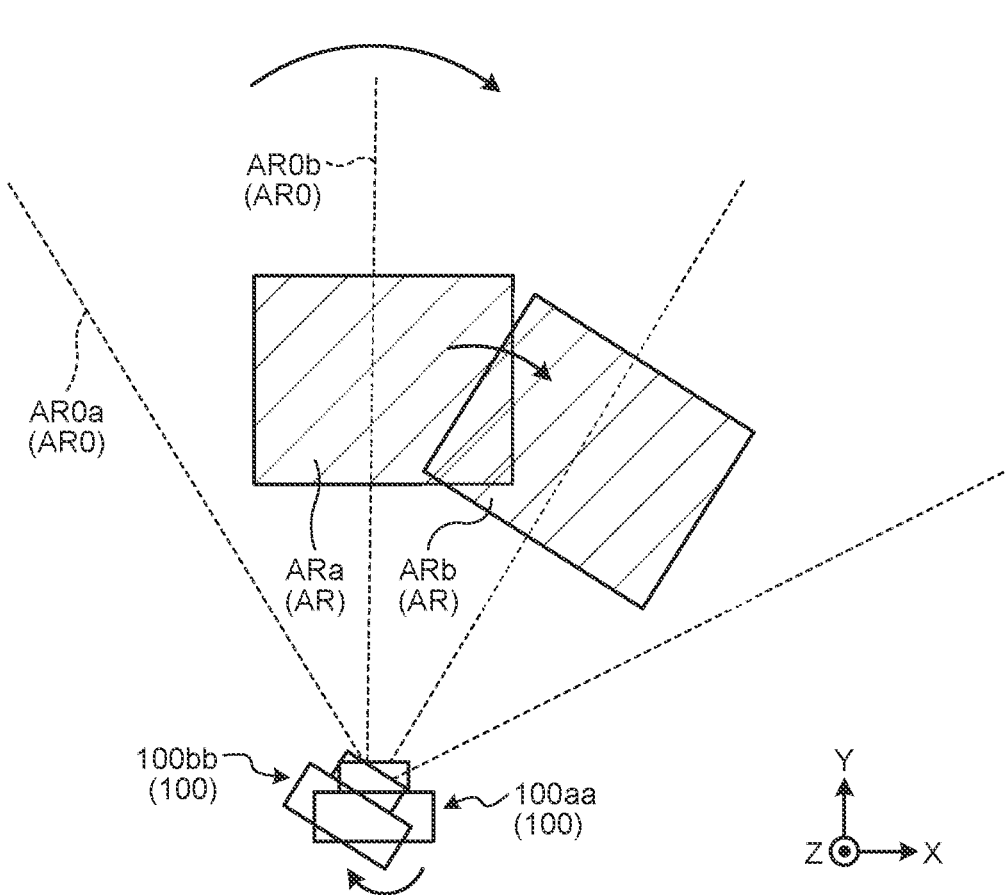
FIG. 23 is a schematic diagram illustrating an example of a target region in a case in which a second mode is set.

FIG. 23 is a schematic diagram illustrating an example of a target region in a case in which the second mode is set. In a case in which the mode information indicating the second mode is acquired, the target region acquisition unit 30 sets the second mode in which the movement of the target region AR is permitted, and in a case in which the self-position acquisition unit 28 determines that the imaging device 100 is moved, the target region AR is moved. In this case, the target region acquisition unit 30 preferably moves the target region AR so that the shape and the size of the target region AR are kept the same. Furthermore, the target region acquisition unit 30 preferably moves the target region AR based on the degree of movement of the imaging device 100 so as to keep the position (the relative position) of the target region AR with respect to the imaging device 100 the same. That is, it is preferable that the position (the relative position) of the target region AR with respect to the imaging device 100 is not changed before and after the movement of the target region AR. In this case, for example, the target region acquisition unit 30 moves the target region AR by the same amount as the degree of movement of the imaging device 100. FIG. 23 exemplifies a case in which the imaging device 100 has moved from the position 100aa to the position 100bb. In this case, the position of the imaging region AR0 moves from the position AR0a to the position AR0b. In a case in which the mode is set to the second mode, the position of the target region AR moves from a position ARa to a position ARb. That is, when the imaging device 100 is at the position 100aa, the target region AR is located at the position ARa, and when the imaging device 100 moves to the position 100bb, the target region AR moves to the position ARb.

Note that, in a case in which the imaging device 100 does not move, the target region acquisition unit 30 preferably does not move the position of the target region AR in both the first mode and the second mode.

The target region acquisition unit 30 may acquire the information of the mode information by an arbitrary method. For example, whether the mode information is the first mode or the second mode may be set in advance. In this case, the target region acquisition unit 30 may read the preset mode information from the storage 22, or may acquire the mode information from another device via the communication unit 20. Furthermore, for example, in a case in which the mode information is not set in advance, the target region acquisition unit 30 may set the mode information automatically. Furthermore, for example, the user may set the mode information. In this case, for example, the user may input information designating the mode (information designating whether to set the first mode or the second mode) to input unit 16, and the target region acquisition unit 30 may set the mode based on the mode information designated by the user.

The target region acquisition unit 30 may switch between the first mode and the second mode. In this case, when acquiring mode information indicating that the mode is switched, the target region acquisition unit 30 may switch the mode based on the mode information.

Figure 24:
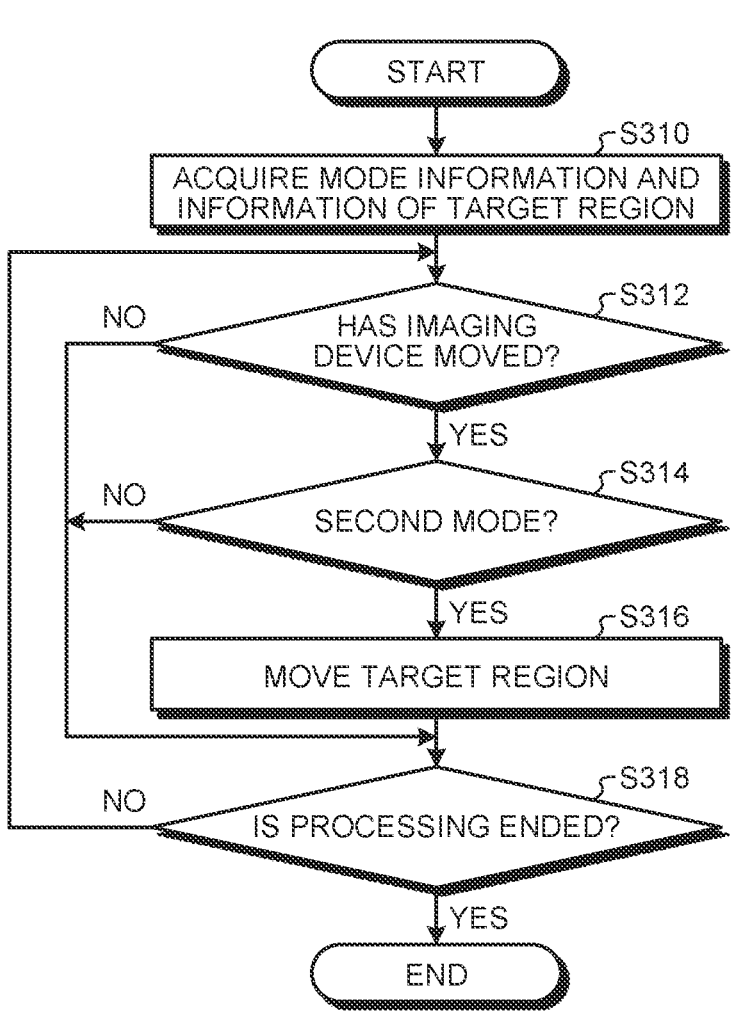
FIG. 24 is a flowchart for explaining a setting flow of a target region in a case in which the imaging device moves.

The above-described setting flow of the target region AR in a case in which the imaging device 100 moves will be described based on a flowchart. FIG. 24 is a flowchart for explaining a setting flow of a target region in a case in which the imaging device moves. As illustrated in FIG. 24, the controller 24 causes the target region acquisition unit 30 to acquire the mode information and the information about the target region AR (Step S310), sets the mode based on the mode information, and sets the target region AR based on the information about the target region AR. Then, the controller 24 determines whether the imaging device 100 has moved by the self-position acquisition unit 28 (Step S312). The self-position acquisition unit 28 determines whether the imaging device 100 has moved based on the position information of the imaging device 100. In a case in which it is determined that the imaging device 100 has moved (Step S312; Yes) and the second mode is set (Step S314; Yes), the target region acquisition unit 30 moves the target region AR (Step S316). Thereafter, in a case in which the processing is not ended (Step S318; No), the process returns to Step S312, and in a case in which the processing is ended (Step S318; Yes), this process ends. On the other hand, in a case in which it is determined that the imaging device 100 does not move (Step S312; No), the process also proceeds to Step S318 without moving the target region AR. Furthermore, in a case in which it is determined that the imaging device 100 has moved and the first mode is set (Step S314; No), the process proceeds to Step S318 without moving the target region AR.

Note that, in the seventh embodiment, it is not essential to set either the first mode or the second mode as described above, and it is sufficient that the position of the target region AR can be set so as not to move even if the imaging device 100 moves.

(Object Information Acquisition Unit)

The object information acquisition unit 32 acquires position information of an object existing in an imaging region AR0. The object information acquisition unit 32 controls the object position measurement unit 14 to cause the object position measurement unit 14 to measure the relative position of the object with respect to the imaging device 100. The object information acquisition unit 32 acquires a measurement result of the relative position of the object with respect to the imaging device 100 by the object position measurement unit 14 as position information of the object. The object information acquisition unit 32 sequentially acquires the position information of the object by acquiring the position information of the object every predetermined time. Furthermore, the object information acquisition unit 32 can also acquire information indicating a shape of the object (for example, a 3D shape of the object) based on the position information of the object. For example, the object information acquisition unit 32 can acquire the 3D shape of the object by accumulating multiple pieces of position information such as TOF image information.

(Focal Position Controller)

The focal position controller 34 sets a focal position of the imaging device 100. The focal position controller 34 controls the focal position by controlling a position of the optical element 10, that is, by moving the position of the optical element 10.

The focal position controller 34 adjusts the focal position on the object existing in the target region AR. In other words, the focal position controller 34 sets the focal position at the position of the object determined to exist in the target region AR. In the present embodiment, the focal position controller 34 determines whether the object exists in the target region AR based on the position information of the object acquired by the object information acquisition unit 32. In a case in which the position of the object acquired by the object information acquisition unit 32 overlaps with the position of the target region AR, the focal position controller 34 determines that the object exists in the target region AR and sets the focal position at the position of the object acquired by the object information acquisition unit 32. That is, for example, in a case in which the distance from the imaging device 100 to the object is a first distance L1 or less and a second distance L2 or more, the focal position controller 34 determines that the object exists in the target region AR and adjusts the focal position on the object. On the other hand, the focal position controller 34 does not adjust the focal position on an object that does not exist in the target region AR. That is, for example, in a case in which the distance from the imaging device 100 to the object is longer than the first distance L1 or shorter than the second distance L2, the focal position controller 34 determines that the object does not exist in the target region AR and does not adjust the focal position on the object.

The focal position controller 34 keeps the focal position on the object during a period in which the object at the focal position exists in the target region AR. That is, the focal position controller 34 determines whether or not the object continues to exist in the target region AR based on the position information of the object at every predetermined time acquired by the object information acquisition unit 32, and keeps the focal position on the object during a period in which the object continues to exist in the target region AR. On the other hand, in a case in which the object at the focal position moves out of the target region AR, that is, in a case in which the object no longer exists in the target region AR, the focal position controller 34 takes the focal position out of the object and focuses on a position other than the object.

Note that the focal position controller 34 may not set the focal position of the object existing in the target region AR from the start of operation of the imaging device 100 (a timing at which the imaging becomes possible). That is, the focal position controller 34 may set the focal position of the object entering the target region AR after starting the operation. In other words, the focal position controller 34 may set the focal position of an object from a timing at which the object starts to exist in the target region AR for the object that exists in the target region AR at a certain timing but does not exist in the target region AR at a timing before the certain timing. In other words, in a case in which the object moves from the outside of the target region AR into the target region AR, the object may be recognized as a target on which the focal position controller 34 focuses. That is, the focal position controller 34 may set the focal position of the object moved from the outside of the target region AR into the target region AR.

Furthermore, in a case in which there is no object in the target region AR, the focal position controller 34 may set the focal position to a preset setting position. The preset setting position may be arbitrarily set, but is preferably set in the target region AR such as a center position of the target region AR.

In addition, it is preferable that the focal position controller 34 does not adjust the focal position on the stopped object but adjusts the focal position on the moving object. More specifically, in a case in which a stopped (not moving) object is located in the target region AR due to the movement of the target region AR along with the movement of the imaging device 100 when the second mode is set, the focal position controller 34 does not adjust the focal position on the object. That is, the focal position controller 34 does not treat a stopped object as an object whose focal position is to be adjusted and does not adjust the focal position on the object even in a case in which the object is located in the target region AR. On the other hand, in a case in which the moving object is located in the target region AR, that is, in a case in which the moving object reaches the target region AR, the focal position controller 34 adjusts the focal position on the object. Note that whether the object is moving can be determined based on the position information of the object by the object information acquisition unit 32. That is, in a case in which the position information of the objects continuous in time series changes, it can be determined that the object is moving.

An example of setting the focal position described above will be described with reference to FIG. 18. FIG. 18 illustrates an example in a case in which the object A moves from the position A0 to the position A3 through the position A1 and the position A2 toward the imaging device 100. At the position A0, a distance to the imaging device 100 is longer than the first distance L1 and the position A0 is outside the target region AR. At the position A1 and the position A2, a distance to the imaging device 100 is equal to or smaller than the first distance L1 and more than the second distance L2, the position A1 and the position A2 are within the target region AR. A distance from the imaging device 100 to the position A3 is shorter than the second distance L2 and is outside the target region AR. In this case, the focal position controller 34 does not adjust the focal position on the object A at a timing when the object A exists at the position A0, and adjusts the focal position on a preset setting position, for example. Then, the focal position controller 34 adjusts the focal position on the object A at a timing when the object A exists at the position A1, that is, at a timing when the object A enters the target region AR. The focal position controller 34 keeps the focal position on the object A even at a timing when the object A exists at the position A2, removes the focal position from the object A at a timing when the object A moves to the position A3, that is, at a timing when the object A goes out of the target region AR, and returns the focal position to the preset setting position. That is, the focal position controller 34 adjusts the focal position on the object A from the timing at which the object A enters the target region AR, moves the focal position for the moving object A while the object A moves in the target region AR, and removes the focal position from the object A at the timing at which the object A moves out of the target region AR.

Note that the focal position may be set by the user. In this case, for example, an auto mode in which the focal position is automatically adjusted and a manual mode in which the focal position is adjusted by the user may be switchable. Then, in a case of the auto mode, the focal position is adjusted by the focal position controller 34 as described above. On the other hand, in a case of the manual mode, the user inputs an operation of adjusting the focal position to the input unit 16, and the focal position controller 34 adjusts the focal position according to the user's operation.

(Imaging Controller)

The imaging controller 36 controls imaging by the imaging device 100 to capture an image. The imaging controller 36 controls, for example, the imaging element 12 to cause the imaging element 12 to acquire an image signal. For example, the imaging controller 36 may cause the imaging element 12 to acquire the image signal automatically, or may cause the imaging element 12 to acquire the image signal according to a user's operation.

(Image Acquisition Unit)

The image acquisition unit 38 acquires image data acquired by the imaging element 12. For example, the image acquisition unit 38 controls the image processing circuit 13 to cause the image processing circuit 13 to generate image data from the image signal generated by the imaging element 12, and acquires the image data. The image acquisition unit 38 stores the image data in the storage 22.

(Setting Flow of Focal Position)

Figure 25:
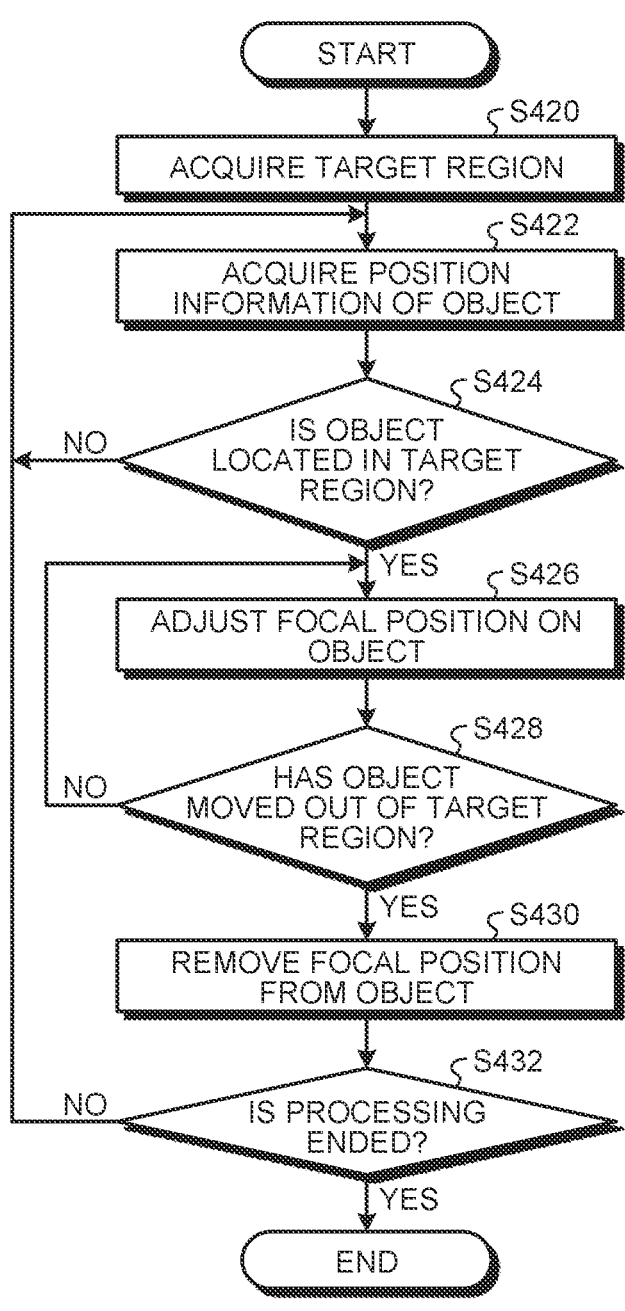
FIG. 25 is a flowchart for explaining a processing flow of adjusting a focal position.

Next, a processing flow of setting the focal position described above will be described. FIG. 25 is a flowchart for explaining a processing flow of adjusting a focal position. As illustrated in FIG. 25, the controller 24 causes the target region acquisition unit 30 to acquire information of the target region AR (Step S420), and causes the object information acquisition unit 32 to acquire position information of the object (Step S422). An execution order of Steps S420 and S422 may be arbitrary. The controller 24 causes the focal position controller 34 to determine whether the object is located in the target region AR based on the position information of the object (Step S424). In a case in which the object is not located in the target region AR (Step S424; No), the process returns to Step S422, and the acquisition of the position information of the object is continued. On the other hand, in a case in which the object is located in the target region AR (Step S424; Yes), the focal position controller 34 adjusts the focal position on the object (Step S426). Thereafter, the acquisition of the position information of the object is continued, and it is determined whether the object has moved to the outside of the target region AR (Step S428). In a case in which the object does not move out of the target region AR (Step S428; No), that is, in a case in which the object continues to exist in the target region AR, the process returns to Step S426, and the focal position is kept on the object. In a case in which the object has moved to the outside of the target region AR (Step S428; Yes), the focal position controller 34 removes the focal position from the object (Step S430).

Thereafter, in a case in which the processing is not ended (Step S432; No), the process returns to Step S422, and in a case in which the processing is ended (Step S432; Yes), this process ends.

(Effects)

As described above, the imaging device 100 according to the present embodiment includes the imaging element 12, the self-position acquisition unit 28, the object information acquisition unit 32, the target region acquisition unit 30, and the focal position controller 34. The self-position acquisition unit 28 acquires the position information of the imaging device 100, the object information acquisition unit 32 acquires the position information of the object existing in the imaging region AR0 of the imaging element 12, the target region acquisition unit 30 sets the target region AR in the imaging region AR0, and the focal position controller 34 controls the focal position of the imaging device 100 so as to adjust the focal position on the object in a case in which the object exists in the target region AR. In a case in which the self-position acquisition unit 28 determines that the imaging device 100 has moved, the target region acquisition unit 30 fixes the position of the target region AR.

Here, in an autofocus imaging device, it is required to adjust a focal position appropriately. For that, in a case in which an object exists in the target region AR, the imaging device 100 according to the present embodiment controls the focal position of the imaging device 100 so as to adjust the focal position on the object. Then, even in a case in which the imaging device 100 moves, the position of the target region AR is fixed. Therefore, according to the present embodiment, since the position of the target region AR can be fixed even in a case in which the imaging region AR0 moves, the focal position can be appropriately adjusted on the object in the remarkable region while changing the imaging region AR0.

Furthermore, in a case in which the first mode in which the position of the target region AR is fixed is set, the target region acquisition unit 30 fixes the position of the target region AR in a case in which the self-position acquisition unit 28 determines that the imaging device 100 has moved. On the other hand, in a case in which the second mode in which the position of the target region AR is not fixed is set, the target region acquisition unit 30 changes the position of the target region AR in a case in which the self-position acquisition unit 28 determines that the imaging device 100 has moved. Therefore, according to the present embodiment, it is possible to set whether to change or fix the remarkable region for the imaging region AR0 according to a situation, so that the focal position can be appropriately adjusted.

Furthermore, the target region acquisition unit 30 may set the target region AR such that the target region AR is located between the first position AX1 at which the distance from the imaging device 100 is the first distance L1 and the second position AX2 at which the distance from the imaging device 100 is the second distance L2 shorter n

Eighth Embodiment

Next, an eighth embodiment will be described. The eighth embodiment is different from the seventh embodiment in that a notification of a warning is provided in a case in which a distance between a boundary of the imaging region AR0 and the target region AR is less than a predetermined distance when an imaging device 100A moves in a state in which the position of the target region AR is fixed. In the eighth embodiment, the description of portions having the same configuration as that of the seventh embodiment will be omitted.

Figure 26:
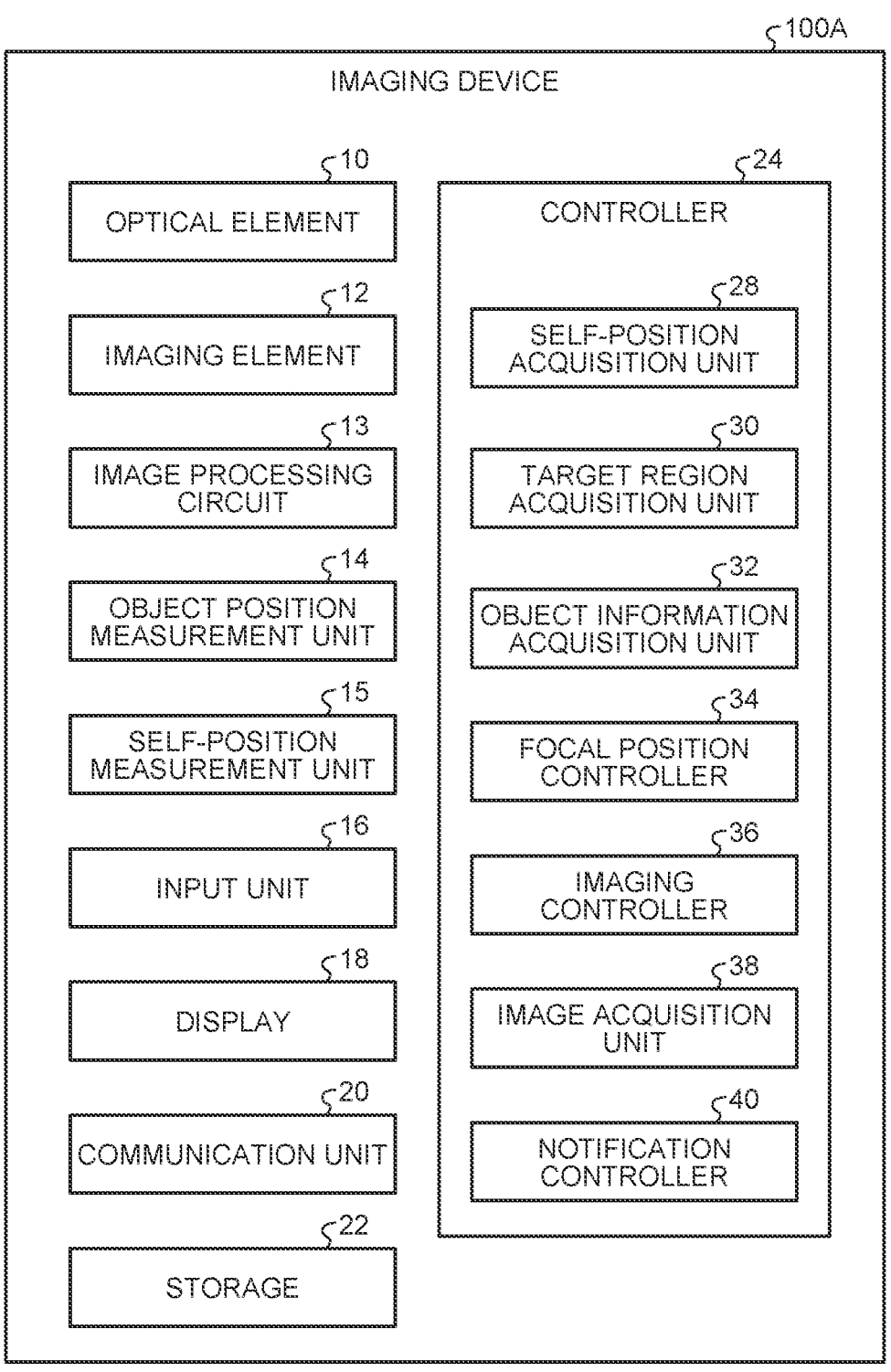
FIG. 26 is a schematic block diagram of an imaging device according to an eighth embodiment.

FIG. 26 is a schematic block diagram of an imaging device according to an eighth embodiment. As illustrated in FIG. 26, in an imaging device 100A according to the eighth embodiment, a notification controller 40 is included in the controller 24.

The notification controller 40 according to the eighth embodiment calculates a distance D in a case in which the position of the target region AR does not move even if the imaging device 100A moves (that is, in a case in which the first mode is set). The distance D is a distance between a boundary B of the imaging region AR0 and the target region AR. The boundary B of the imaging region AR0 refers to a boundary position between the range of the imaging region AR0 and an outside of the range of the imaging region AR0, in other words, can be said to be a peripheral edge of the imaging region AR0. The notification controller 40 calculates, as the distance D, a shortest distance between the boundary B of the imaging region AR0 and the target region AR in a state in which the target region AR is located in the imaging region AR0. That is, it can be said that the notification controller 40 sets a length of a shortest straight line among straight lines connecting each point on a peripheral edge of the target region AR and each point on the boundary B of the imaging region AR0 as the distance D. Note that the distance D may be calculated by an arbitrary method, but for example, the notification controller 40 may grasp in advance a position of the boundary B of the imaging region AR0 corresponding to the position of the imaging device 100A, and calculate the distance D from the boundary B and the position of the set target region AR.

The notification controller 40 determines whether the distance D is less than a predetermined distance. That is, the notification controller 40 determines whether the distance D has become less than the predetermined distance as the imaging device 100A moves. The predetermined distance here may be set arbitrarily. In a case in which the distance D is less than the predetermined distance, the notification controller 40 causes the imaging device 100A to output a warning. The warning here is information indicating that the distance D is less than a predetermined distance, and may have any content. For example, the notification controller 40 may cause the display 18 to display arbitrary information (for example, characters or symbols indicating a warning) indicating that the distance D is less than the predetermined distance, may cause a sound output unit (speaker) (not illustrated) provided in the imaging device 100A to output arbitrary sound (for example, alarm) indicating that the distance D is less than the predetermined distance, or may cause a device that outputs a tactile stimulus (for example, vibration) (not illustrated) provided in the imaging device 100A to output arbitrary tactile stimulus (for example, vibration) indicating that the distance D is less than the predetermined distance. On the other hand, the notification controller 40 does not output a warning in a case in which the distance D is not less than the predetermined distance, that is, in a case in which the distance D is equal to or more than the predetermined distance.

Figure 27:
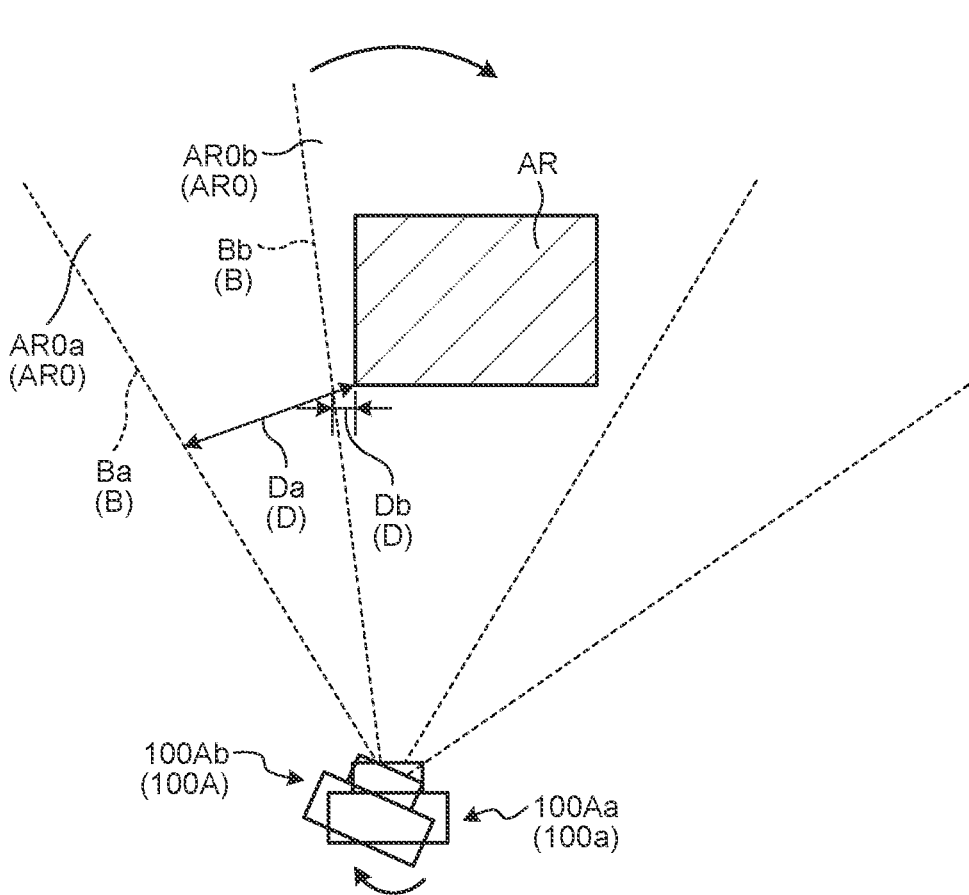
FIG. 27 is a schematic diagram illustrating an example of a target region according to an eighth embodiment.

The above processing will be described with reference to FIG. 27. FIG. 27 is a schematic diagram illustrating an example of a target region in the eighth embodiment. FIG. 27 exemplifies a case in which the imaging device 100A has moved from the position 100Aa to the position 100Ab. In this case, the position of the imaging region AR0 moves from the position AR0a to the position AR0b. In this example, since the first mode is set, the position of the target region AR is fixed and does not move. In this example, in a case in which the imaging device 100A is at the position 100Aa, the distance Da from the boundary Ba of the imaging region AR0 to the target region AR is a predetermined distance or more, and in a case in which the imaging device 100A is at the position 100Ab, the distance Db from the boundary Bb of the imaging region AR0 to the target region AR is less than the predetermined distance. Therefore, the notification controller 40 does not output a warning when the imaging device 100A is at the position 100Aa, and outputs a warning in a case in which the imaging device 100B is at the position 100Ab. Note that, since the distance measurement region also moves with the movement of the imaging device 100, the distance measurement region moves from the position AR0a to the position AR0b, and the boundary of the distance measurement region can be rephrased as the boundary B.

In this manner, by outputting a warning in a case in which the distance D is less than the predetermined distance, it is possible to notify the user in advance that there is a risk that the target region AR will go out of the range of the imaging region AR0 due to movement of the imaging device 100A, for example. Therefore, it is possible to prevent the target region AR from going out of the range of the imaging region AR0 by further moving the imaging device 100A.

Note that, in the above description of the eighth embodiment, it is assumed that a mode is set to either the first mode or the second mode, and a notification of a warning is provided in a case in which the distance between the boundary of the imaging region AR0 and the target region AR is less than the predetermined distance in the first mode. However, in the eighth embodiment, it is not necessary to be set to either the first mode or the second mode, and it is sufficient that the position of the target region AR can be set so as not to move even if the imaging device 100A moves. That is, the imaging device 100A according to the eighth embodiment may be set so that the position of the target region AR does not move even if the imaging device 100 moves, and may notify a warning in a case in which the distance between the boundary of the imaging region AR0 and the target region AR is less than a predetermined distance.

(Warning Notification Flow)

Figure 28:
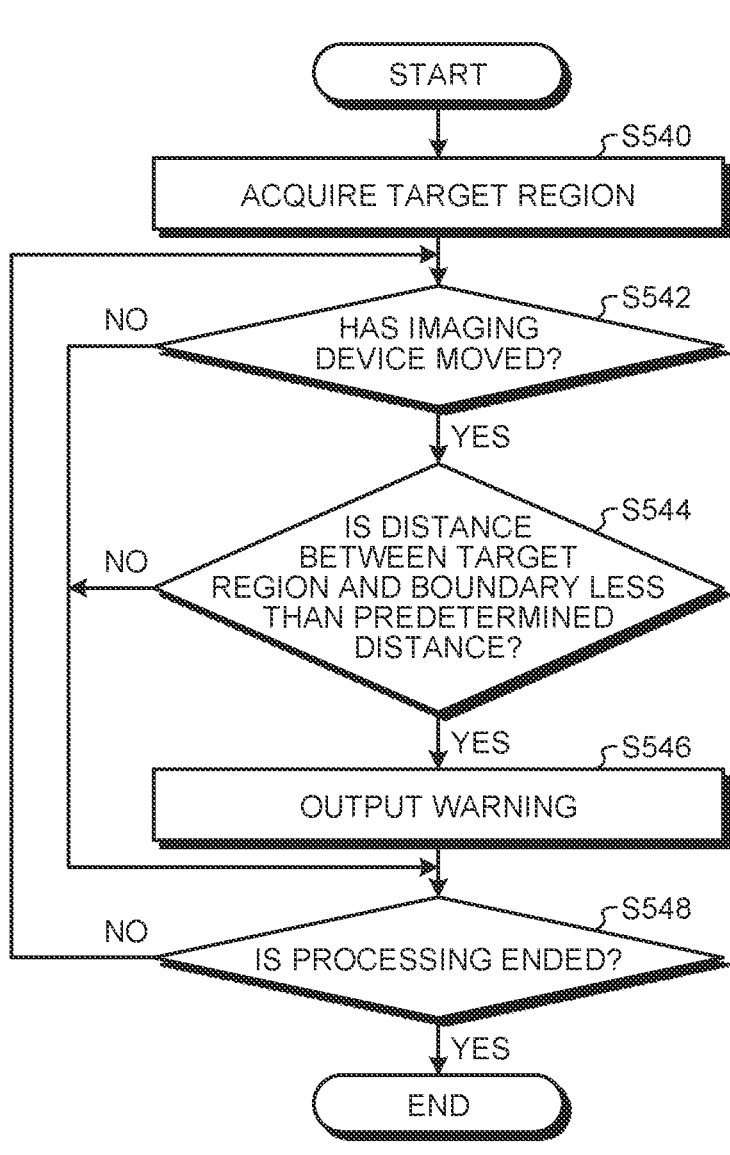
FIG. 28 is a flowchart for explaining a warning notification flow.

Next, the warning notification flow described above will be described. FIG. 28 is a flowchart for explaining a warning notification flow. As illustrated in FIG. 28, the controller 24 causes the target region acquisition unit 30 to acquire information about the target region AR (Step S540), and sets the target region AR. Then, the controller 24 determines whether the imaging device 100A has moved by the self-position acquisition unit 28 (Step S542). In a case in which it is determined that the imaging device 100A has moved (Step S542; Yes), the controller 24 causes the notification controller 40 to determine whether the distance D between the target region AR and the boundary B is less than the predetermined distance (Step S544). In a case in which the distance D between the target region AR and the boundary B is less than the predetermined distance, the notification controller 40 outputs a warning (Step S546). Thereafter, in a case in which the processing is not ended (Step S548; No), the process returns to Step S542, and in a case in which the processing is ended (Step S548; Yes), this process ends. On the other hand, in a case in which it is determined that the imaging device 100A does not move (Step S542; No), the process also proceeds to Step S548. Furthermore, in a case in which it is determined that the imaging device 100A has moved and the distance D between the target region AR and the boundary B is not less than the predetermined distance (Step S544; No), that is, in a case in which the distance D is the predetermined distance or more, the process proceeds to Step S548 without moving the target region AR.

As described above, in the eighth embodiment, in a case in which the imaging region AR0 is moved by the movement of the imaging device 100A, and the distance D from the target region AR to the boundary B between the inside of the imaging region AR0 and the outside of the imaging region AR0 is less than the predetermined distance, the notification controller 40 outputs a warning. In this manner, by outputting a warning in a case in which the distance D is less than the predetermined distance, it is possible to notify the user in advance that there is a risk that the target region AR will go out of the range of the imaging region AR0 due to movement of the imaging device 100A, for example. Therefore, it is possible to prevent the target region AR from going out of the range of the imaging region AR0 by further moving the imaging device 100A.

Note that, for example, in a case in which the imaging device 100A automatically moves by a moving mechanism (not illustrated), when the distance D is less than a predetermined distance, the controller 24 may control the moving mechanism to stop the movement of the imaging device 100A in a direction in which the distance D further decreases. This movement stop process may be performed together with the output of the warning, or the movement stop process may be performed instead of the output of the warning.

Ninth Embodiment

Next, a ninth embodiment will be described. The ninth embodiment is different from the seventh embodiment in that a focal position is adjusted on an object that exists in a target region AR and satisfies a predetermined condition. In the ninth embodiment, the description of portions having the same configuration as that of the seventh embodiment will be omitted. The ninth embodiment is also applicable to the eighth embodiment.

In the ninth embodiment, the focal position controller 34 adjusts the focal position on an object that exists in the target region AR and satisfies a predetermined condition. The focal position controller 34 does not adjust the focal position on the object that does not satisfy at least one of a condition that the object exists in the target region AR and a condition that a predetermined condition is satisfied. The focal position controller 34 keeps the focal position on the object while the object at the focal position continues to exist in the target region AR while satisfying a predetermined condition. On the other hand, in a case in which the object no longer satisfies at least one of the condition that the object exists in the target region AR or the condition that the predetermined condition is satisfied, the focal position controller 34 removes the focal position from the object. That is, for example, in a case in which the object satisfies the predetermined condition but moves out of the target region AR, or in a case in which the object exists in the target region AR but no longer satisfies the predetermined condition, the focal position controller 34 removes the focal position from the object.

The focal position controller 34 may determine whether the predetermined condition is satisfied by an arbitrary method, but for example, may determine whether the predetermined condition is satisfied based on at least one of the position information of the object or the image of the object. Here, the position information of the object may refer to a measurement result of the object position measurement unit 14, and the image of the object may refer to image data which is acquired by the imaging element 12 and in which the object is imaged.

The predetermined condition here may be any condition except a condition that the object does not exist in the target region AR. For example, the predetermined condition may be at least one of a condition that the object is performing a predetermined motion, a condition that the object has a predetermined shape, or a condition that the object is oriented in a predetermined direction. In addition, any two of these conditions may be set as the predetermined condition, or all of these conditions may be set as the predetermined condition. In a case in which multiple predetermined conditions are set, the focal position controller 34 determines that the predetermined conditions are satisfied in a case in which all the conditions are satisfied.

A case in which the motion of the object is set to a predetermined condition will be described. In this case, the focal position controller 34 determines whether the object is performing a predetermined motion based on the position information of the object continuously acquired in time series. The focal position controller 34 adjusts the focal position of the object existing in the target region AR and performing a predetermined motion. The focal position controller 34 does not adjust the focal position of the object that does not satisfy at least one of the condition that the object exists in the target region AR and the condition that the object performs the predetermined motion. The focal position controller 34 keeps the focal position on the object while the object on the focal position exists in the target region AR and continues the predetermined motion. On the other hand, in a case in which the object no longer satisfies at least one of the condition that the object exists in the target region AR and the condition that the object performs the predetermined motion, the focal position controller 34 removes the focal position from the object. Note that the motion of the object here refers to a moving mode of the object, and may refer to, for example, a moving direction and a moving speed of the object. For example, in a case in which the predetermined motion indicates that the object moves vertically downward at a speed of 10 m/h or more, the focal position controller 34 adjusts the focal position of the object moving vertically downward at a speed of 10 m/h or more in the target region AR. Note that the motion of the object is not limited to a motion indicating the moving direction and the moving speed of the object, and may indicate an arbitrary moving mode. For example, the motion of the object may refer to at least one of the moving direction and the moving speed of the object.

Figure 29:
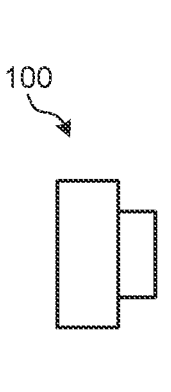
FIG. 29 is a schematic diagram illustrating an example of a case in which a motion of the object is set as a predetermined condition.
Figure 29:
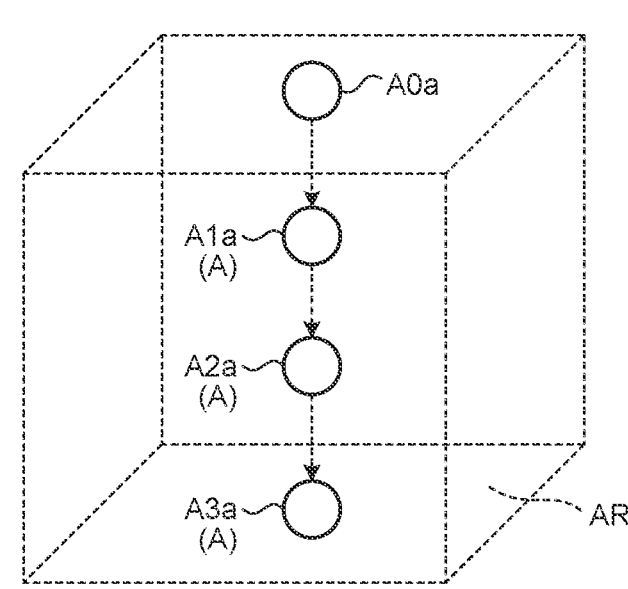

FIG. 29 is a schematic diagram illustrating an example of a case in which a motion of the object is set as a predetermined condition. In the example of FIG. 8, the predetermined condition is that the object moves vertically downward (in the direction opposite to the Z direction), that is, the moving direction of the object. Then, the example of FIG. 8 illustrates a case in which the object A moves vertically downward from the position A0$a$ to the position A3$a$ through the position A1$a$ and the position A2$a$ and stops at the position A3$a$. The position A0$a$ is outside the target region AR, and the positions A1$a$, A2$a$, and A3$a$ are inside the target region AR. In this case, since the object A is out of the target region AR at a timing when the object A exists at the position A0$a$, the focal position controller 34 does not adjust the focal position on the object A but, for example, adjusts the focal position on the preset setting position. Then, the focal position controller 34 adjusts the focal position on the object A at a timing when the object A exists at the position A1$a$, that is, at a timing when the object A enters the target region AR while moving vertically downward. The focal position controller 34 keeps the focal position on the object A even at a timing when the object A exists at the position A2$a$, and removes the focal position from the object A and returns the focal position to the preset setting position at a timing when the object A moves to the position A3$a$ and stops.

Next, a case in which a shape of the object is set to a predetermined condition will be described. In this case, the focal position controller 34 determines whether the object has a predetermined shape based on the image data in which the object is captured. The focal position is adjusted on the object existing in the target region AR and having a predetermined shape. The focal position controller 34 does not adjust the focal position on the object that does not satisfy at least one of the condition that the object exists in the target region AR and the condition that the object has a predetermined shape. The focal position controller 34 keeps the focal position on the object while the object at the focal position has a predetermined shape and continues to exist in the target region AR. On the other hand, in a case in which the object no longer satisfies at least one of the condition that the object exists in the target region AR and the condition that the object has the predetermined shape, the focal position controller 34 removes the focal position from the object. The shape of the object here may be, for example, at least one of a size of the object or an outer shape of the object. For example, in a case in which the predetermined shape indicates a predetermined size or more, the focal position controller 34 adjusts the focal position on an object existing in the target region AR and having a predetermined size or more. Note that a 3D shape information acquired by the object information acquisition unit 32 may be used to acquire a shape information of the object.

A case in which the orientation of the object is set to a predetermined condition will be described. In this case, the focal position controller 34 determines whether the object is directed in a predetermined direction based on the image data in which the object is captured. The focal position is adjusted with respect to the object existing in the target region AR and facing the predetermined direction. The focal position controller 34 does not adjust the focal position on the object that does not satisfy at least one of the condition that the object exists in the target region AR and the condition that the object is directed in the predetermined direction. The focal position controller 34 keeps the focal position on the object during a period in which the object on the focal position is kept existing in the target region AR while facing the predetermined direction. On the other hand, in a case in which the object no longer satisfies at least one of the condition that the object exists in the target region AR and the condition that the object is directed in the predetermined direction, the focal position controller 34 removes the focal position from the object. Note that the information on the 3D shape acquired by the object information acquisition unit 32 may be used to acquire the information on the orientation of the object.

Note that the predetermined condition may be set by an arbitrary method, for example, may be set in advance. In this case, the focal position controller 34 may read information (for example, the moving direction and the moving speed) indicating a preset predetermined condition from the storage 22, or may acquire a predetermined condition from another device via the communication unit 20. Furthermore, for example, in a case in which a predetermined condition is not set in advance, the focal position controller 34 may automatically set a predetermined condition. Furthermore, for example, the user may set a predetermined condition. In this case, for example, the user may input information (for example, a moving direction and a moving speed) designating a predetermined condition to the input unit 16, and the focal position controller 34 may set a predetermined condition based on the information designated by the user.

As described above, in the ninth embodiment, the focal position controller 34 may set the focal position on the object existing in the target region AR and performing the predetermined motion. The focal position controller 34 keeps the focal position on the object during a period in which the object performs the predetermined motion, and removes the focal position from the object when the object no longer performs the predetermined motion. In this manner, in addition to being within the target region AR, satisfying a predetermined motion is also a condition for setting the focal position, whereby an object having a specific motion can be tracked and the focal position can be adjusted appropriately. For example, it is possible to detect a drop in the target region AR or the like.

In the ninth embodiment, the focal position controller 34 may adjust the focal position on an object existing in the target region AR and having a predetermined shape. As described above, in addition to being in the target region AR, it is possible, by setting the predetermined shape as a condition for adjusting the focal position, to track an object having a specific shape and appropriately adjust the focal position.

In the ninth embodiment, the focal position controller 34 may adjust the focal position on an object existing in the target region AR and facing a predetermined direction. As described above, in addition to being in the target region AR, it is possible, by setting the condition that the object faces the predetermined direction as the condition for setting the focal position, to track the object in a specific direction and appropriately adjust the focal position.

Tenth Embodiment (Configuration of Imaging Device)

Figure 30:
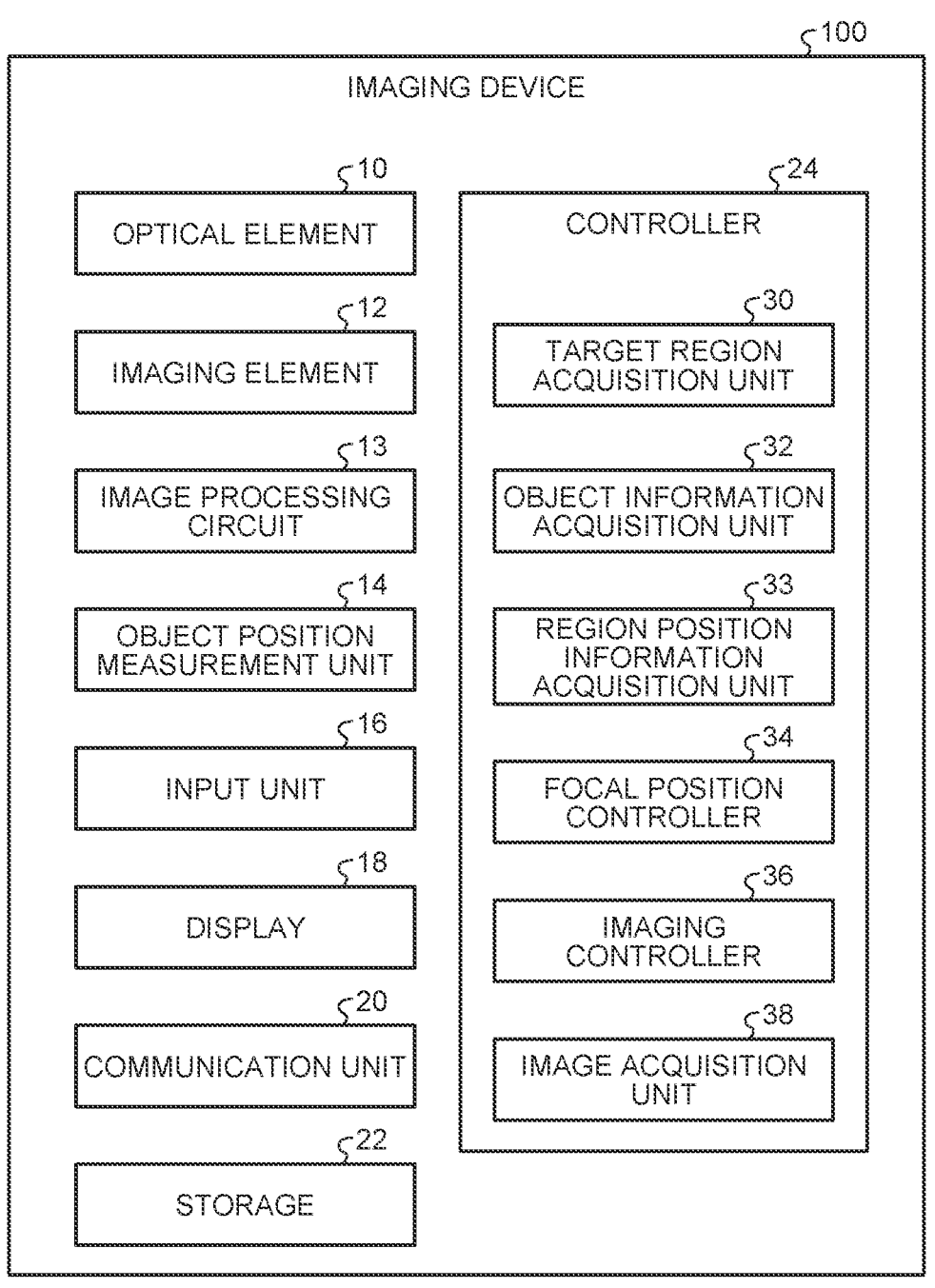
FIG. 30 is a schematic block diagram of an imaging device according to a 10 the embodiment.

FIG. 30 is a schematic block diagram of an imaging device according to a tenth embodiment. An imaging device 100 according to the tenth embodiment is an imaging device that images an object within an imaging range. The imaging device 100 is an autofocus camera capable of automatically adjusting a focal position. The imaging device 100 may be a video camera that captures a moving image by capturing an image for each predetermined frame, or may be a camera that captures a still image. The imaging device 100 may be used for any purpose, and for example, may be used as a monitoring camera set at a predetermined position in facilities or outdoors.

As illustrated in FIG. 30, the imaging device 100 includes an optical element 10, an imaging element 12, an image processing circuit 13, an object position measurement unit 14, an input unit 16, a display 18, a communication unit 20, a storage 22, and a controller 24.

The optical element 10 is, for example, an element of an optical system such as a lens. The number of optical elements 10 may be one or plural.

The imaging element 12 is an element that converts light incident through the optical element 10 into an image signal that is an electric signal. The imaging element 12 is, for example, a charge coupled device (CCD) sensor, a complementary metal oxide semiconductor (CMOS) sensor, or the like.

The image processing circuit 13 generates image data for each frame from the image signal generated by the imaging element 12. The image data is, for example, data including information of luminance and color of each pixel in one frame, and may be data to which gradation for each pixel is assigned.

The object position measurement unit 14 is a sensor that measures a position of an object to be measured with respect to the imaging device 100 (a relative position of the object). The object here may be any object, and may be a living thing or an inanimate object, and it similarly applies to following descriptions. In addition, the object here may refer to a movable object, but is not limited thereto, and may refer to an object that does not move.

In the present embodiment, the object position measurement unit 14 measures the distance from the imaging device 100 to the object as the relative position of the object. The object position measurement unit 14 may be any sensor capable of measuring the relative position of the object, and may be, for example, a time of flight (TOF) sensor. In a case in which the object position measurement unit 14 is a TOF sensor, for example, a light emitting element (for example, a light emitting diode (LED) that emits light and a light receiving unit that receives light are provided, and the distance to the object is measured by a flight time of the light emitted from the light emitting element to the object and returned to the light receiving unit. Note that, in addition to measuring the distance from the imaging device 100 to the object as the relative position of the object, the object position measurement unit 14 may also measure, for example, a direction in which the object exists with respect to the imaging device 100. In other words, the object position measurement unit 14 may measure, as the relative position of the object, the position (coordinates) of the object in the coordinate system in which the imaging device 100 is set as an origin.

The input unit 16 is a mechanism that receives an input (operation) from a user, and may be, for example, a button, a keyboard, a touch panel, or the like.

The display 18 is a display panel that displays an image. In addition to the image captured by the imaging device 100, the display 18 may be capable of displaying an image for the user to set a target region AR described later.

The communication unit 20 is a communication module that communicates with an external device, and may be, for example, an antenna, a Wi-Fi (registered trademark) module, or the like. Although the imaging device 100 communicates with an external device by wireless communication, wired communication may be used, and a communication method may be arbitrary.

The storage 22 is a memory that stores captured image data and various types of information such as calculation contents and programs of the controller 24, and includes at least one of, for example, a random access memory (RAM), a main storage device such as a read only memory (ROM), or an external storage device such as a hard disk drive (HDD). The program for the controller 24 stored in the storage 22 may be stored in a recording medium readable by the imaging device 100.

The controller 24 is an arithmetic device, and includes, for example, an arithmetic circuit such as a central processing unit (CPU). The controller 24 includes a target region acquisition unit 30, an object information acquisition unit 32, a region position information acquisition unit 33, a focal position controller 34, an imaging controller 36, and an image acquisition unit 38. The controller 24 reads and executes a program (software) from the storage 22 to implement the target region acquisition unit 30, the object information acquisition unit 32, the region position information acquisition unit 33, the focal position controller 34, the imaging controller 36, and the image acquisition unit 38, and executes these processes. Note that the controller 24 may execute these processes by one CPU, or may include multiple CPUs and execute the processes by the multiple CPUs. In addition, at least a part of the processing of the target region acquisition unit 30, the object information acquisition unit 32, the region position information acquisition unit 33, the focal position controller 34, the imaging controller 36, and the image acquisition unit 38 may be implemented by a hardware circuit.

The target region acquisition unit 30 acquires information of the target region AR for adjusting a focal position, the object information acquisition unit 32 acquires position information of an object to be imaged, the region position information acquisition unit 33 acquires region position information for synchronizing the target region AR among the multiple devices 100, the focal position controller 34 controls the focal position of the imaging device 100, the imaging controller 36 controls imaging by the imaging device 100, and the image acquisition unit 38 acquires an image captured by the imaging device 100. Each of these processes will be described later.

(Imaging System)

In the present embodiment, multiple imaging devices 100 performs imaging, and a target region AR of each of the imaging devices 100 is set such that partial regions of the target region AR of each of the imaging devices 100 overlap each other. Hereinafter, an imaging system including multiple imaging devices 100 is referred to as an imaging system 1. Hereinafter, an example in which the imaging system 1 includes a first imaging device 100*a* and a second imaging device 100*b* will be described, but the number of imaging devices 100 included in the imaging system 1 is not limited to two, and may be any number of three or more.

(Setting of Target Region)

Each imaging device 100 sets the target region AR. Hereinafter, a method of setting the target region AR will be described. Hereinafter, the target region AR of the first imaging device 100*a* is referred to as a first target region ARa, and the target region AR of the second imaging device 100*b* is referred to as a second target region ARb. In a case in which the first target region ARa and the second target region ARb are not distinguished from each other, the first target region ARa and the second target region ARb are simply referred to as a target region AR.

(Setting of Target Region of First Imaging Device)

The first imaging device 100*a* acquires, by the target region acquisition unit 30, information of the target region AR (the first target region ARa) set in the imaging region AR0 of the first imaging device 100*a*. The target region AR is a region set to automatically adjust the focal position. The information of the target region AR is information indicating the position of the target region AR, that is, position information of the target region AR.

Figure 31:
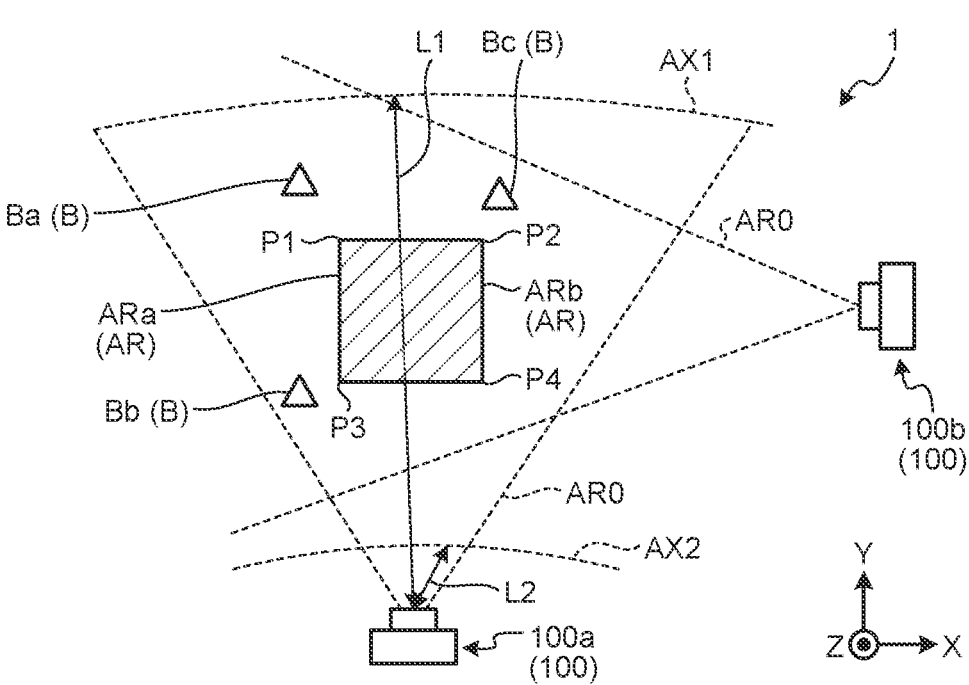
FIG. 31 is a schematic diagram for explaining an example of a target region.
Figure 32:
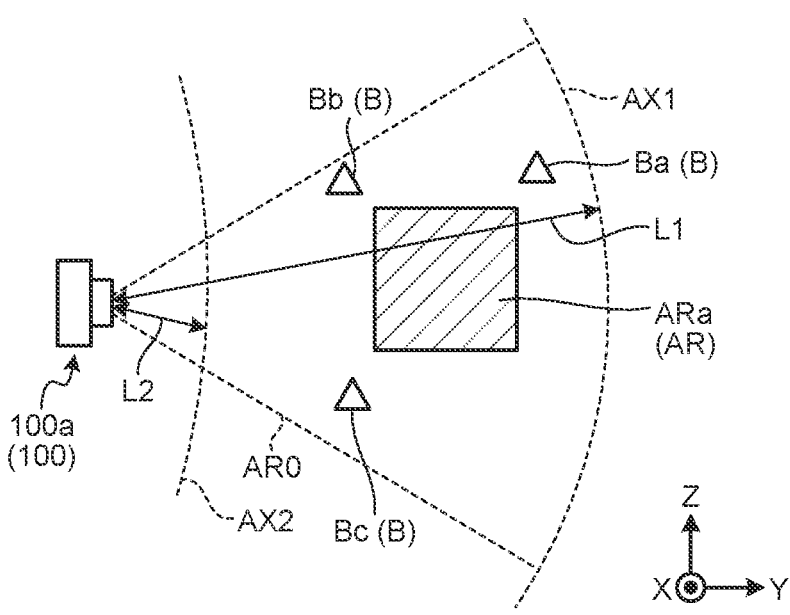
FIG. 32 is a schematic diagram for explaining an example of a target region.

FIGS. 31 and 32 are schematic diagrams for explaining an example of a target region. FIG. 31 is a diagram of the imaging device 100 and the target region AR as viewed from above in a vertical direction, and FIG. 32 is a diagram of the imaging device 100 and the target region AR as viewed from a horizontal direction.

Hereinafter, a direction Z is a vertical direction, a direction X is one direction of a horizontal direction orthogonal to the direction Z, and a direction Y is a direction (horizontal direction) orthogonal to the direction Z and the direction X. As illustrated in FIGS. 31 and 32, a range in which an image can be captured by the imaging device 100 is set as an imaging region AR0. The imaging region AR0 refers to a region (space) within an angle of view of the imaging element 12, in other words, a range that can be captured as an image in the real space. The target region AR is a region (space) set within the range of the imaging region AR0.

The first target region ARa is located between a first position AX1 and a second position AX2 in the imaging region AR0 of the first imaging device 100*a*. The first position AX1 is a position where a distance from the first imaging device 100*a* is a first distance L1, and the second position AX2 is a position where a distance from the first imaging device 100*a* is a second distance L2 shorter than the first distance L1. As illustrated in FIGS. 31 and 32, in the present embodiment, the first position AX1 can be said to be a virtual plane including each position (coordinate) at which the distance from the first imaging device 100*a* is the first distance L1 in the imaging region AR0 of the first imaging device 100*a*. Similarly, it can be said that the second position AX2 is a virtual plane including each position (coordinate) at which the distance from the first imaging device 100*a* is the second distance L2 in the imaging region AR0 of the first imaging device 100*a*. That is, the first target region ARa can be said to be a space that occupies at least a part of a space surrounded by a virtual plane whose distance from the first imaging device 100*a* is the second distance L2 and a virtual plane whose distance from the first imaging device 100*a* is the first distance L1 in the imaging region AR0 of the first imaging device 100*a*. Note that the first position AX1 is not limited to a virtual plane in which all positions (coordinates) included in the first position AX1 become the first distance L1 from the first imaging device 100*a*, and may be a virtual plane in which at least some positions (coordinates) included in the first position AX1 become the first distance L1 from the first imaging device 100a. Similarly, the second position AX2 may be a virtual plane in which at least a part of the position (coordinates) included in the second position AX2 is a second distance L2 from the first imaging device 100a.

Note that the size and the shape of the first target region ARa are not limited to the above description and may be arbitrary. In addition, the position of the first target region ARa is not limited to the above description and may be arbitrary. For example, the first target region ARa is not limited to being located between the first position AX1 and the second position AX2. Furthermore, in the above description, the first target region ARa is a region set in the imaging region AR0 of the first imaging device 100a, but the present invention is not limited thereto. For example, assuming that a range that can be measured by the object position measurement unit 14 of the first imaging device 100a is a distance measurement region (a distance measurement space), the first target region ARa may be a region set in the distance measurement region. In this case, the imaging region AR0 in FIGS. 31 to 32 may be treated as a distance measurement region.

The target region acquisition unit 30 of the first imaging device 100a may acquire the information of the first target region ARa by an arbitrary method. For example, the position of the first target region ARa may be set in advance. In this case, the target region acquisition unit 30 of the first imaging device 100a may read the position information of the first target region ARa set in advance from the storage 22, or may acquire the position information of the first target region ARa from another device via the communication unit 20. Furthermore, for example, in a case in which the position of the first target region ARa is not set in advance, the target region acquisition unit 30 may automatically set the position of the first target region ARa. Furthermore, for example, the user may set the position of the first target region ARa. In this case, for example, the user may input information (for example, values of the first distance L1 and the second distance L2, and the like) designating the position of the first target region ARa to the input unit 16 of the first imaging device 100a, and the target region acquisition unit 30 may set the first target region ARa based on the position information of the first target region ARa designated by the user. Furthermore, for example, the first target region ARa may be set by designating coordinates. That is, for example, in the example of FIG. 31, coordinates P1, P2, P3, and P4 that are vertex positions of the target region AR may be designated, and a region surrounded by the coordinates P1 to P4 may be set as the first target region ARa.

(Acquisition of Region Position Information)

The first imaging device 100a acquires region position information by the region position information acquisition unit 33. The region position information is information indicating a position (a relative position) of the first target region ARa with respect to the reference object B. Specifically, the first imaging device 100a acquires the position information of the reference object B existing in the imaging region AR0 by the object information acquisition unit 32. The object information acquisition unit 32 controls the object position measurement unit 14 to cause the object position measurement unit 14 to measure the relative position of the reference object B with respect to the first imaging device 100a. The object information acquisition unit 32 acquires a measurement result of the relative position of the reference object B with respect to the first imaging device 100a by the object position measurement unit 14 as position information of the reference object B.

The region position information acquisition unit 33 of the first imaging device 100a calculates a position (a relative position) of the first target region ARa with respect to the reference object B based on the position information of the reference object B and the position information of the first target region ARa, and acquires the position of the first target region ARa with respect to the reference object B as region position information. The region position information can be said to be information indicating coordinates of the first target region ARa with respect to the position (coordinates) of the reference object B, and can also be said to be information indicating a deviation of the position of the first target region ARa with respect to the position of the reference object B. Here, the position of the first target region ARa with respect to the reference object B may refer to, for example, a position of a reference point (for example, a center point) of the first target region ARa with respect to the reference object B, or may refer to a position of each vertex of the first target region ARa with respect to the reference object B.

In the present embodiment, the region position information acquisition unit 33 of the first imaging device 100a acquires the region position information based on three or more reference objects B. That is, the region position information acquisition unit 33 acquires, as the region position information, information indicating the position of the first target region ARa with respect to each of the three or more reference objects B. In the example of FIG. 31, three reference objects Ba, Bb, and Bc are set, and the region position information acquisition unit 33 acquires the position of the first target region ARa with respect to the reference object Ba, the position of the first target region ARa with respect to the reference object Bb, and the position of the first target region ARa with respect to the reference object Bc as the region position information. However, the number of reference objects B used for the region position information is not limited to three or more, and may be one or any number of two or more.

The region position information acquisition unit 33 of the first imaging device 100a may select the object to be the reference object B by an arbitrary method. For example, the region position information acquisition unit 33 may automatically select the reference object B. In this case, for example, the region position information acquisition unit 33 may extract an object existing in the imaging region AR0 (or in the distance measurement region) of both the first imaging device 100a and the second imaging device 100b based on the position information of the object acquired by the object information acquisition unit 32, and select the reference object B from among the extracted objects. Further, for example, the user may designate the reference object B. In this case, for example, the user may input information designating the reference object B to the input unit 16 of the first imaging device 100a based on the image in the imaging region AR0 displayed on the display 18 (for example, by touch of an object on the image), and the target region acquisition unit 30 may set the object designated by the user as the reference object B.

In addition, in the above description, after the first target region ARa and the reference object B are set independently of each other, the region position information that is the relative position between the first target region ARa and the reference object B is calculated. However, the present invention is not limited thereto, and for example, after the reference object B and the region position information are set, the first target region ARa may be set based on the position of the reference object B and the region position information.

The region position information acquisition unit 33 of the first imaging device 100*a* transmits the acquired region position information to the second imaging device 100*b* via the communication unit 20. Note that, since the second imaging device 100*b* does not set the region position information, the region position information acquisition unit 33 illustrated in FIG. 30 may not be included.

(Setting of Target Region of Second Imaging Device)

The target region acquisition unit 30 of the second imaging device 100*b* acquires region position information from the first imaging device 100*a* via the communication unit 20. The second imaging device 100*b* sets the second target region ARb by the target region acquisition unit 30 based on the region position information acquired from the first imaging device 100*a*. Hereinafter, a specific description will be given.

The target region acquisition unit 30 of the second imaging device 100*b* acquires information of the reference object B. The information on the reference object B refers to information on the reference object B used by the first imaging device 100*a* to acquire the region position information, and in other words, can be said to be information indicating which of the objects existing in the imaging region AR0 (or the distance measurement region) of the second imaging device 100*b* is the reference object B. The target region acquisition unit 30 of the second imaging device 100*b* may acquire the information of the reference object B by an arbitrary method. For example, the information on the reference object B may be transmitted from the first imaging device 100*a* together with the region position information, and the target region acquisition unit 30 of the second imaging device 100*b* may acquire the information on the reference object B from the first imaging device 100*a*. Further, for example, the user may input information of the reference object B. In this case, for example, the user may recognize the information of the reference object B in advance, and input the information designating the reference object B to the input unit 16 of the second imaging device 100*b* based on the image in the imaging region AR0 displayed on the display 18 (for example, by touch of the object on the image), and the target region acquisition unit 30 may set the object designated by the user as the reference object B.

The object information acquisition unit 32 of the second imaging device 100*b* acquires the position information of the reference object B designated in the information of the reference object B acquired by the target region acquisition unit 30. The object information acquisition unit 32 controls the object position measurement unit 14 to cause the object position measurement unit 14 to measure the relative position of the reference object B with respect to the second imaging device 100*b*. The object information acquisition unit 32 acquires a measurement result of the relative position of the reference object B with respect to the second imaging device 100*b* by the object position measurement unit 14 as the position information of the reference object B.

The target region acquisition unit 30 of the second imaging device 100*b* sets the second target region ARb based on the position information of the reference object B and the region position information. The target region acquisition unit 30 sets, as the second target region ARb, a position shifted from the position of the reference object B with respect to the second imaging device 100*b* by a deviation (a distance between the reference object B and the first target region ARa) of the position of the first target region ARa with respect to the reference object B indicated by the region position information.

As described above, since the first target region ARa and the second target region ARb are set at positions shifted from the common reference object B by the same deviation, the first target region ARa and the second target region ARb are set to overlap each other. In the present embodiment, the first target region ARa and the second target region ARb are set to completely overlap each other, that is, an entire region of the first target region ARa and an entire region of the second target region ARb are set to overlap each other without deviation.

The method of setting the first target region ARa and the second target region ARb is not limited to the above description and is arbitrary, and is not limited to the setting using the reference object B and the region position information. The first target region ARa and the second target region ARb may be set by any method such that at least a partial region (space) of the first target region ARa and at least a partial region (space) of the second target region ARb overlap each other.

Note that the second target region ARb is set to be located within the imaging region AR0 of the second imaging device 100*b*, and is set to be located within the distance measurement region of the second imaging device 100*b*. Furthermore, the second target region ARb may be located between a first position where a distance from the second imaging device 100*b* is a first distance L1 and a second position where a distance from the second imaging device 100*b* is a second distance L2.

(Setting Flow of Target Region)

Figure 33:
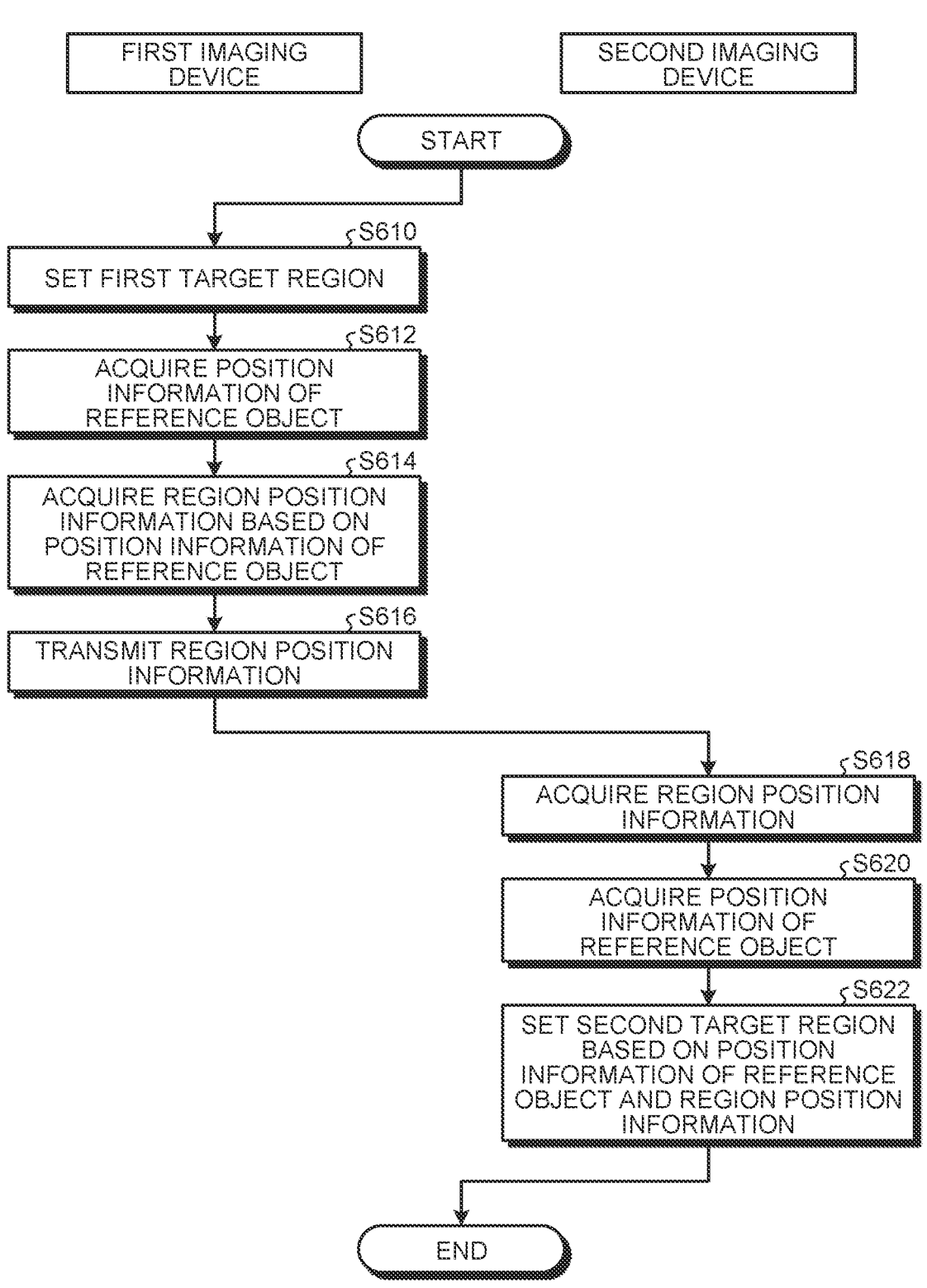
FIG. 33 is a flowchart for explaining a setting flow of a target region.

A setting flow of the target region AR of the multiple imaging devices 100 described above will be described. FIG. 33 is a flowchart for explaining a setting flow of the target regions. As illustrated in FIG. 33, in the first imaging device 100*a*, the target region acquisition unit 30 sets the first target region ARa (Step S610), and the object information acquisition unit 32 acquires the position information of the reference object B (information on a relative position of the reference object B with respect to the first imaging device 100*a*) (Step S612). An execution order of Steps S610 and S612 may be arbitrary. Thereafter, the first imaging device 100*a* causes the region position information acquisition unit 33 to acquire region position information based on the position information of the reference object B (Step S614), and transmits the region position information to the second imaging device 100*b* (Step S616).

The second imaging device 100*b* acquires region position information from the first imaging device 100*a* (Step S618), and acquires position information of the reference object B (information on a relative position of the reference object B with respect to the second imaging device 100*b*) by the object information acquisition unit 32 (Step S620). The second imaging device 100*b* sets the second target region ARb by the target region acquisition unit 30 based on the position information of the reference object B and the region position information (Step S622).

Note that, in the above description, the method of setting the target region AR for the two imaging devices 100 has been described. However, even in a case in which there are three or more imaging devices 100, the target region AR may be set by a similar method. That is, for example, in a case in which the third imaging device is provided, the third imaging device may set the target region AR of the third imaging device based on the position information and the region position information of the reference object B, similarly to the second imaging device 100*b*.

(Setting of Focal Position)

Next, a method of adjusting a focal position will be described. Since the setting of the focal position is the same in each imaging device 100 (in this example, the first imaging device 100*a* and the second imaging device 100*b*), it will be simply described as the imaging device 100.

The object information acquisition unit 32 acquires position information of an object existing in an imaging region AR0. The object information acquisition unit 32 controls the object position measurement unit 14 to cause the object position measurement unit 14 to measure the relative position of the object with respect to the imaging device 100. The object information acquisition unit 32 acquires a measurement result of the relative position of the object with respect to the imaging device 100 by the object position measurement unit 14 as position information of the object. The object information acquisition unit 32 sequentially acquires the position information of the object by acquiring the position information of the object every predetermined time. Furthermore, the object information acquisition unit 32 can also acquire information indicating a shape of the object (for example, a 3D shape of the object) based on the position information of the object. For example, the object information acquisition unit 32 can acquire the 3D shape of the object by accumulating multiple pieces of position information such as TOF image information.

The focal position controller 34 sets a focal position of the imaging device 100. The focal position controller 34 controls the focal position by controlling a position of the optical element 10, that is, by moving the position of the optical element 10.

The focal position controller 34 adjusts the focal position on the object existing in the target region AR. In other words, the focal position controller 34 sets the focal position at the position of the object determined to exist in the target region AR. In the present embodiment, the focal position controller 34 determines whether the object exists in the target region AR based on the position information of the object acquired by the object information acquisition unit 32. In a case in which the position of the object acquired by the object information acquisition unit 32 overlaps with the position of the target region AR, the focal position controller 34 determines that the object exists in the target region AR and sets the focal position at the position of the object acquired by the object information acquisition unit 32. On the other hand, the focal position controller 34 does not adjust the focal position on an object that does not exist in the target region AR.

The focal position controller 34 keeps the focal position on the object during a period in which the object at the focal position exists in the target region AR. That is, the focal position controller 34 determines whether or not the object continues to exist in the target region AR based on the position information of the object at every predetermined time acquired by the object information acquisition unit 32, and keeps the focal position on the object during a period in which the object continues to exist in the target region AR. On the other hand, in a case in which the object on the focal position moves out of the target region AR, that is, in a case in which the object no longer exists in the target region AR, the focal position controller 34 takes the focal position out of the object and focuses on a position other than the object.

Note that the focal position controller 34 may not set the focal position of the object existing in the target region AR from the start of operation of the imaging device 100 (a timing at which the imaging becomes possible). That is, the focal position controller 34 may set the focal position of the object entering the target region AR after starting the operation. In other words, the focal position controller 34 may set the focal position of an object from a timing at which the object starts to exist in the target region AR for the object that exists in the target region AR at a certain timing but does not exist in the target region AR at a timing before the certain timing. In other words, in a case in which the object moves from the outside of the target region AR into the target region AR, the object may be recognized as a target on which the focal position controller 34 focuses. That is, the focal position controller 34 may set the focal position of the object moved from the outside of the target region AR into the target region AR.

Furthermore, in a case in which there is no object in the target region AR, the focal position controller 34 may set the focal position to a preset setting position. The preset setting position may be arbitrarily set, but is preferably set in the target region AR such as a center position of the target region AR.

Figure 34:
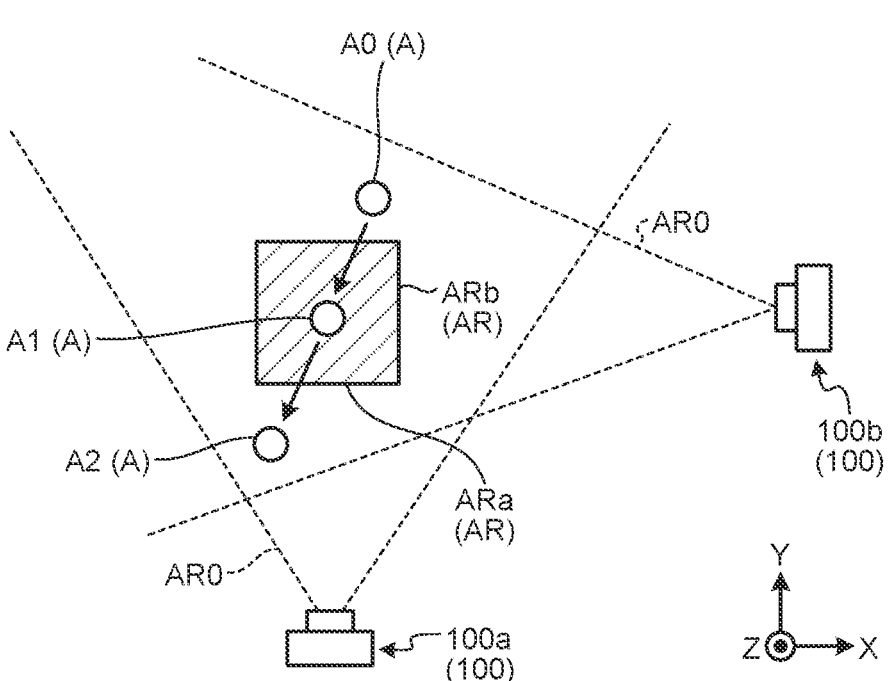
FIG. 34 is a schematic diagram for explaining setting of a focal position.

An example of setting the focal position described above will be described with reference to FIG. 34. FIG. 34 is a schematic diagram for explaining the setting of the focal position. FIG. 34 illustrates an example in a case in which the object A moves from the position A0 to the position A2 through the position A1. The position A0 is outside the range of the first target region ARa and the second target region ARb, the position A1 is inside the range of the first target region ARa and the second target region ARb, and the position A2 is outside the range of the first target region ARa and the second target region ARb. In this case, the focal position controllers 34 of the first imaging device 100*a* and the second imaging device 100*b* do not set the focal position to the object A at a timing when the object A exists at the position A0, and adjust the focal position on a preset setting position, for example. Then, the focal position controllers 34 of the first imaging device 100*a* and the second imaging device 100*b* adjust the focal position on the object A at a timing when the object A exists at the position A1, that is, at a timing when the object A enters the range of the first target region ARa and the second target region ARb. While the object A is located within the range of the first target region ARa and the second target region ARb, the focal position controller 34 keeps the focal position on the object A, removes the focal position from the object A at a timing when the object A moves to the position A2, that is, at a timing when the object A goes out of the range of the first target region ARa and the second target region ARb, and returns the focal position to the preset setting position. That is, the focal position controller 34 adjusts the focal position on the object A from a timing at which the object A enters the target region AR, moves the focal position to the moving object A while the object A moves in the target region AR, and removes the focal position from the object A at a timing at which the object A moves out of the target region AR.

Note that, for example, in a case in which the first target region ARa and the second target region ARb do not completely overlap, and the object A is within the range of the first target region ARa and outside the range of the second target region ARb, the first imaging device 100*a* adjusts the focal position on the object A, but the second imaging device 100*b* does not adjust the focal position on the object A. Similarly, in a case in which the object A is within the range of the second target region ARb and outside the range of the first target region ARa, the second imaging device 100*b* adjusts the focal position on the object A, but the first imaging device 100*a* does not adjust the focal position on the object A.

Note that the focal position may be set by the user. In this case, for example, an auto mode in which the focal position is adjusted automatically and a manual mode in which the focal position is adjusted by the user may be switchable. Then, in a case of the auto mode, the focal position is adjusted by the focal position controller 34 as described above. On the other hand, in a case of the manual mode, the user inputs an operation of adjusting the focal position to the input unit 16, and the focal position controller 34 adjusts the focal position according to the user's operation.

(Imaging Controller)

The imaging controller 36 controls imaging by the imaging device 100 to capture an image. The imaging controller 36 controls, for example, the imaging element 12 to cause the imaging element 12 to acquire an image signal. For example, the imaging controller 36 may cause the imaging element 12 to acquire the image signal automatically, or may cause the imaging element 12 to acquire the image signal according to a user's operation.

(Image Acquisition Unit)

The image acquisition unit 38 acquires image data acquired by the imaging element 12. For example, the image acquisition unit 38 controls the image processing circuit 13 to cause the image processing circuit 13 to generate image data from the image signal generated by the imaging element 12, and acquires the image data. The image acquisition unit 38 stores the image data in the storage 22.

(Setting Flow of Focal Position)

Figure 35:
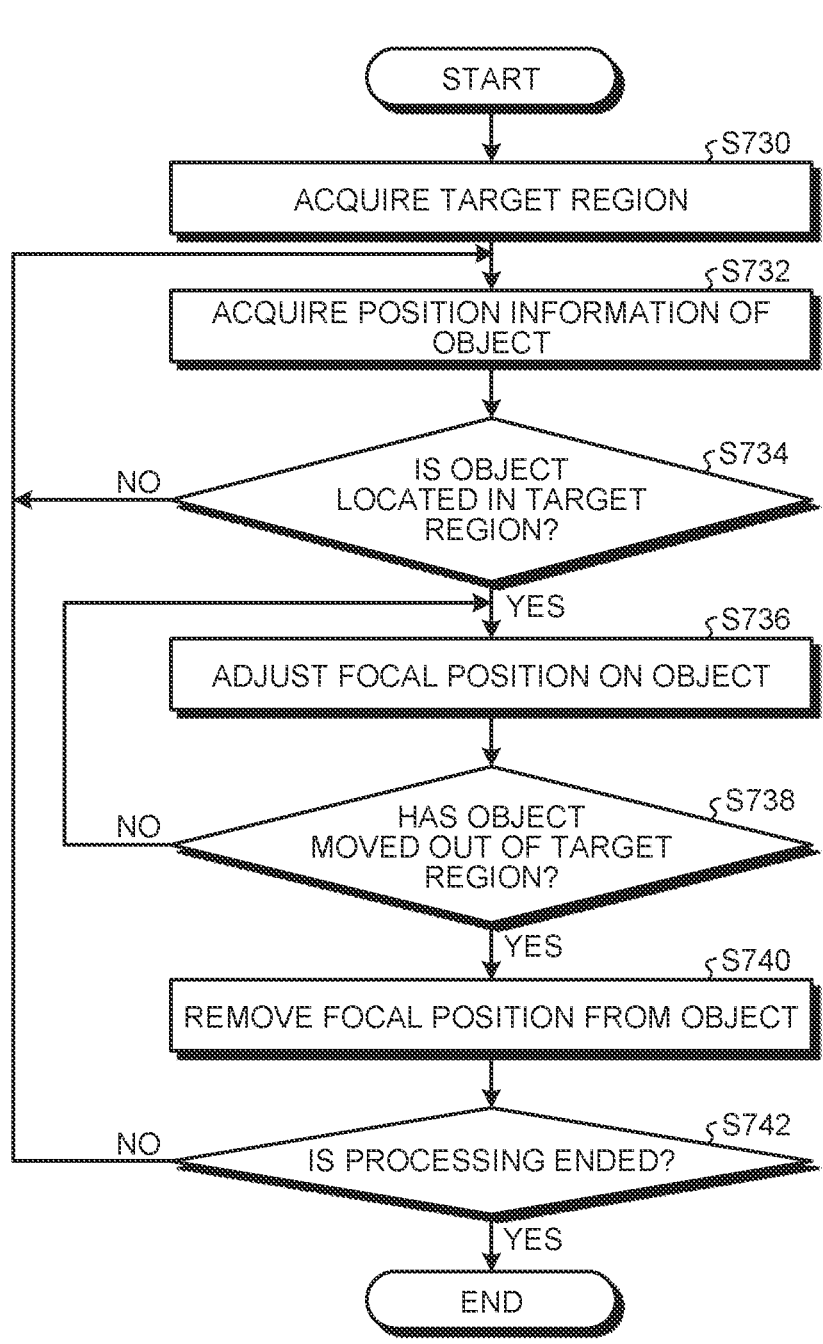
FIG. 35 is a flowchart for explaining a processing flow of adjusting a focal position.

Next, a processing flow of setting the focal position described above will be described. FIG. 35 is a flowchart for explaining a processing flow of adjusting a focal position. As illustrated in FIG. 35, the controller 24 causes the target region acquisition unit 30 to acquire information of the target region AR (Step S730), and causes the object information acquisition unit 32 to acquire position information of the object (Step S732). An execution order of Steps S730 and S732 may be arbitrary. The controller 24 causes the focal position controller 34 to determine whether the object is located in the target region AR based on the position information of the object (Step S734). In a case in which the object is not located in the target region AR (Step S734; No), the process returns to Step S732, and the acquisition of the position information of the object is continued. On the other hand, in a case in which the object is located in the target region AR (Step S734; Yes), the focal position controller 34 adjusts the focal position on the object (Step S736). Thereafter, the acquisition of the position information of the object is continued, and it is determined whether the object has moved to an outside of the target region AR (Step S738). In a case in which the object does not move out of the target region AR (Step S738; No), that is, in a case in which the object continues to exist in the target region AR, the process returns to Step S736, and the focal position is kept on the object. In a case in which the object has moved to the outside of the target region AR (Step S738; Yes), the focal position controller 34 removes the focal position from the object (Step S740). Thereafter, in a case in which the processing is not ended (Step S742; No), the process returns to Step S732, and in a case in which the processing is ended (Step S742; Yes), this process ends.

As described above, the imaging system 1 according to the present embodiment includes the multiple imaging devices 100. Each imaging device 100 includes the imaging element 12, the object information acquisition unit 32 that acquires the position information of an object existing in the imaging region AR0 of the imaging element 12, the target region acquisition unit 30 that sets the target region AR in the imaging region AR0, and the focal position controller 34 that controls the focal position of the imaging device 100 so as to adjust the focal position on an object in a case in which the object exists in the target region AR. The target region acquisition unit 30 of each imaging device 100 sets the target region AR such that at least some regions of the target regions AR overlap each other.

Here, in an imaging system including multiple autofocus imaging devices, it is required to adjust a focal position appropriately. For that, the imaging system 1 according to the present embodiment sets the target region AR such that at least some regions of the target regions of the respective imaging devices 100 overlap each other, and in a case in which an object exists in each target region AR, controls the focal position of the imaging device 100 so as to adjust the focal position on the object. Therefore, according to the present embodiment, since a remarkable region can be set for the multiple imaging devices 100, the focal position can be adjusted appropriately on the object in the remarkable region.

Furthermore, the imaging system 1 includes at least a first imaging device 100*a* and a second imaging device 100*b* as the multiple imaging devices 100. The region position information acquisition unit 33 of the first imaging device 100*a* acquires region position information indicating the position of the first target region ARa with respect to the reference object B based on the position information of the reference object B acquired by the object information acquisition unit 32. The target region acquisition unit 30 of the second imaging device 100*b* acquires the region position information from the first imaging device 100*a*, and sets the second target region ARb based on the region position information. Therefore, the imaging system 1 according to the present embodiment can appropriately set the second target region ARb so as to overlap the first target region ARa. Furthermore, by using the information of the reference object B, the second target region ARb can be appropriately set without sharing the position information of the imaging devices 100 with each other.

In addition, the region position information acquisition unit 33 of the first imaging device 100*a* acquires information indicating the position of the first target region ARa with respect to each of the three or more reference objects B as region position information. By using three or more reference objects B, the position of the first target region ARa can be appropriately defined, and the second target region ARb can be appropriately set.

Furthermore, the target region acquisition unit 30 of the second imaging device 100*b* sets the second target region ARb also based on the information of the reference object B. Therefore, according to the present embodiment, the second target region ARb can be appropriately set.

Eleventh Embodiment

Next, an eleventh embodiment will be described. The eleventh embodiment is different from the tenth embodiment in that, in a case in which an object is located in an overlapping region ARW where target regions AR of respective imaging devices 100 overlap each other, an imaging device 100 that adjusts a focal position on the object is selected based on a position where the object enters. In the eleventh embodiment, the description of portions having the same configuration as that of the 10th embodiment will be omitted.

Figure 36:
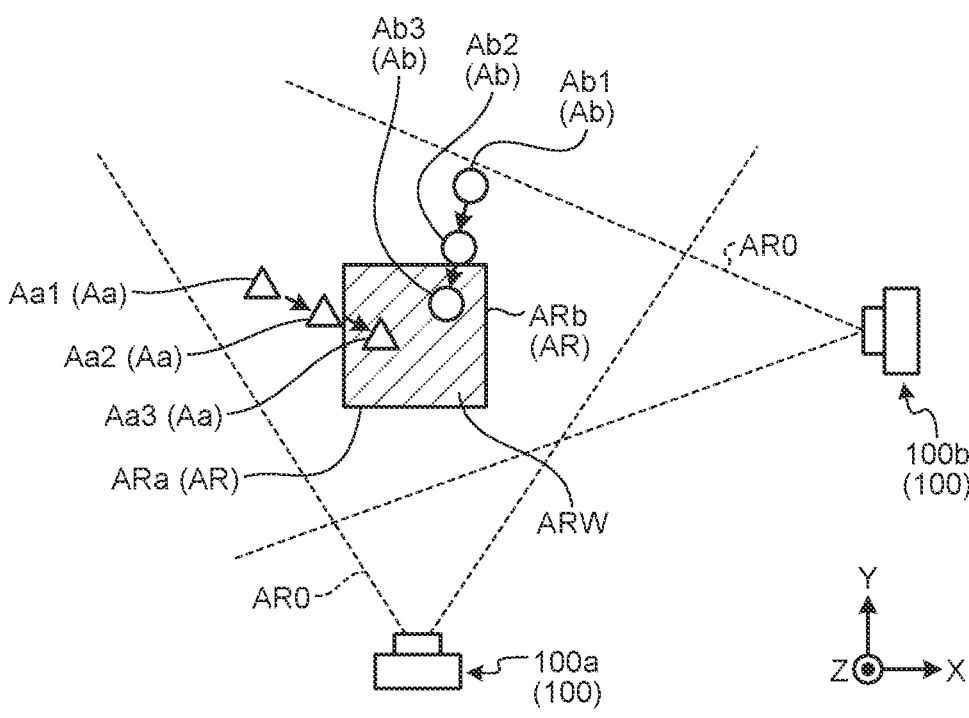
FIG. 36 is a schematic diagram illustrating an example of setting of a focal position according to an 11th embodiment.

FIG. 36 is a schematic diagram illustrating an example of setting of a focal position according to the eleventh embodiment. In the eleventh embodiment, the focal position controller 34 of each imaging device 100 acquires entry position information. The entry position information is information indicating an entry position of an object to be focused on. When a region (space) where the target regions AR of the respective imaging devices 100 overlap is an overlapping region ARW, the entry position refers to a position where an object has entered in the overlapping region ARW, in other words, from which direction boundary (peripheral edge) of the overlapping region ARW the object has entered. That is, for example, in a case in which the object Ab enters from a peripheral edge (a boundary) on the Y direction side of the overlapping region ARW as the object Ab in FIG. 36, the entry position can be said to be on the Y direction side. Since the entry position information indicates the entry position of the object to be focused on, it can also be said that it indicates that which objects from the entry positions the focal position is to be adjusted on.

The entry position information is set for each imaging device 100. It is preferable that the entry position information of each imaging device 100 is set such that entry positions of objects to be focused on are different from each other. For example, the entry position of the object to be focused on may be on the X direction side in the entry position information acquired by the first imaging device 100a, and the entry position of the object to be focused on may be on the Y direction side in the entry position information acquired by the second imaging device 100b. However, in each imaging device 100, entry positions of objects to be focused on may overlap. That is, for example, the entry position of the object to be focused on may be on the X direction side and the Y direction side in the entry position information acquired by the first imaging device 100a, and the entry position of the object to be focused on may be on the Y direction side in the entry position information acquired by the second imaging device 100b.

Each imaging device 100 may acquire the entry position information by an arbitrary method. For example, the entry position information may be set in advance. In this case, each imaging device 100 may read the entry position information set in advance from the storage 22, or may acquire entry position information set in advance from another device via the communication unit 20. Furthermore, for example, in a case in which the entry position information is not set in advance, each imaging device 100 may set the entry position information automatically. Furthermore, for example, the user may set the entry position information. In this case, for example, the user may input the entry position information to the input unit 16, and the target region acquisition unit 30 may acquire the entry position information input by the user.

In a case in which an object enters the overlapping region ARW from an entry position designated in the entry position information, each imaging device 100 adjusts a focal position on the object. That is, in a case in which an object enters the overlapping region ARW, each imaging device 100 specifies, based on the position information of the object acquired by the object information acquisition unit 32, from which boundary/direction of the overlapping region ARW the object enters the entry position of the object. Then, each imaging device 100 determines whether the specified entry position coincides with the entry position designated in the entry position information, and in a case in which the specified entry position coincides with the entry position, the focal position controller 34 adjusts the focal position on the object. On the other hand, in a case in which the specified entry position does not match the entry position designated in the entry position information, the focal position is not adjusted on the object.

The above processing will be described with reference to FIG. 36 as an example. In FIG. 36, in the entry position information acquired by the first imaging device 100a, the entry position of the object to be focused on is on an opposite side to the X direction, and in the entry position information acquired by the second imaging device 100b, the entry position of the object to be focused on is on a Y direction side, and the entire first target region ARa and the entire second target region ARb overlap each other. First, a case in which the object Aa moves from the position Aa1 to the position Aa3 through the position Aa2 will be described as an example. The position Aa1 is out of the range of the overlapping region ARW and is located on the opposite side of the overlapping region ARW in the X direction. The position Aa2 is a position overlapping a boundary (a peripheral edge) on the opposite side to the X direction of the overlapping region ARW. The position Aa3 is within the range of the overlapping region ARW. In this case, since the object Aa enters the overlapping region ARW from the position Aa2, the entry position is on the opposite side to the X direction. Therefore, the first imaging device 100a adjusts the focal position on the object Aa from a timing when the object is located at the position Aa2, and the second imaging device 100b does not set the focal position on the object Aa.

Next, a case in which the object Ab moves from the position Ab1 to the position Ab3 through the position Ab2 will be described as an example. The position Ab1 is out of the range of the overlapping region ARW and is located on the Y direction side of the overlapping region ARW. The position Ab2 is a position overlapping a boundary (a peripheral edge) on the Y direction side of the overlapping region ARW. The position Ab3 is within the range of the overlapping region ARW. In this case, since the object Ab enters the overlapping region ARW from the position Ab2, the entry position is on the Y direction side. Therefore, the second imaging device 100b adjusts the focal position on the object Ab from a timing at which the object is located at the position Ab2, and the first imaging device 100a does not adjust the focal position on the object Ab.

Figure 37:
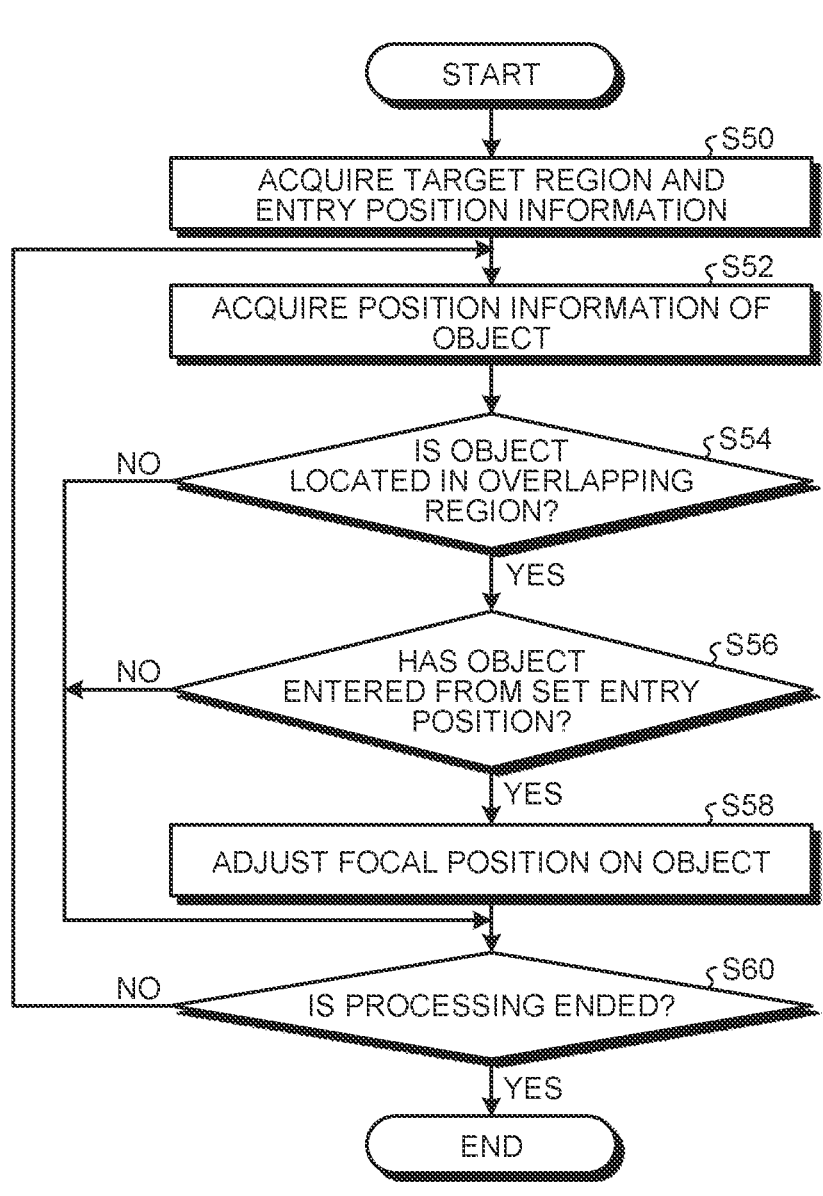
FIG. 37 is a flowchart for explaining a processing flow of adjusting a focal position according to the 11th embodiment.

Next, a processing flow of setting the focal position described above will be described. FIG. 37 is a flowchart for explaining a processing flow of adjusting a focal position according to the eleventh embodiment. As illustrated in FIG. 37, the controller 24 causes the target region acquisition unit 30 to acquire the information on the target region AR and the entry position information (Step S50), and causes the object information acquisition unit 32 to acquire the position information of the object (Step S52). An execution order of Steps S50 and S52 may be arbitrary. The controller 24 causes the focal position controller 34 to determine whether the object is located in the overlapping region ARW based on the position information of the object (Step S54). In a case in which the object is located in the overlapping region ARW (Step S54; Yes), the focal position controller 34 determines whether the object has entered from the entry position (the set entry position) indicated by the entry position information (Step S56), and in a case in which the object has entered from the set entry position, the focal position controller adjusts the focal position on the object (Step S58). Thereafter, in a case in which the processing is not ended (Step S60; No), the process returns to Step S52, and in a case in which the processing is ended (Step S60; Yes), this process ends. In addition, in a case in which the object is not located in the overlapping region ARW (Step S54; No) or in a case in which the object has not entered from the set entry position (Step S56; No), the focal position is not adjusted on the object, and the process proceeds to Step S60. Note that, in a case in which the object is outside the overlapping region ARW but is located in the target region AR of the own imaging device 100, the focal position controller 34 may adjust the focal position on the object regardless of the entry position of the object.

As described above, in the eleventh embodiment, the focal position controller 34 of each imaging device 100 acquires the entry position information indicating the entry position of the object to be focused on, and in a case in which the object enters the overlapping region ARW from the position designated in the entry position information, the focal position is adjusted on the object. In the eleventh embodiment, in the overlapping region ARW, since the imaging device 100 that adjusts the focal position on the object can be selected according to the entry position of the object, the imaging device 100 that can appropriately image the object can be caused to perform imaging.

Note that, in the eleventh embodiment, it is not necessary to set the first target region ARa and the second target region ARb by a method similar to the tenth embodiment, and the first target region ARa and the second target region ARb may be set by an arbitrary method so that at least some regions of the first target region ARa and the second target region ARb overlap each other.

Twelfth Embodiment

Next, a twelfth embodiment will be described. The twelfth embodiment is different from the tenth embodiment in that an imaging device 100 that adjusts a focal position on an object located in an overlapping region ARW is allocated based on designation information for designating whether or not to adjust the focal position in a case in which the object is located in the overlapping region ARW. In the twelfth embodiment, the description of portions having the same configuration as that of the tenth embodiment will be omitted. Note that the twelfth embodiment is also applicable to the eleventh embodiment.

Figure 38:
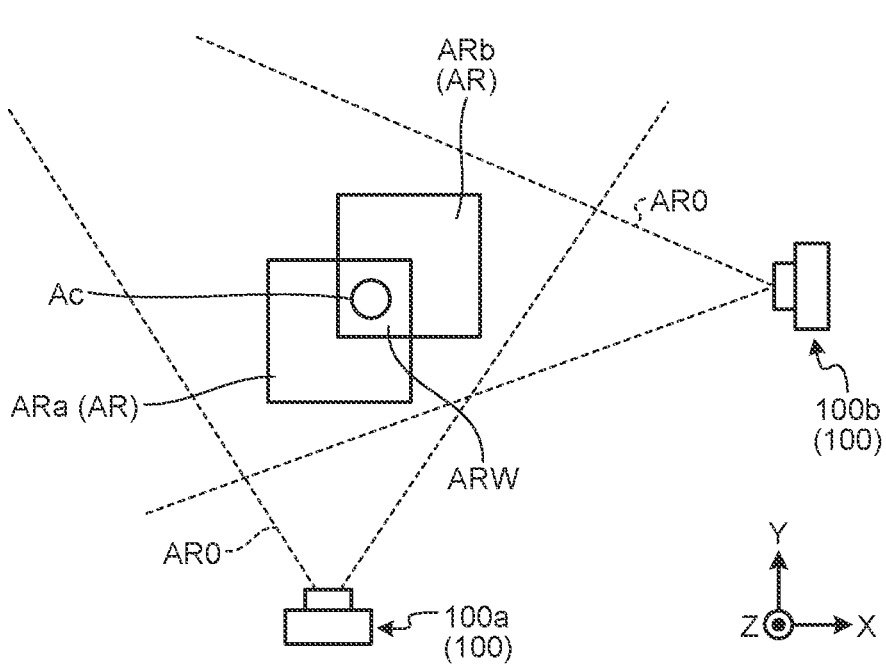
FIG. 38 is a schematic diagram illustrating an example of setting of a focal position according to a 12th embodiment.

FIG. 38 is a schematic diagram illustrating an example of setting of a focal position according to the twelfth embodiment. In the twelfth embodiment, the focal position controller 34 of each imaging device 100 acquires designation information. The designation information is information for designating whether or not to adjust the focal position in a case in which the object is located in the overlapping region ARW. The designation information is set for each imaging device 100.

Each imaging device 100 may acquire the designation information by an arbitrary method. For example, the designation information may be set in advance. In this case, each imaging device 100 may read the designation information set in advance from the storage 22, or may acquire the designation information set in advance from another device via the communication unit 20. Furthermore, for example, in a case in which the designation information is not set in advance, each imaging device 100 may set the designation information automatically. Furthermore, for example, the user may set the designation information. In this case, for example, the user may input the designation information to the input unit 16, and the target region acquisition unit 30 may acquire the designation information input by the user.

In a case in which an object is located in the overlapping region ARW, each imaging device 100 determines whether to adjust the focal position on the object based on the designation information. That is, for example, in a case in which it is designated in the designation information that the focal position is adjusted in a case in which the object is located in the overlapping region ARW, the imaging device 100 adjusts the focal position on the object located in the overlapping region ARW. On the other hand, in a case in which it is designated in the designation information that the focal position is not adjusted in a case in which the object is located in the overlapping region ARW, the imaging device 100 does not adjust the focal position on the object located in the overlapping region ARW.

In the present embodiment, the designation information of each imaging device 100 may be set such that one imaging device 100 designated to adjust the focal position is selected when the object is located in the overlapping region ARW. That is, taking FIG. 38 as an example, the designation information of the first imaging device 100a may designate that the focal position is adjusted in a case in which the object is located in the overlapping region ARW, and the designation information of the second imaging device 100b may designate that the focal position is not adjusted in a case in which the object is located in the overlapping region ARW. In this case, the first imaging device 100a adjusts the focal position on the object Ac located in the overlapping region ARW, and the second imaging device 100b does not adjust the focal position on the object Ac located in the overlapping region ARW.

However, the designation information of each imaging device 100 may be set such that multiple imaging devices 100 are designated to adjust the focal position in a case in which the object is located in the overlapping region ARW. That is, taking FIG. 38 as an example, the designation information of both the first imaging device 100a and the second imaging device 100b may designate that the focal position is adjusted in a case in which the object is located in the overlapping region ARW. In this case, both the first imaging device 100a and the second imaging device 100b adjust the focal position on the object Ac located in the overlapping region ARW.

Figure 39:
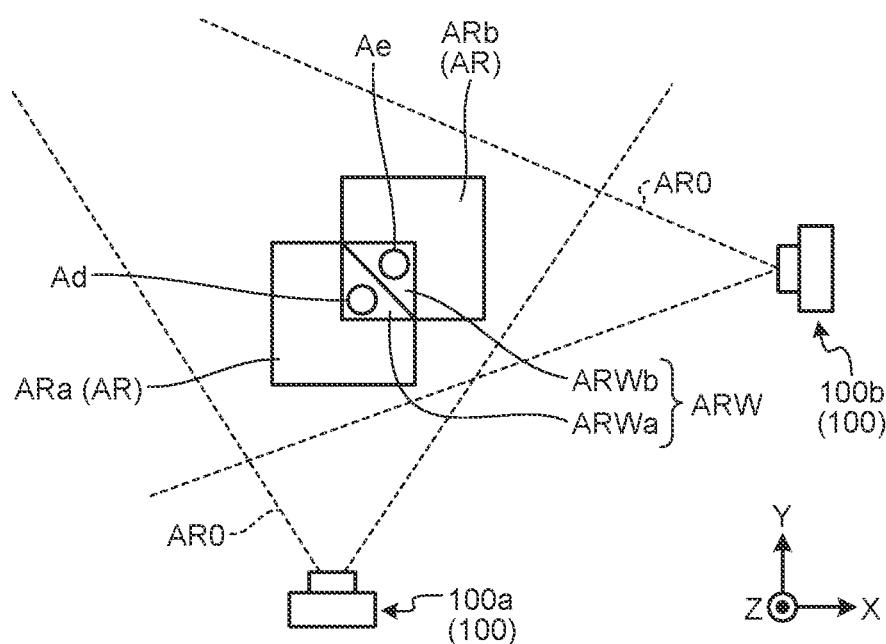
FIG. 39 is a schematic diagram illustrating an example of setting of a focal position in another example of the 12 the embodiment.

Furthermore, the designation information may be set such that the overlapping region ARW is divided into multiple regions, and the imaging device 100 which adjusts the focal position is assigned for each region. FIG. 39 is a schematic diagram illustrating an example of adjusting the focal position in another example of the twelfth embodiment. In this case, for example, as illustrated in FIG. 39, the overlapping region ARW is divided into a first overlapping region ARWa and a second overlapping region ARWb. In the designation information of the first imaging device 100a, it is designated that the focal position is adjusted in a case in which the object is located in the first overlapping region ARWa, and it is designated that the focal position is not adjusted in a case in which the object is located in the second overlapping region ARWb. On the other hand, in the designation information of the second imaging device 100b, it is designated that the focal position is adjusted in a case in which the object is located in the second overlapping region ARWb, and it is designated that the focal position is not adjusted in a case in which the object is located in the first overlapping region ARWa. In this case, the first imaging device 100a adjusts the focal position on the object Ad located in the first overlapping region ARWa and does not adjust the focal position on the object Ae located in the second overlapping region ARWb. On the other hand, the second imaging device 100*b* adjusts the focal position on the object Ae located in the second overlapping region ARWb, and does not adjust the focal position on the object Ad located in the first overlapping region ARWa.

Note that, although a method of partitioning the overlapping region ARW is arbitrary, for example, a region close to a region which does not overlap the overlapping region ARW of the first target region ARa of the first imaging device 100*a* in the overlapping region ARW may be set as the first overlapping region ARWa. Then, in the overlapping region ARW, with respect to the first overlapping region ARWa, a region located on a region side which does not overlap the overlapping region ARW of the second target region ARb of the second imaging device 100*b* may be set as the second overlapping region ARWb.

Figure 40:
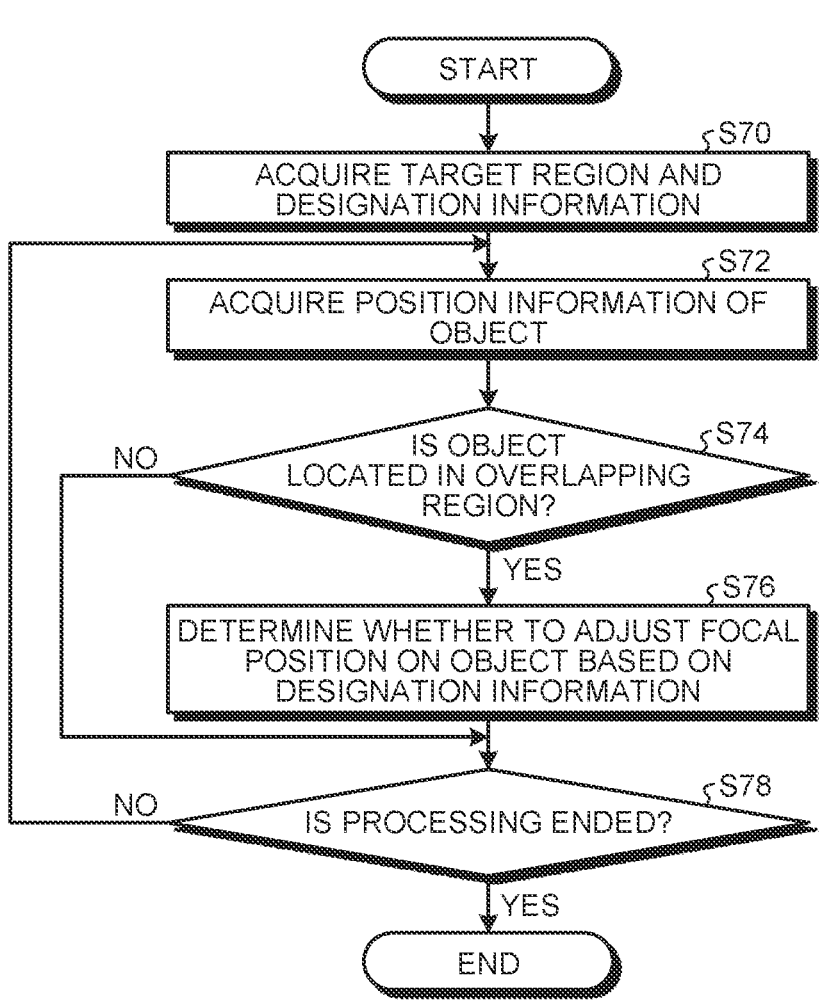
FIG. 40 is a flowchart for explaining a processing flow of adjusting a focal position according to the 12th embodiment.

Next, a processing flow of setting the focal position described above will be described. FIG. 40 is a flowchart for explaining a processing flow of adjusting a focal position according to the twelfth embodiment. As illustrated in FIG. 40, the controller 24 causes the target region acquisition unit 30 to acquire the information on the target region AR and the designation information (Step S70), and causes the object information acquisition unit 32 to acquire the position information of the object (Step S72). An execution order of Steps S70 and S72 may be arbitrary. The controller 24 causes the focal position controller 34 to determine whether the object is located in the overlapping region ARW based on the position information of the object (Step S74). In a case in which the object is located in the overlapping region ARW (Step S74; Yes), the focal position controller 34 determines whether to adjust the focal position on the object based on the designation information (Step S76). That is, in a case in which it is designated in the designation information that the focal position is to be adjusted on the object in the overlapping region ARW, the focal position controller 34 adjusts the focal position on the object. On the other hand, in a case in which it is designated in the designation information that the focal position is not adjusted on the object in the overlapping region ARW, the focal position controller 34 does not adjust the focal position on the object. Thereafter, in a case in which the processing is not ended (Step S78; No), the process returns to Step S72, and in a case in which the processing is ended (Step S78; Yes), this process ends. In addition, in a case in which the object is not located in the overlapping region ARW (Step S74; No), the focal position is not adjusted on the object, and the process proceeds to Step S78. However, in a case in which the object is outside the overlapping region ARW but is located in the own target region AR, the focal position may be adjusted on the object regardless of the designation information.

As described above, in the twelfth embodiment, the focal position controller 34 of each imaging device 100 acquires the designation information for designating whether or not to adjust the focal position in a case in which the object is located in the overlapping region ARW. In a case in which the object is located in the overlapping region ARW, the focal position controller 34 of each imaging device 100 determines whether to adjust the focal position on the object based on the designation information. In the twelfth embodiment, since the imaging device 100 that adjusts the focal position on the object located in the overlapping region ARW can be selected based on the designation information, the imaging device 100 that adjusts the focal position on the object located in the overlapping region ARW can be assigned appropriately.

Note that, in the twelfth embodiment, it is not necessary to set the first target region ARa and the second target region ARb by a method similar to the tenth embodiment, and the first target region ARa and the second target region ARb may be set by an arbitrary method in which at least some regions of the first target region ARa and the second target region ARb overlap each other.

Thirteenth Embodiment

Next, a thirteenth embodiment will be described. The thirteenth embodiment is different from the tenth embodiment in that a focal position is adjusted on an object that exists in a target region AR and satisfies a predetermined condition. In the thirteenth the embodiment, the description of portions having the same configuration as that of the tenth embodiment will be omitted. The thirteenth the embodiment is also applicable to the eleventh embodiment and the twelfth embodiment.

In the thirteenth the embodiment, the focal position controller 34 sets the focal position of an object that exists in the target region AR and satisfies a predetermined condition. The focal position controller 34 does not set the focal position on the object that does not satisfy at least one of a condition that the object exists in the target region AR and a condition that the predetermined condition is satisfied. The focal position controller 34 keeps the focal position on the object while the object on the focal position continues to exist in the target region AR with satisfying a predetermined condition. On the other hand, in a case in which the object no longer satisfies at least one of the condition that the object exists in the target region AR and the condition that the predetermined condition is satisfied, the focal position controller 34 removes the focal position from the object. That is, for example, in a case in which the object satisfies the predetermined condition but moves out of the target region AR, or in a case in which the object exists in the target region AR but no longer satisfies the predetermined condition, the focal position controller 34 removes the focal position from the object.

The focal position controller 34 may determine whether the predetermined condition is satisfied by an arbitrary method, but for example, may determine whether the predetermined condition is satisfied based on at least one of the position information of the object or the image of the object. Here, the position information of the object may refer to a measurement result of the object position measurement unit 14, and the image of the object may refer to image data which is acquired by the imaging element 12 and in which the object is imaged.

The predetermined condition here may be any condition except a condition that the object does not exist in the target region AR. For example, the predetermined condition may be at least one of a condition that the object is performing a predetermined motion, a condition that the object has a predetermined shape, or a condition that the object is oriented in a predetermined direction. In addition, any two of these conditions may be set as the predetermined condition, or all of these conditions may be set as the predetermined condition. In a case in which multiple predetermined conditions are set, the focal position controller 34 determines that the predetermined conditions are satisfied in a case in which all the conditions are satisfied.

A case in which the motion of the object is set to a predetermined condition will be described. In this case, the focal position controller 34 determines whether the object is performing a predetermined motion based on the position information of the object continuously acquired in time series. The focal position controller 34 adjusts the focal position of the object existing in the target region AR and performing a predetermined motion. The focal position controller 34 does not adjust the focal position of the object that does not satisfy at least one of the condition that the object exists in the target region AR and the condition that the object performs the predetermined motion. The focal position controller 34 keeps the focal position on the object while the object on the focal position exists in the target region AR and continues the predetermined motion. On the other hand, in a case in which the object no longer satisfies at least one of the condition that the object exists in the target region AR and the condition that the object performs the predetermined motion, the focal position controller 34 removes the focal position from the object. Note that the motion of the object here refers to a moving mode of the object, and may refer to, for example, a moving direction and a moving speed of the object. For example, in a case in which the predetermined motion indicates that the object moves vertically downward at a speed of 10 m/h or more, the focal position controller 34 adjusts the focal position of the object moving vertically downward at a speed of 10 m/h or more in the target region AR. Note that the motion of the object is not limited to a motion indicating the moving direction and the moving speed of the object, and may indicate an arbitrary moving mode. For example, the motion of the object may refer to at least one of the moving direction and the moving speed of the object.

Figure 41:
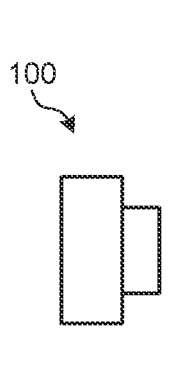
FIG. 41 is a schematic diagram illustrating an example of a case in which a motion of the object is set as a predetermined condition.
Figure 41:
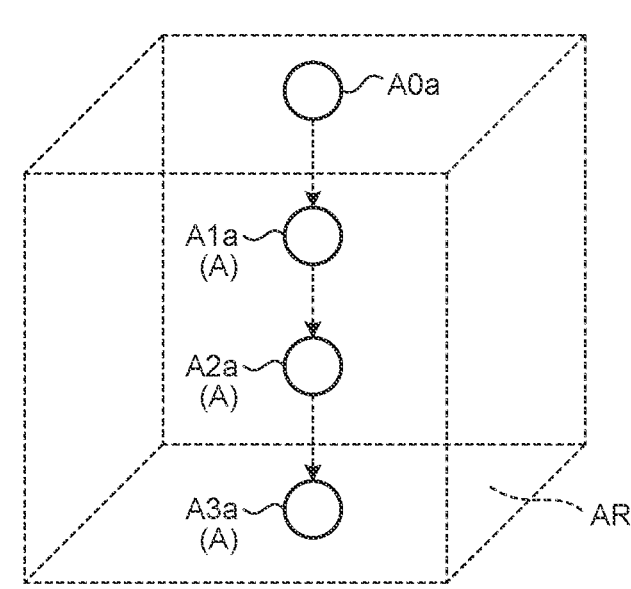

FIG. 41 is a schematic diagram illustrating an example of a case in which a motion of the object is set as a predetermined condition. In the example of FIG. 8, the predetermined condition is that the object moves vertically downward (in the direction opposite to the Z direction), that is, the moving direction of the object. Then, the example of FIG. 8 illustrates a case in which the object A moves vertically downward from the position A0a to the position A3a through the position A1a and the position A2a and stops at the position A3a. The position A0a is outside the target region AR, and the positions A1a, A2a, and A3a are inside the target region AR. In this case, since the object A is out of the target region AR at a timing when the object A exists at the position A0a, the focal position controller 34 does not adjust the focal position on the object A but, for example, adjusts the focal position on the preset setting position. Then, the focal position controller 34 adjusts the focal position on the object A at a timing when the object A exists at the position A1a, that is, at a timing when the object A enters the target region AR while moving vertically downward. The focal position controller 34 keeps the focal position on the object A even at a timing when the object A exists at the position A2a, and removes the focal position from the object A and returns the focal position to the preset setting position at a timing when the object A moves to the position A3a and stops.

Next, a case in which a shape of the object is set to a predetermined condition will be described. In this case, the focal position controller 34 determines whether the object has a predetermined shape based on the image data in which the object is captured. The focal position is adjusted on the object existing in the target region AR and having a predetermined shape. The focal position controller 34 does not adjust the focal position on the object that does not satisfy at least one of the condition that the object exists in the target region AR and the condition that the object has a predetermined shape. The focal position controller 34 keeps the focal position on the object while the object at the focal position has a predetermined shape and continues to exist in the target region AR. On the other hand, in a case in which the object no longer satisfies at least one of the condition that the object exists in the target region AR and the condition that the object has the predetermined shape, the focal position controller 34 removes the focal position from the object. The shape of the object here may be, for example, at least one of a size of the object or an outer shape of the object. For example, in a case in which the predetermined shape indicates a predetermined size or more, the focal position controller 34 adjusts the focal position on an object existing in the target region AR and having a predetermined size or more. Note that a 3D shape information acquired by the object information acquisition unit 32 may be used to acquire a shape information of the object.

A case in which the orientation of the object is set to a predetermined condition will be described. In this case, the focal position controller 34 determines whether the object is directed in a predetermined direction based on the image data in which the object is captured. The focal position is adjusted with respect to the object existing in the target region AR and facing the predetermined direction. The focal position controller 34 does not adjust the focal position on the object that does not satisfy at least one of the condition that the object exists in the target region AR and the condition that the object is directed in the predetermined direction. The focal position controller 34 keeps the focal position on the object during a period in which the object on the focal position is kept existing in the target region AR while facing the predetermined direction. On the other hand, in a case in which the object no longer satisfies at least one of the condition that the object exists in the target region AR and the condition that the object is directed in the predetermined direction, the focal position controller 34 removes the focal position from the object. Note that the information on the 3D shape acquired by the object information acquisition unit 32 may be used to acquire the information on the orientation of the object.

Note that the predetermined condition may be set by an arbitrary method, for example, may be set in advance. In this case, the focal position controller 34 may read information (for example, the moving direction and the moving speed) indicating a preset predetermined condition from the storage 22, or may acquire a predetermined condition from another device via the communication unit 20. Furthermore, for example, in a case in which a predetermined condition is not set in advance, the focal position controller 34 may automatically set a predetermined condition. Furthermore, for example, the user may set a predetermined condition. In this case, for example, the user may input information (for example, a moving direction and a moving speed) designating a predetermined condition to the input unit 16, and the focal position controller 34 may set a predetermined condition based on the information designated by the user.

As described above, in the third embodiment, the focal position controller 34 may set the focal position on the object existing in the target region AR and performing the predetermined motion. The focal position controller 34 keeps the focal position on the object during a period in which the object performs the predetermined motion, and removes the focal position from the object when the object no longer performs the predetermined motion. In this manner, in addition to being within the target region AR, satisfying a predetermined motion is also a condition for setting the focal position, whereby an object having a specific motion can be tracked and the focal position can be adjusted appropriately. For example, it is possible to detect a drop in the target region AR or the like.

In the 13 the embodiment, the focal position controller 34 may adjust the focal position on an object existing in the target region AR and having a predetermined shape. As described above, in addition to being in the target region AR, it is possible, by setting the predetermined shape as a condition for adjusting the focal position, to track an object having a specific shape and appropriately adjust the focal position.

In the 13 the embodiment, the focal position controller 34 may adjust the focal position on an object existing in the target region AR and facing a predetermined direction. As described above, in addition to being in the target region AR, it is possible, by setting the condition that the object faces the predetermined direction as the condition for setting the focal position, to track the object in a specific direction and appropriately adjust the focal position.

Although the present embodiments have been described above, the embodiments are not limited by the contents of these embodiments. In addition, the above-described components include those that can be easily assumed by those skilled in the art, those that are substantially the same, and those in a so-called equivalent range. Furthermore, the above-described components can be appropriately combined, and the configurations of the respective embodiments can also be combined. Furthermore, various omissions, substitutions, or changes in the components can be made without departing from the gist of the above-described embodiments. Furthermore, in each embodiment, the operation of adjusting the focal position has been described as a feature point, but the operation of adjusting the focal position and another operation may be combined. For example, the operation of adjusting the focal position and the operation of zooming may be combined. Furthermore, in the description of each embodiment, the operation of adjusting the focal position may be replaced with another operation. For example, in the description of each embodiment, the operation of adjusting the focal position may be replaced with an operation of zooming. Furthermore, the controller 24 of the imaging device according to each embodiment may notify a predetermined transmission destination through the communication unit 20 when a set condition is satisfied, for example, the set condition includes a condition that an object enters or leaves a predetermined target region AR, or a condition that the object moves in a predetermined direction or the like. The set condition here may include, for example, a condition that the focal point is adjusted on the object by movement of the object into the target region AR as a trigger.

The imaging device, the imaging system, the imaging method, and the program of the present embodiment can be used, for example, for capturing an image.

According to the present embodiment, the focus can be adjusted appropriately.

What is claimed is:

1. An imaging device capable of imaging an object, the imaging device comprising:

an imaging element;

an object information acquisition unit configured to acquire position information of an object existing in an imaging region of the imaging element;

a target region acquisition unit configured to set a target region based on the position information of a reference object acquired by the object information acquisition unit; and a focal position controller configured to control a focal position of the imaging device so as to adjust, from a timing when an object other than the reference object enters the target region from an outside of the target region to a timing when the object goes out of the target region, the focal position on the object, wherein the target region acquisition unit is further configured to set the target region based on the position information of the reference object located between a first position where a distance from the imaging device is a first distance and a second position where a distance from the imaging device is a second distance shorter than the first distance, and the position information is a relative position with respect to the imaging device.

2. The imaging device according to claim 1, wherein the target region acquisition unit is further configured to set a region around the reference object as the target region.

3. The imaging device according to claim 1, wherein the target region acquisition unit is further configured to set a region surrounded by a plurality of reference objects, comprising the reference object, as the target region.

4. The imaging device according to claim 1, wherein the target region acquisition unit is further configured to set the target region based on the position information of the reference object that does not move in the imaging region.

5. The imaging device according to claim 1, wherein the target region acquisition unit is further configured to set the target region so as to move within the imaging region, and the focal position controller is further configured to control the focal position of the imaging device so as to adjust, when an object exists in the target region, the focal position on the object.

6. The imaging device according to claim 5, wherein the focal position controller is further configured not to adjust, when a non-moving object is located in the target region, the focal position on the non-moving object, and configured to adjust, when a moving object is located in the target region, the focal position on the moving object.

7. The imaging device according to claim 5, wherein the target region acquisition unit is further configured to set the target region to be moved based on the position information of the moving reference object acquired by the object information acquisition unit.

8. The imaging device according to claim 7, wherein the target region acquisition unit is further configured to set the target region to be moved along with movement of the reference object so as to keep a position of the target region with respect to the reference object the same.

9. The imaging device according to claim 1, further comprising a self-position acquisition unit configured to acquire position information of the imaging device, wherein the focal position controller is further configured to control the focal position of the imaging device so as to adjust, when an object exists in the target region, the focal position on the object, and the target region acquisition unit is further configured to keep a position of the target region fixed when the self-position acquisition unit determines that the imaging device has moved.

10. The imaging device according to claim 9, wherein the target region acquisition unit is further configured to:

when a first mode in which the position of the target region is fixed is set, fix the position of the target region when the self-position acquisition unit determines that the imaging device has moved; and when a second mode in which the position of the target region is not fixed is set, change the position of the target region when the self-position acquisition unit determines that the imaging device has moved.

11. The imaging device according to claim 9, further comprising a notification controller configured to cause a warning to be output when a distance from the target region to a boundary position between an inside of the imaging region and an outside of the imaging region becomes less than a predetermined distance as the imaging device moves and thereby the imaging region moves.

12. An imaging system comprising a plurality of the multiple imaging devices according to claim 1, wherein the focal position controller of each imaging device is further configured to control the focal position thereof so as to adjust, when an object exists in the target region, the focal position on the object, and the target region acquisition unit of each imaging device is further configured to set the target region such that at least partial regions of the target regions overlap each other.

13. The imaging system according to claim 12, wherein the plurality of imaging devices comprises at least a first imaging device and a second imaging device, wherein the first imaging device includes a region position information acquisition unit configured to acquire region position information indicating a position of a first target region, which is the target region of the first imaging device, with respect to the reference object based on position information of the reference object acquired by the object information acquisition unit, and the target region acquisition unit of the second imaging device is further configured to acquire the region position information from the first imaging device, and set a second target region that is the target region of the second imaging device based on the acquired region position information.

14. The imaging system according to claim 13, wherein the region position information acquisition unit of the first imaging device is further configured to acquire, as the region position information, information indicating a position of the first target region with respect to each of three or more of the reference objects.

15. The imaging system according to claim 13, wherein the target region acquisition unit of the second imaging device is further configured to set the second target region also based on information of the reference object.

16. An imaging method for imaging an object, the imaging method comprising:

acquiring position information of an object existing in an imaging region;

setting a target region based on the position information of a reference object acquired at the acquiring; and controlling a focal position of an imaging device so as to adjust, from a timing when an object other than the reference object exists in enters the target region from an outside of the target region to a timing when the object goes out of the target region, the focal position on the object, wherein the setting further comprising setting the target region based on the position information of the reference object located between a first position where a distance from the imaging device is a first distance and a second position where a distance from the imaging device is a second distance shorter than the first distance, and the position information is a relative position with respect to the imaging device.

17. A non-transitory storage medium that stores a program for causing a computer to execute an imaging method for imaging an object, the program comprising:

acquiring position information of an object existing in an imaging region;

setting a target region based on the position information of a reference object acquired at the acquiring; and controlling a focal position of an imaging device so as to adjust, from a timing when an object other than the reference object enters the target region from an outside of the target region to a timing when the object goes out of the target region, the focal position on the object, wherein the setting further comprising setting the target region based on the position information of the reference object located between a first position where a distance from the imaging device is a first distance and a second position where a distance from the imaging device is a second distance shorter than the first distance, and the position information is a relative position with respect to the imaging device.

* * * * *